(12) United States Patent  
Alcorn et al.

(10) Patent No.: US 7,558,853 B2  
(45) Date of Patent: *Jul. 7, 2009

(54) INTERNET-BASED EDUCATION SUPPORT SYSTEM AND METHODS

(75) Inventors: Robert L. Alcorn, Arlington, VA (US); Daniel E. Cane, Washington, DC (US); Michael L. Chasen, Washington, DC (US); Timothy R. Chi, Fairfax, VA (US); Stephen R. Gilfus, Woodbridge, VA (US); Scott Perian, Washington, DC (US); Matthew L. Pittinsky, Washington, DC (US)

(73) Assignee: Blackboard, Inc., Washington, DC (US)

( * ) Notice: Subject to any disclaimer, the term of this patent is extended or adjusted under 35 U.S.C. 154(b) by 102 days.

This patent is subject to a terminal disclaimer.

(21) Appl. No.: 11/648,096

(22) Filed: Dec. 29, 2006

(65) Prior Publication Data

US 2007/0130339 A1 Jun. 7, 2007

Related U.S. Application Data

(63) Continuation of application No. 11/251,110, filed on Oct. 13, 2005, which is a continuation of application No. 09/608,208, filed on Jun. 30, 2000, now Pat. No. 6,988,138.

(60) Provisional application No. 60/141,283, filed on Jun. 30, 1999, provisional application No. 60/141,864, filed on Jul. 1, 1999, provisional application No. 60/187,890, filed on Mar. 8, 2000.

(51) Int. Cl.  
*G06F 15/173* (2006.01)

(52) U.S. Cl. .................. 709/225; 434/323; 713/200; 322/350; 322/336

(58) Field of Classification Search ................. 709/225; 713/200; 434/322; 322/350, 336  
See application file for complete search history.

(56) References Cited

U.S. PATENT DOCUMENTS

| | | | |
|---|---|---|---|
| 4,236,209 A | 11/1980 | Lombardo, Jr. et al. | |
| 4,724,521 A | 2/1988 | Carron et al. | |
| 4,727,589 A | 2/1988 | Hirose et al. | |
| 4,935,870 A | 6/1990 | Burk, Jr. et al. | |

(Continued)

OTHER PUBLICATIONS

Sound Virtual Inc., Some CAN-8 VirtuaLab Documentation, Apr. 1998, Toronto, Ontario, Canada, 75 pages.

(Continued)

*Primary Examiner*—Thanh Tammy Nguyen  
(74) *Attorney, Agent, or Firm*—McDermott Will & Emery, LLP

(57) ABSTRACT

A system and methods for implementing education online by providing institutions with the means for allowing the creation of courses to be taken by students online, the courses including assignments, announcements, course materials, chat and whiteboard facilities, and the like, all of which are available to the students over a network such as the Internet. Various levels of functionality are provided through a three-tiered licensing program that suits the needs of the institution offering the program. In addition, an open platform system is provided such that anyone with access to the Internet can create, manage, and offer a course to anyone else with access to the Internet without the need for an affiliation with an institution, thus enabling the virtual classroom to extend worldwide.

37 Claims, 41 Drawing Sheets

U.S. PATENT DOCUMENTS

| | | | |
|---|---|---|---|
| 5,002,491 | A | 3/1991 | Abrahamson et al. |
| 5,263,869 | A | 11/1993 | Ziv-El |
| 5,434,913 | A | 7/1995 | Tung et al. |
| 5,437,555 | A | 8/1995 | Ziv-El |
| 5,490,247 | A | 2/1996 | Tung et al. |
| 5,515,296 | A | 5/1996 | Agarwal |
| 5,537,141 | A | 7/1996 | Harper et al. |
| 5,664,126 | A | 9/1997 | Hirakawa et al. |
| 5,694,601 | A | 12/1997 | White |
| 5,734,828 | A | 3/1998 | Pendse et al. |
| 5,764,900 | A | 6/1998 | Morris et al. |
| 5,764,901 | A | 6/1998 | Skarbo et al. |
| 5,768,510 | A | 6/1998 | Gish |
| 5,778,367 | A | 7/1998 | Wesinger, Jr. et al. |
| 5,778,368 | A | 7/1998 | Hogan et al. |
| 5,787,247 | A | 7/1998 | Norin et al. |
| 5,793,967 | A | 8/1998 | Simciak et al. |
| 5,799,150 | A | 8/1998 | Hamilton et al. |
| 5,812,776 | A | 9/1998 | Gifford |
| 5,815,659 | A | 9/1998 | Umetsu et al. |
| 5,815,664 | A | 9/1998 | Asano |
| 5,835,911 | A | 11/1998 | Nakagawa et al. |
| 5,848,239 | A | 12/1998 | Ando |
| 5,848,246 | A | 12/1998 | Gish |
| 5,859,971 | A | 1/1999 | Bittnger et al. |
| 5,878,233 | A | 3/1999 | Schloss |
| 5,890,162 | A | 3/1999 | Huckins |
| 5,896,533 | A | 4/1999 | Ramos et al. |
| 5,903,727 | A | 5/1999 | Nielsen |
| 5,905,866 | A | 5/1999 | Nakabayashi et al. |
| 5,918,010 | A | 6/1999 | Appleman et al. |
| 5,918,012 | A | 6/1999 | Astiz et al. |
| 5,931,908 | A | 8/1999 | Gerba et al. |
| 5,937,163 | A | 8/1999 | Lee et al. |
| 5,946,699 | A | 8/1999 | Sawashima et al. |
| 5,949,492 | A | 9/1999 | Makovitz |
| 5,956,485 | A | 9/1999 | Perlman |
| 5,964,832 | A | 10/1999 | Kisor |
| 5,973,683 | A | 10/1999 | Cragun et al. |
| 5,983,199 | A | 11/1999 | Kaneko |
| 5,987,510 | A | 11/1999 | Imai et al. |
| 5,999,975 | A | 12/1999 | Kittaka et al. |
| 6,006,018 | A | 12/1999 | Burnett et al. |
| 6,006,251 | A | 12/1999 | Toyouchi et al. |
| 6,012,083 | A | 1/2000 | Savitzky et al. |
| 6,012,098 | A | 1/2000 | Bayeh et al. |
| 6,014,695 | A | 1/2000 | Yamashita et al. |
| 6,016,500 | A | 1/2000 | Waldo et al. |
| 6,023,724 | A | 2/2000 | Bhatia |
| 6,023,765 | A | 2/2000 | Kuhn |
| 6,026,402 | A | 2/2000 | Vossen et al. |
| 6,026,430 | A | 2/2000 | Butman et al. |
| 6,035,330 | A | 3/2000 | Astiz et al. |
| 6,038,590 | A | 3/2000 | Gish |
| 6,047,313 | A | 4/2000 | Hashimoto et al. |
| 6,049,826 | A | 4/2000 | Beser |
| 6,052,730 | A | 4/2000 | Felciano et al. |
| 6,055,512 | A | 4/2000 | Dean et al. |
| 6,058,394 | A | 5/2000 | Bakow |
| 6,058,421 | A | 5/2000 | Fijolek et al. |
| 6,065,038 | A | 5/2000 | Chen |
| 6,070,185 | A | 5/2000 | Anupam et al. |
| 6,088,679 | A | 7/2000 | Barkley |
| 6,201,948 | B1 * | 3/2001 | Cook et al. ................. 434/350 |
| 6,202,066 | B1 | 3/2001 | Barkley et al. |
| 6,301,462 | B1 | 10/2001 | Freeman et al. |
| 6,302,698 | B1 * | 10/2001 | Ziv-El ........................ 434/323 |
| 6,334,141 | B1 | 12/2001 | Varma et al. |
| 6,338,086 | B1 | 1/2002 | Curtis et al. |
| 6,347,333 | B2 | 2/2002 | Eisendrath et al. |
| 6,357,010 | B1 | 3/2002 | Viets et al. |
| 6,381,579 | B1 | 4/2002 | Gervais et al. |
| 6,430,549 | B1 | 8/2002 | Gershfield et al. |
| 6,453,353 | B1 | 9/2002 | Win et al. |
| 6,463,460 | B1 | 10/2002 | Simonoff |
| 6,505,031 | B1 | 1/2003 | Slider et al. |
| 6,546,230 | B1 | 4/2003 | Allison |
| 6,988,138 | B1 | 1/2006 | Alcorn et al. |

OTHER PUBLICATIONS

S.D. Benford, E..K. Burke, E. Foxley, N. Gutteridge, A. Mohd Zin, The Design Document for Ceilidh Ver. 2, Learning Technology Research Computer Science Department, Univ. of Nottingham, UK, Revision 3.2, 30 pages.

S.D. Benford, E.K.Burke, E. Foxley, Developer's Guide to Ceilidh, Learning Technology Research Computer Science Department, Univ. of Nottingham, UK, Revision for Ceildh 3.4, 43 pages.

S.D. Benford, A.N. Bullock, E.K. Burke, E. Foxley, C.A. Gibbon, N. Gutteridge, C. Higgins, A. Mohd Zin, Installer's Guide to Ceilidh (2.6) Learning Technology Research, Computer Science Department, Univ. of Nottingham, UK, Revision for Ceilidh 2.6, 18 pages.

S. Benford, E. Burke, E. Foxley, N. Gutteridge, A.M. Zin, The Ceilidh System, Learning Technology Research, Computer Science Department, Nottingham Univ., UK, Revision 3.2, 7 pages.

S.D. Benford, E.K. Burke, E. Foxley, Student's Guide to Ceilidh, Ver. 2.5, Learning Technology Research, Computer Science Department, Univ. of Nottingham, UK, Revision 3.2, 17 pages.

S.D. Benford, E.K. Burke, E. Foxley, Teacher's Guide to Ceilidh, Ver. 2.7, Learning Technology Research, Computer Science Department, Univ. of Nottingham, UK, Revision 2.7, 16 pages.

E. Foxley, User Guide to Interactive WWW Ceilidh, provisional version 23, Sep. 1996, www.cs.nott.ac.uk, 4 pages.

1997 The Daedalus Group, Inc., Austin, Texas, Integrated Writing Environment for Windows Computers, Version 5.3x, Instructor's Guide, 86 pages.

1997 The Daedalus Group, Inc., Austin, Texas, Integrated Writing Environment for Windows Computers, Version 5.3x, User's Guide, 81 pages.

1997 The Daedalus Group, Inc., Austin, Texas, Integrated Writing Environment for Windows Computers, Version 5.3x, Administrator's Guide with Installation Guide, 73 pages.

1997 by SoftArc Inc., Using the FirstClass Intranet Client, 303 pages.

1997 by SoftArc Inc., User Reference Card, 6 pages.

S. Hazari, Ed.D, Robert H. Smith School of Business, Univ. of Md, College Park, Evaluation and Selection of Web Course Management Tools, 15 pages.

Recommendations for a Course Management/Colloboration Tool, Apr. 30, 1998, http://www.pitt.edu/~washburn/ccs.htm, 34 pages.

Renaissance—Project AC100, Integration of High Performance Services for Interactive, Vocational Training for European Regeneration, Work Package 2, Version 2.1, Feb. 1997, 62 pages.

Renaissance—Project AC100, Integration of High Performance Services for Interactive, Vocational Training for European Regeneration, Work Package 2, Infrastructure Requirements Statement, Version 2.1, Feb. 1997, 62 pages.

T. Barker, Community Based Virtual Learning: A WebCT Physics course, Computer Based Learning Unit Universy of Leeds, UK , 10 pages.

Richard Mende, Learner Reactions to College English on WebCT, Dec. 20, 1999, 36 pages.

D.A. Morss, Ph.D. Atmospheric Sciences Depart. Creighton Univ., P.A. Fleming Ph.D.,, Philosophy Department, Creighton Univ., WebCT in the Classroom: A Student View, 13 pages.

B. Mann, Ph.D., Assoc. Prof. of Edu. Computing, Memorial Univ. of Newfoundland, Oct. 24, 1998, Should we or Shouldn't We: WEBCT Arrives at Edith Cowan Univ., 5 pages.

S. Siekmann, Idaho State Univ., To Integrate Your Language Web Tools—CALL WebCT, 10 pages.

A. Levine, MCLI, Fall 1997, vol. 6, Issue 1, The Labyrinth, Sharing Information on Learning Technologies, 5 pages.

M.J. Van Gorp, P. Boysen, Durham Computation Center, Iowa State Univ., Intl. Jl. Of Edu. Telecommunications (1997) 3(2/3), 279-291, ClassNet: Managing the Virtual Classroom, 13 pages.

P.R. McKey, The Development of the On-line Educational Institute, Southern Cross Univ., Chapters 1-6.
Educom/NLII Instructional Management Systems, Specifications Document, Version 0.5, Apr. 29, 1998, 212 pages.
Janison Solutions, Web Training Toolbox, Getting Started, Australia, Jun. 1999, 102 pages.
Janison Solutions, Web Training Toolbox, Management Guide, Australia, May 1999, 39 pages.
Janison Solutions, Web Training Toolbox, Reviewer's Guide, Australia, Sep. 1999, 102 pages.
G. Paquette, LICEF Laboratory, Canada, Modeling the Virtual Campus, 21 pages.
An Intro. To Role-Based Access Control, 5 pages.
J.F. Barkley, A.V. Cincotta, D.F. Ferraiolo, S. Gavrilla, D.R. Kuhn, Natl Institute of Standards and Technology, Maryland, Apr. 8, 1997, 11 pages.
D.F. Ferraiolo, J.A. Cugini, D.R. Kuhn, Natl Institute of Standards and Tech., Dept. of Commerce, Maryland, Role-Based Access Control (RBAC): Features and Motivations, 8 pages.
D.F. Ferraiolo, D.R. Kuhn, Natl Institute of Standards and Tech., Dept. of Commerce, Maryland, Role-Based Access Control, Proceedings of 15th Natl Computer Security Conference 1992, 11 pages.
S.I. Gavrila, VDG Inc.,, Formal Spec. for Role Based Access Control User/Role and Role/Role Relationship Management.
D.R. Kuhn, Natl Institute of Standards and Technology, Maryland, Mutual Exclusion of Roles as a Means of Implementing Separation of Duty in Role-Based Access Control Systems.
R.S. Sandhu, E.J. Coyne, H.L. Feinstein, C.E. Youman, Role-Based Access Control Models, IEEE Computer, vol. 29, No. 2, Feb. 1996, pp. 38-47.
F.T. Hofsteller, Univ. of Delaware, AACRAO Policy Summit, Virtural Learning Environments.
F.T. Hofsteller, Univ of Delaware, May 19, 1999, Three Waves of the Serf Web-based Teaching and Learning Environ.
F.T. Hofsteller, Univ of Delaware, Jan. 22, 1998, Serf® User Guide, Version 1.0.
TopClass Version 2.0.0, Administrator's Guide.
TopClass Version 2.0.0, Instructor's Guide.
vloverview.txt, Product Overview, 2 pages.
Creating and Customizing a Course, Student's View (6 pages, 13 slides).
The Instructor's Guide to The Interactive Learning Network Ver 1.5.
CouseInfo's Interactive Learning Network v1.5, User Manual.
CourseInfo v.2.0 beta, Bb Instructor Manual, Instructure Guide, 121 pages.
TopClass, Version 1.2.2b, Administrator's Guide.
1: TopClass—An Overview, 1997 WBT Systems.
Chapter 3: Getting Started, TopClass Administrator's Guide.
Chapter 7: Database Maintenance, TopClass Administrator's Guide.
7: Database Maintenance, 1997 WBT Systems, pp. 105-134.
Portal, The Guide to Computing Literature, Information Sharing (solution session): collaborating across the network.
Enhancing teaching using the Internet, Report of the Working Group on the World Wide Web as an Interactive Teaching Resource.

* cited by examiner

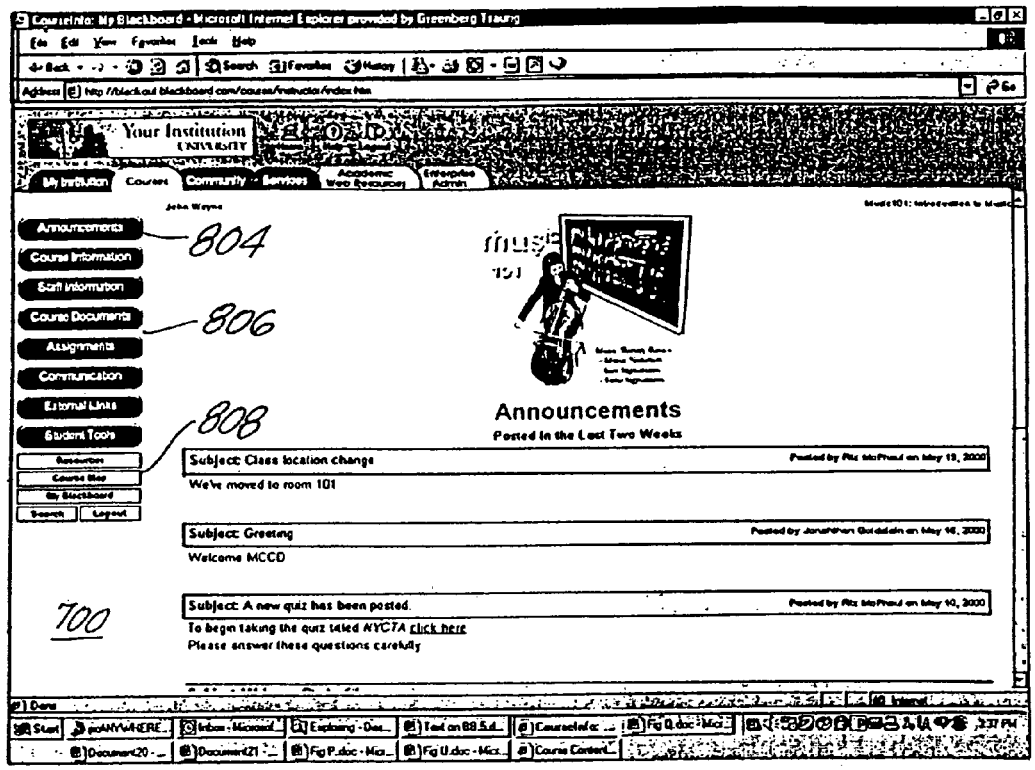
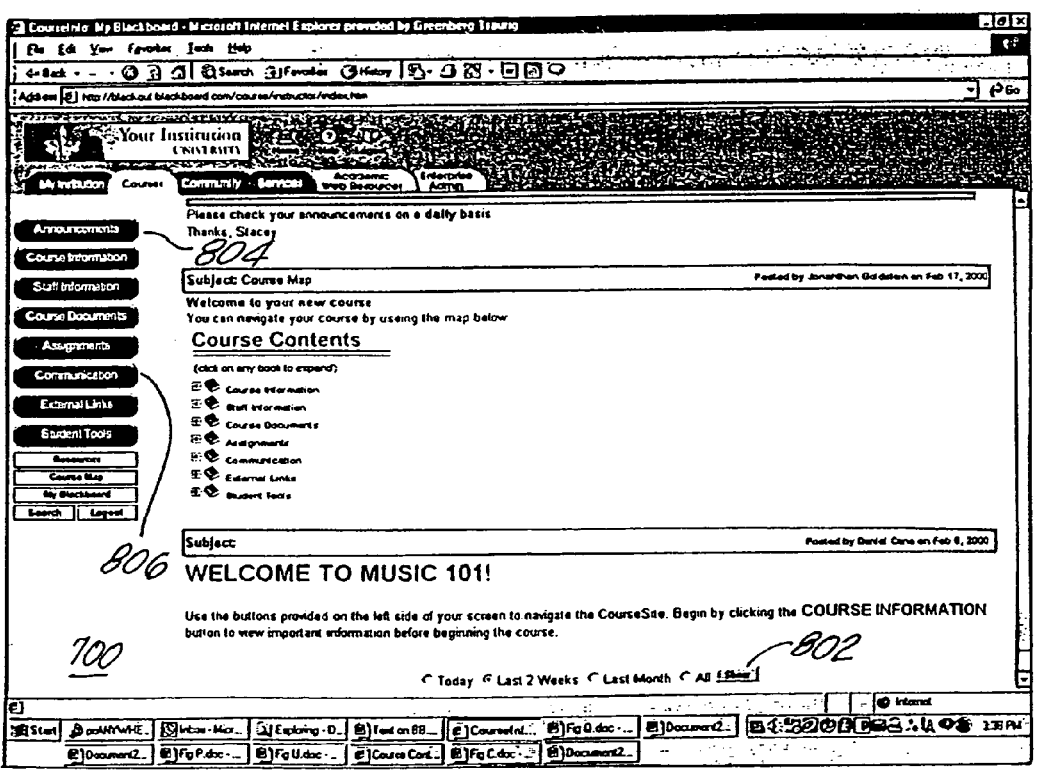
FIG.8

FIG.11

John Wayne
Student Tools

Student DropBox

Use your student drop box to submit files to your instructor. Also, your instructor can return your files to you with comments attached.

 Current Files in your DropBox —1508

Note: If you want to save a file, right click on the Link Name and choose *Save Link As*

| File Name | Link Name | File Size | Status |
|-----------|-----------|-----------|--------|
| none | none | none | none |

[ Remove Files ]
1510

 Add File to DropBox

Click the *Browse* button to select the file to attach from your computer.
Be sure to specify a linkname for your file.         1502  1504

File to Upload:                    [_____][Browse...]

Name of Link to File:              [_____]
(Example: *Homework One, Assignment One*)

[ Send File to Instructor ]
                                                              1506

◄ Back           1500

COURSES » INTRODUCTION TO MUSIC

MUSIC101: Introduction to Music

Course Gradebook

Students whose last names begin with: [Show All ▼]
Items that are grouped by: [Show All ▼] [Go]

| ✓ - completed<br>- no Info<br>! - taken, but ungraded | | Participation<br>Participation<br>Edit | Space 301-c Quiz<br>Quiz<br>Edit | Assignment #1<br>Assignment<br>Edit | Total Points |
|---|---|---|---|---|---|
| Arnold, Jeremy | Edit | - | - | - | 0 |
| Baggins, T. | Edit | 80 | 50 | 50 | 315 |
| Bell, Norman | Edit | - | 10 | - | 10 |
| Cane, Jon | Edit | 72 | 25 | 35 | 251 |
| Chasen, Michael | Edit | - | 25 | - | 25 |
| Chi, Timothy | Edit | 92 | 35 | 50 | 311 |
| Clark, Andrea | Edit | 100 | 20 | 50 | 285 |
| Clark, Jim | Edit | 75 | - | 50 | 220 |
| Cox, Meg | Edit | - | 25 | - | 25 |
| Davies, Greg | Edit | - | - | - | 0 |
| witkowski, francis | Edit | - | 10 | - | 10 |
| Points Possible | | 100 | 35 | 50 | 335 |

COURSES > INTRODUCTION TO MUSIC > CONTROL PANEL > COURSE STATISTICS > REPORT

Course Statistics

*Statistics Generated on Thursday, February 24, 2000 11:26:28 AM*
*Note: You may have to reload/refresh this page for the images to be correct.* — 2300

Total Number of Accesses per Area — 2302
Number of Accesses over Time — 2304
User Accesses per Hour of the Day
User Accesses per Day of the Week — 2306
Total Accesses by User — 2310   2308

Total Number of Accesses per Area — 2302

| Area Name | Hits | Percent |
|---|---|---|
| Content Areas | 139 | 83.2 % |
| Communication Areas | 10 | 5.98 % |
| Group Areas |  | 0 % |
| Student Areas | 15 | 8.98 % |
| Total | 167 | 100 % |

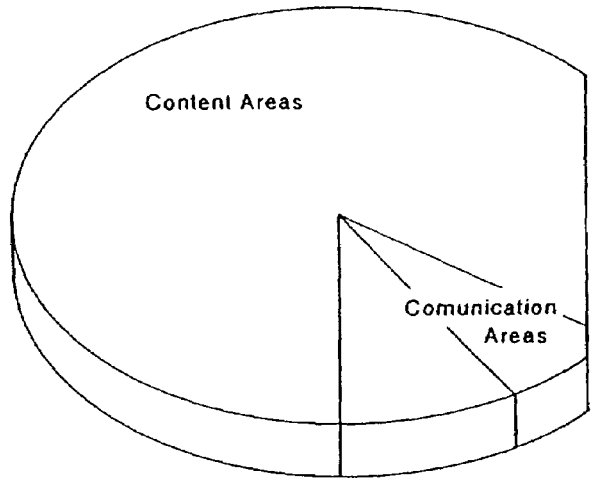

Number of Accesses over Time — 2304

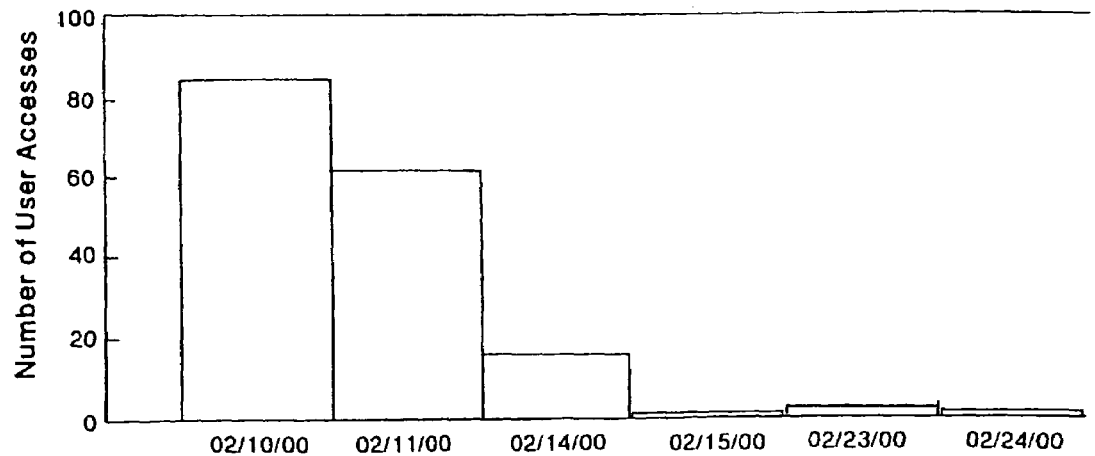

FIG. 23A

User Accesses by Hour of the Day — 2306
| Hour of The Day | Hits | Percent |
|---|---|---|
| 8 | 1 | 0.59 % |
| 9 | 7 | 4.19 % |
| 10 | 94 | 56.2 % |
| 11 | 15 | 8.98 % |
| 12 | 4 | 2.39 % |
| 13 | 22 | 13.1 % |
| 15 | 1 | 0.59 % |
| 16 | 3 | 1.79 % |
| 17 | 14 | 8.38 % |
| 22 | 3 | 1.79 % |
| 23 | 3 | 1.79 % |
| Total | 167 | 100 % |
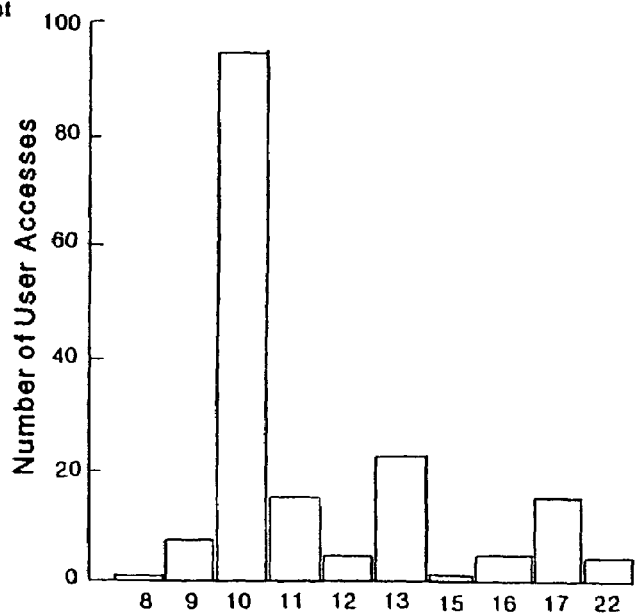
User Accesses by Day of the Week — 2308
| Day of The Week | Hits | Percent |
|---|---|---|
| Monday | 16 | 9.58 % |
| Tuesday | 1 | 0.59 % |
| Wednesday | 2 | 1.19 % |
| Thursday | 86 | 51.4 % |
| Friday | 62 | 37.1 % |
| Total | 167 | 100 % |
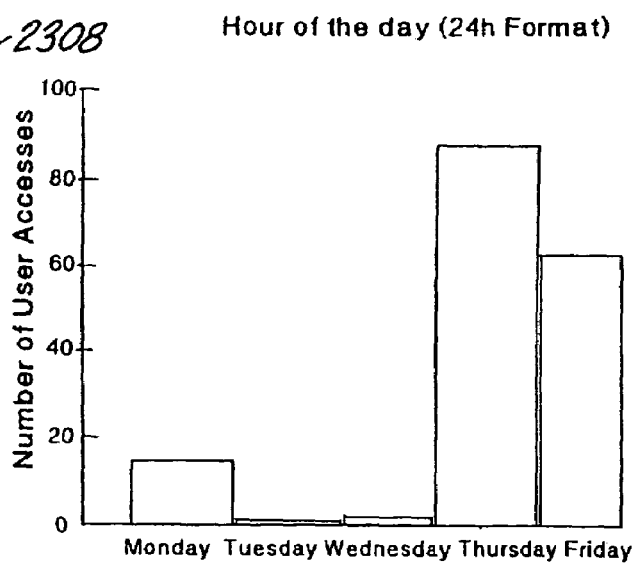
2300
FIG.23B

Linking to the E-Commerce Server

Myserver.blackboard.com

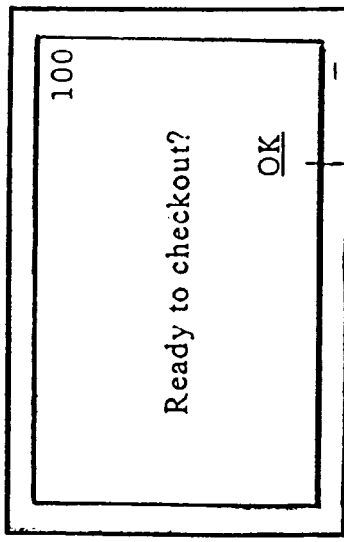

Ready to checkout?

OK

The link to butter passes the following information:

name: Name of the purchaser
address_1
address_2
city
state
zip
country
price: price in USD that the user is being asked to pay
order-id: null if butter should generate an order number (default)
order-descr: Text description of what the user is buying.
url: the location the refering server that butter should return the user to after the payment process is complete hyperlink Butter blackboard.com
Linux.Apache,PerlCGI

First E-Commerce Screen Display

Butter.blackboard.com

Accepts VISA, MC, Diner's Club, JCB and Carte Blanche (but not Amex)

Whatever user info is available is populated from the data passed from the previous page.

The unique order number displayed is dynamically generated by the server.

The Chosen services and price displayed are passed in from the previous screen.

The look and feel of this plate (and all butter e-commerce pages) can be modified by an HTML template. This template is selected as one of the script parameters.

FIG.35

Authorization Process
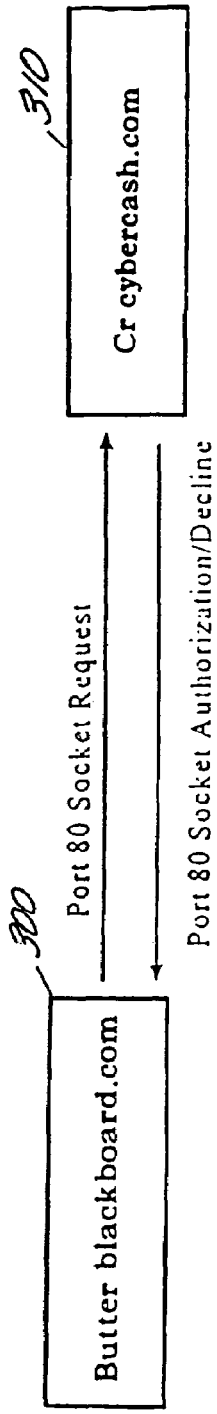
Butter blackboard.com
Port 80 Socket Request →
← Port 80 Socket Authorization/Decline
Cr cybercash.com
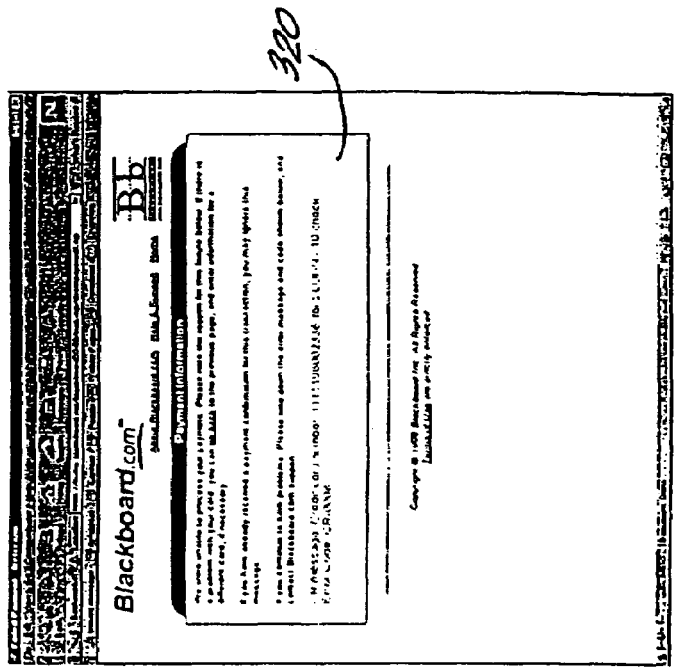
- The authorization process takes a minute or so.
- If the card is rejected, a page like the one at right is displayed.
- If the card is accepted, the payment goes through, and the page on the next slide is shown.
FIG.36

Second E-Commerce Screen Display

Butter.blackboard.com

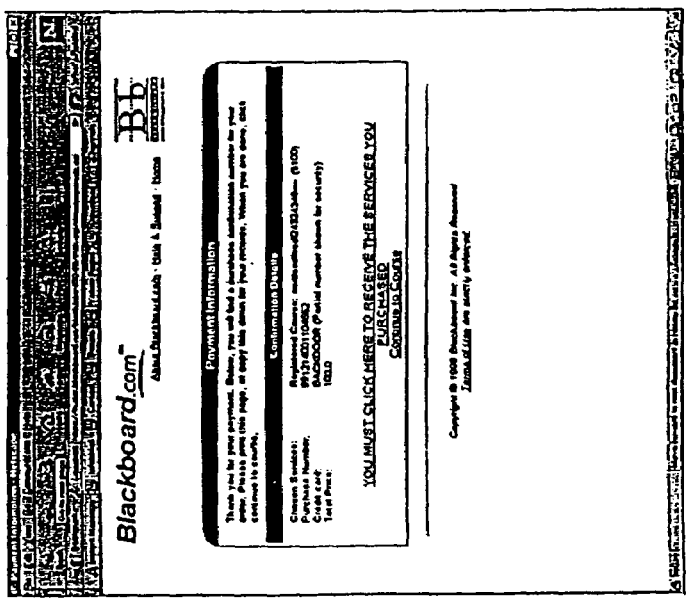

Payment is authorized and queued at Cybercash, Inc for processing.

The payment will go through and appear in Blackboard's Cybercash account within 12 hours.

There is no way that the user can back out at this point without Blackboard issuing a manual refund.

No services are provided yet. The user must follow the link at the bottom of the page, or he will receive nothing for his money.

All links on this page are disabled except the one that says "YOU MUST CLICK HERE". This prevents users from failing to get their orders filled.

A authorization code is calculated by the script as a secure hash of the purchase price, the order id, and a secret number.

FIG.37

Returning to the Originating Server

Butter.blackboard.com

- The link at the bottom of the page points back to the referring server using the location passed in the URL parameter to the first butter script.

- The authorization code, the order_id and a subset of the credit card digits (show_card) are passed back as parameters.

- The authorization code should be checked upon return by making an identical hash calculation. If the two hash values match, the order should be fulfilled, otherwise, and error should be shown.

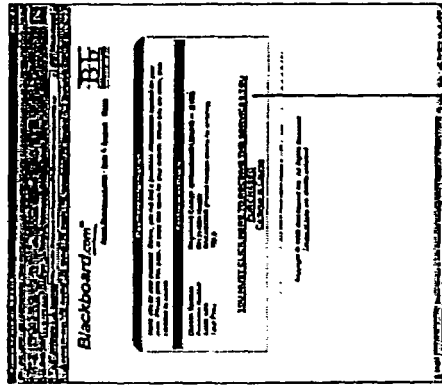

FIG.38

INTERNET-BASED EDUCATION SUPPORT SYSTEM AND METHODS

CROSS REFERENCE TO RELATED APPLICATIONS

This patent application is a continuation of U.S. patent application Ser. No. 11/251,110, filed on Oct. 13, 2005, which is a continuation of U.S. patent application Ser. No. 09/608,208, filed on Jun. 30, 2000, now U.S. Pat. No. 6,988,138 which is based on and claims filing priority from co-pending U.S. Provisional Application Ser. No. 60/141,283, filed on Jun. 30, 1999; co-pending U.S. Provisional Application Ser. No. 60/141,864, filed on Jul. 1, 1999; and co-pending U.S. Provisional Application Ser. No. 60/187,890, filed on Mar. 8, 2000, all of which are incorporated herein by reference in their entirety.

BACKGROUND OF THE INVENTION

The present invention relates generally to systems and methods for the exchange of information between instructors and students in an educational context. More specifically, the present invention relates to systems and methods in which an educational instructor interacts with one or more non-collocated students by transmitting course lectures, textbooks, literature, and other course materials, receiving student questions and input, and conducting participatory class discussions using an electronic network such as the Internet and World Wide Web. The present invention also relates to the provision of an infrastructure that allows for on-line registration and tuition payment of educational courses.

The ability of educators, including educational institutions, private corporations, and institutions of higher learning, to reach potential students has generally been limited by geography. In most instances, a potential student must physically move to within commuting distance or onto a campus in order to have access to course instructors, classes, and materials. Furthermore, potential students and persons seeking knowledge of all sorts are generally limited to proximate sources of courses of instruction, tutoring, or training. Due to these limitations, a prospective student must either seek to learn a given subject from whatever local means of instruction is available to her or move her household in order to be able to access her preferred sources of instruction. Many prospective students are deprived of receiving instruction from other, possibly better-qualified instructors or institutions located outside of their immediate locale. Similarly, educational institutions have been limited to serving only those students located within commutable distance of their campuses.

The advent of networked computers and communications has afforded a partial solution to these limitations. In particular, the widespread use and availability of electronic networks such as the Internet and the World Wide Web have made it possible for students and educators to overcome geographic dispersion and physical location as a barrier to education. Using this electronic medium, students and instructors are able to exchange information including (live or transcribed) classroom lectures, homework assignments, texts and materials, grading, (live or transcribed) question and answer interaction sessions, and other related information to effect a traditional learning or educational experience regardless of physical location.

However, electronic networks, including the Internet, are complex technological systems requiring the user to have or acquire specialized knowledge in order to use them effectively. Even graphical user interfaces (GUIs) designed to enhance simplicity of use, such as that provided by the World Wide Web, may require specialized knowledge of network terminology and technical aspects. For example, an Internet user's ability to access information using that medium is significantly reduced if the user lacks understanding of how to use Uniform Resource Locators (URLs) to traverse (i.e., navigate) web pages. Slow adoption of new technology and lack of technological sophistication have a chilling effect on the widespread use of the medium in general. Applied specifically in an educational context, these chilling factors apply to instructors who, while possessing high expertise in their respective intellectual or educational fields, would be required to further attain technological knowledge necessary to effectively use the Internet to educate non-collocated students.

Furthermore, the complexity of using the Internet for educational purposes is compounded as the number of user choices required at the user interface increases because not only must the instructor and students acquire technological competency in the use of the medium, but they must in addition understand the presentation and consequences of a plethora of choices required by a particular user interface (e.g., a web page). The design of the user interface therefore can be critical in enabling widespread use of the medium in an educational context. Solutions other than the present invention may be characterized as having relatively complicated and confusing user interfaces. Users, including both students and instructors, of these other solutions are confronted with one or more web pages that typically require the user to review and select a subsequent web page or function from among a large array of potential user choices, thereby complicating the user's task of interacting with the system.

Further, many educational institutions have existing or legacy network-based systems which students access to obtain various types of information (e.g., class schedules). The addition of yet another network-based system requires the host or sponsoring institution to incur implementation and maintenance costs associated with the installation, integration, administration, and maintenance of a new network-based system. These costs place limits on the achieving the widespread use of the medium for educational purposes.

Further, access, presentation, and aggregation of information contained in existing networks are provided from the institution's perspective and not an individual student's perspective. Typically, a student must access different locations or web pages of an institution's network for each datum she wishes to inspect. Further, a student may have to log-on to multiple networks in order to access different items of data. For example, a student may wish to view his financial aid status before registering for an upcoming course or semester. In existing networks, the student will have to traverse multiple web pages and possibly log-on to multiple networks in order to access his current financial aid status, assess that information, and then register online taking into account his particular information. Many similar situations are commonplace involving access to grading information, class schedule, exam materials, student group meetings, and other such information. Existing systems, in short, aggregate course, institution, and student information in an institution-centric manner. This imposes a time cost upon each student/user of the existing systems in order to reduce complexity from the institution's implementation and maintenance perspectives. However, given that these time costs are imposed on all students, the sum of these distributed costs outweigh the cost savings realized by the institution in the institution-centric approach, resulting in a net loss.

Further, instructors' teaching techniques are greatly variable, based on personal preference and the subject matter being taught. Network-based systems that do not provide for a significant degree of customization are ill-suited to address to this need to accommodate diverse teaching modes in a single system.

Further, a general concern with use of the electronic network medium is that response time tends to slow as more users are added to the system. As response time becomes prohibitive, the time- and cost-effectiveness associated with using the medium for educational purposes is greatly reduced.

Many colleges and universities have stayed away from allowing on-line registration and tuition payment for a number of reasons, including high initial setup costs and incompatible billing practices.

The exception to this rule are so-called virtual schools. Virtual schools traditionally charge an enrollment fee, and then offer free courses. In lieu of paying for each course taken, a student is subjected to advertising while viewing on-line course material. While such billing and income generation methods may be acceptable for companies providing on-line training, such methods are not consistent with traditional college and university billing practices. Colleges and universities typically charge a low enrollment fee and bill students on a per-credit or per-course basis.

Therefore, it is a general object of the present invention to provide a system and methods that allow users to interact with a computer network-based education support system through means of a simplified, easy-to-use user interface.

A further general object of the present invention is to provide a system that can be easily integrated with existing computer network and backend systems with minimal disruption to existing operations and systems.

A still further general object of the present invention is to provide a system that is scalable in order to accommodate increasing numbers of users, such that system responsiveness is not materially degraded as the number of users of the system grows to an increasingly large number.

A still further general object of the present invention is to provide a system and methods that can accommodate a variety of diverse teaching modes without requiring substantial modifications to the system.

A further object of the invention is to provide such a system that allows multiple types of users to access the features of the system as a function of their predefined role within the framework of the system (e.g. student, teacher, administrator).

It is a further object of the invention to provide such a system that integrates with the education platform provided therein value added services and control such as calendar, task, contact and communication functions.

These as well as other objects of the present invention are apparent upon inspection of this specification, including the drawings and appendices attached hereto.

SUMMARY OF THE INVENTION

In accordance with these and other objects, provided is a system for providing to a community of users access to a plurality of online courses, comprising a plurality of user computers and a server computer in communication with each of the user computers over a network. Each user computer is associated with a user of the system having predefined characteristics indicative of a predetermined role in the system. Each role provides a level of access to data files associated with a course, and a level of control over data files associated with a course. The server computer has means for storing data files associated with a course, means for assigning a level of access to each file, wherein the level of access is associated with the ability of a user to access the file, means for determining an access level of a user requesting access to a file, and means for allowing access to a file associated with a course as a function of the access level of the user.

The user roles comprise a student role associated with a student user, an instructor role associated with an instructor user, and an administrator role associated with an administrator user (roles may be mixed; for example when an instructor of one course, is also a student in another course). The instructor user is provided with an access level to enable the creation and editing of a plurality of course files associated with a course. The course files include an announcement file, a course information file, a staff information file, a course documents file, an assignments file, a dropbox file, an asynchronous communication file, and a synchronous communication file.

The student user is provided with an access level to enable reading of course files associated with a course. The student user is also provided with an access level to enable modification of some of the files associated with a course. Also, the user may be provided with an access level to enable creation of a student file associated with a file for which the student user is able to read. The file that the student is able to read may be an assessment file created by the instructor user, and the student file created by the student user is a response to the assessment file. The assessment file may be a plurality of examination questions selected by the instructor user to assess the ability of the student user. The examination questions may be selected by the instructor user from a predetermined pool of available examination questions. The examination questions also may be created by the instructor user substantially at the time of the creation of the assessment file and optionally added to the pool. The student file may be reviewed by the instructor user and assigned a grade, which would be made available online to the student user. The instructor user may collate the grades obtained from reviewing a number of student files, and the collated grades may be made available online to all student users associated with the course (e.g.: an average for the class, a pie or bar chart, etc.).

The student will also be able to read an assignment file created by the instructor user, and the student file created by the student user is a response to the assignment file.

The "digital dropbox" may contain a plurality of files transferred to the server computer from one or more student users associated with the course. The instructor user may be provided with access to the files in the dropbox file, whereby the instructor user may download, edit and upload the files in the dropbox.

A user may be required to enter a login sequence into a user computer in order to be provided with access to course files associated with that user. The user is then provided with access to all courses with which the user is associated after entry of the logon sequence. The user is provided with a web page comprising a plurality of course hyperlinks, each of the course hyperlinks associated with each course that the user has been enrolled either as an instructor or as a student. Selection of a course hyperlink will provide the user with a web page associated with the selected course; the web page having content hyperlinks and buttons to various content areas associated with the course. The content hyperlinks and/or buttons include an announcement area hyperlink, a course information hyperlink, a staff information hyperlink, a course documents hyperlink, an assignments hyperlink, a communications hyperlink, and a student tools hyperlink. Selection of the announcement area hyperlink provides a web page including a group of course announcements. Selection of the course information hyperlink provides a web page including information regarding the associated course. Selection of the staff information hyperlink provides a web page including data regarding the instructors of the associated course. Selection of the course documents hyperlink provides a web page including a listing of documents associated with the course, which may be active hyperlinks to the documents. Selection of the assignments hyperlink provides a web page including a group of course assignments. Selection of the communications hyperlink provides a web page including hyperlinks to a group of communication tools including an asynchronous communication tool and a synchronous communication tool.

In another aspect if the invention, provided is a system for providing to a community of users access to online courses, including a server computer in communication with user computers over a network, wherein the server computer has means for creating course user accounts from a file of existing user accounts associated with an external computer. In this manner, existing legacy systems having large members of user accounts stored in memory may be integrated with this system without having to re-enter user data into the system (so-called batch enrollment).

In yet another aspect of the invention, provided is a method for providing online education, which includes the steps of establishing a course to be offered online, offering the course to be taken online to a group of student users; and providing access over the network to the course files to a student user who has enrolled in the course. The establishment of the course includes an instructor user generating a set of course files for use with teaching the course, then transferring the course files to a server computer for storage thereat, and then making access to the course files available to a predefined community of student users having access to the server computer over a network.

Preferably, at least one of the course files comprises a course assignment, and the student user creates a student file in response to the course assignment and transfers the student file to the server computer. The instructor user accesses the student file from the server computer, reviews the student file to determine compliance with the course assignment, and the instructor user assigns a grade to the student file as a function of the determination of compliance with the course assignment. The instructor user may post the grade to a file on the server computer accessible only to the student user with which the grade is associated. The instructor user may repeat these steps for a number of student users that are enrolled in the course, and then perform a statistical analysis on the grades assigned to the student users. The results of the statistical analysis may be made available to the student users enrolled in the course.

An asynchronous communication tool accessible to student users enrolled in the course may be provided for enabling asynchronous communication amongst the student users. Likewise, a synchronous communication tool accessible to student users enrolled in the course may be provided for enabling synchronous communication amongst the student users.

The present invention also enhances the prior art by providing a flexible infrastructure for colleges, universities, and other institutions wishing to facilitate on-line registration and tuition payment. More specifically, the present invention can accommodate different billing methods, including, but not limited to, billing on a per-credit-hour basis, and billing on a per-registrant basis. Tuition may be paid by credit card, debit card, check, or other verifiable payment method. Payment verification may be performed by the present invention, or the present invention may interface with third-parties providing payment verification services. In addition, the present invention allows on-line billing information to easily interface with a college, university, or other institution's standard billing practices. Integrating with existing billing practices simplifies transition to automated systems.

In addition, the present invention may be configured as an open system wherein anyone can connect to a server over the Internet and create a course online that may be taken by anyone else connected over the Internet. Thus, anyone may create a virtual classroom available to anyone else, regardless if they are affiliated with a particular institution such as a University. For example, a lawyer may create a course in patent law online, and configure the system to require entry of a password to enroll. The lawyer may then disseminate the passwords to desired students who can enroll in the course. Alternately, the lawyer can request the system to require payment to enroll in the course such as by credit card.

BRIEF DESCRIPTION OF THE DRAWINGS

FIG. 8 is a screen shot of the announcements provided to a student user;

FIG. 11 is a screen shot of the course documents web page;

FIG. 15 is a screen shot of the student drop box web;

FIG. 17 is a screen shot of the announcements web page;

FIG. 22 is a screen shot of the course gradebook web page;

FIGS. 23A and 23B are a screen shot of the course statistics web page;

FIG. 29 is a screen shot of the create a course web page;

FIGS. 30A and 30B are a screen shot of the create user web page;

FIG. 34 is a block diagram illustrating information passed from a course registration server to a payment server;

FIG. 35 is a sample of a payment form;

FIG. 36 is a block diagram illustrating interaction between a payment server and a payment validation server;

FIG. 37 is a sample of a payment information page;

FIG. 38 is a block diagram illustrating post-order processing;

DETAILED DESCRIPTION OF THE PREFERRED EMBODIMENTS

Figure 39:
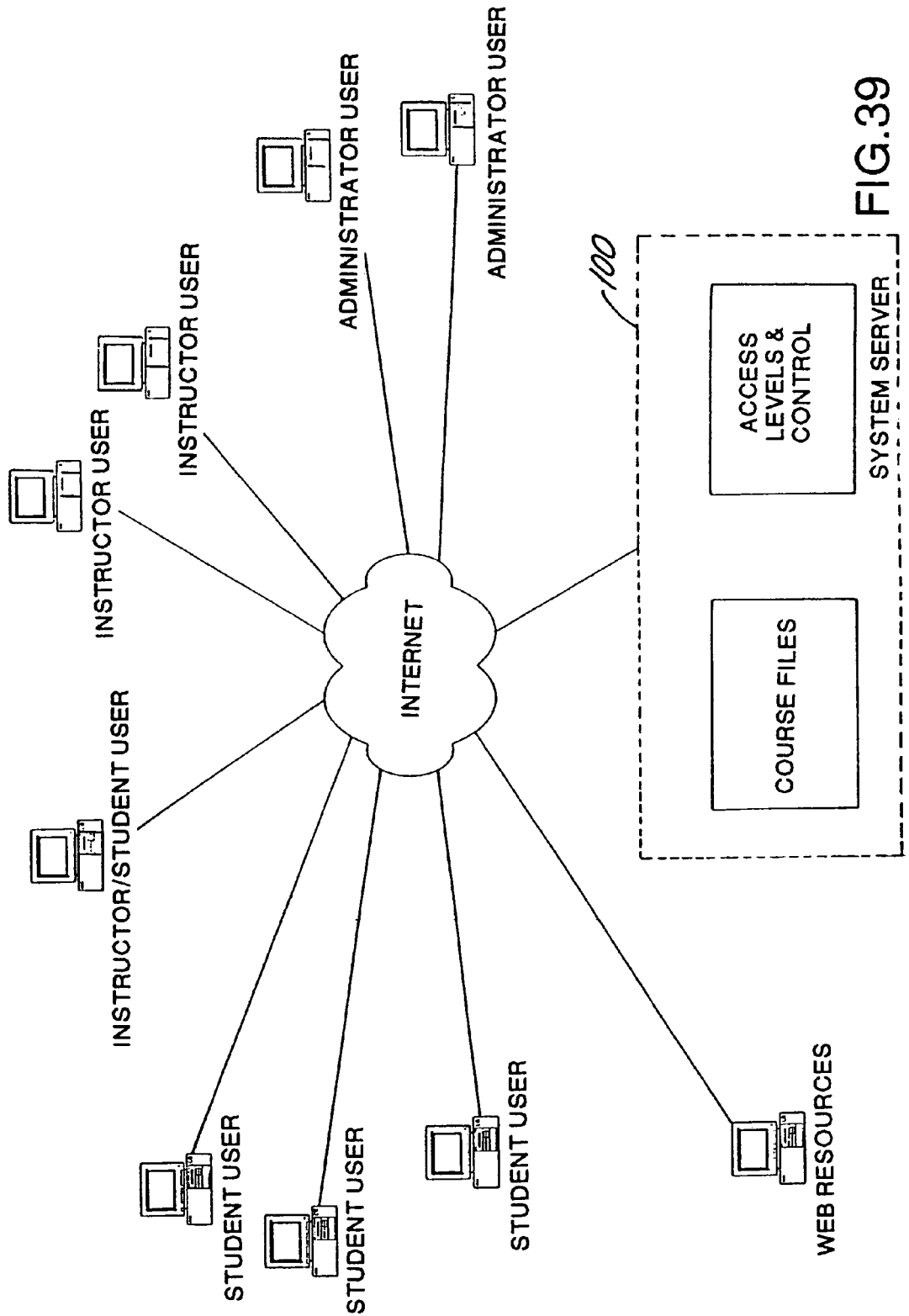
FIG. 39 is an overall block diagram of the system.

Referring to FIG. 39, the present invention comprises a system and methods for the exchange of course content and related information between non-collocated instructor users and student users. An instructor user interacts with one or more non-collocated student users by using the system and methods of the present invention to, without limitation, transmit course files including course lectures, textbooks, literature, and other course materials, receive student questions and input, and conduct participatory class discussions using an electronic network such as the Internet or World Wide Web. Access to the course file is controlled by access levels and control logic, to ensure integrity and security of the system. Also, administrator users have access to the system to perform administrative tasks as defined herein.

System Architecture

Figure 1:
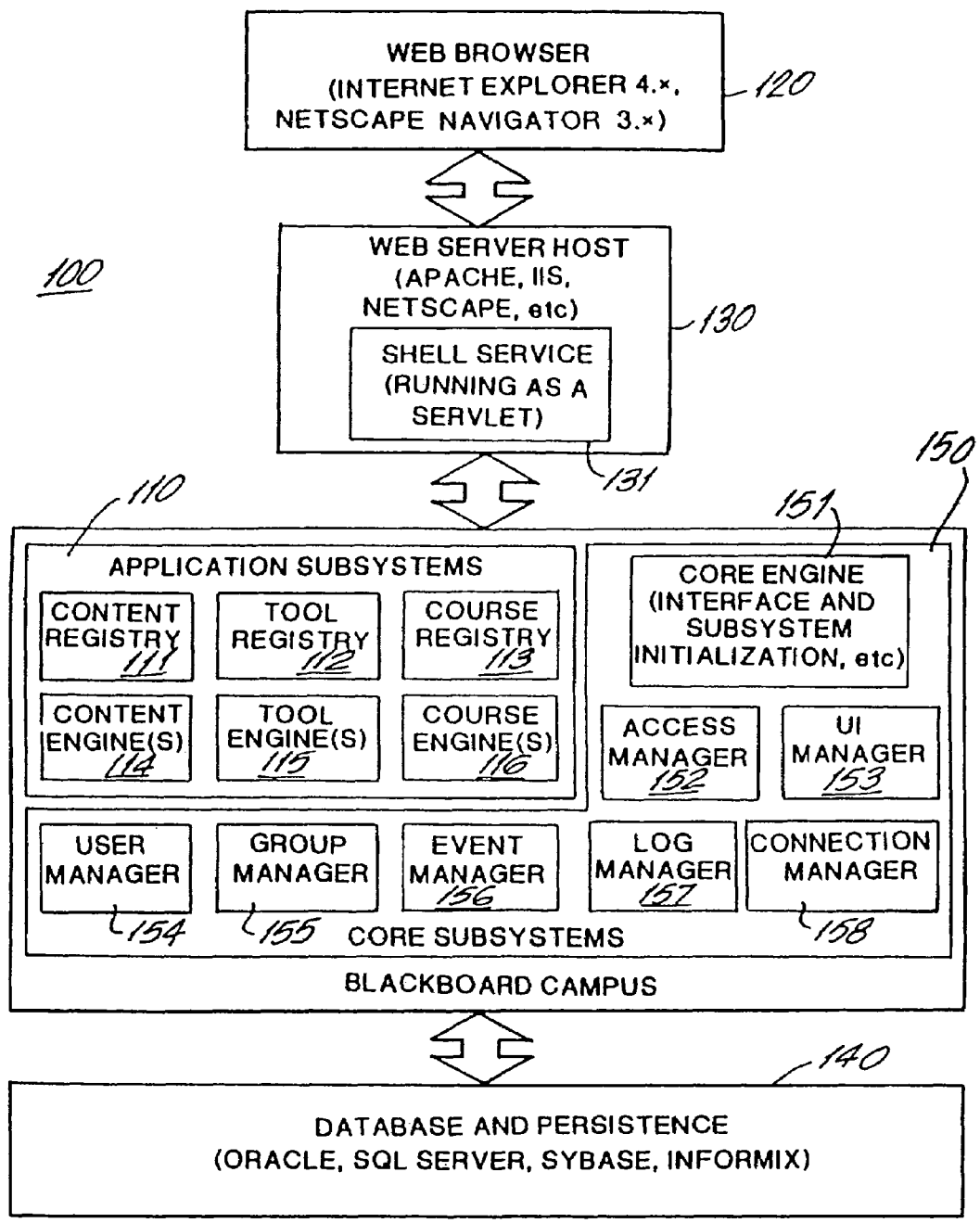
FIG. 1 is an architectural block diagram of a preferred embodiment of an education support system according to the present invention.

The system architecture of a preferred embodiment of an education support system 100 according to the present invention is presented in FIG. 1. Referring now to FIG. 1, education support system 100 comprises application subsystems 110, a web browser 120, a web host server 130, a database subsystem 140, and core subsystems 150. Web host server 130 further comprises a shell service 131. Applications subsystems 110 further comprise a content registry 111, a tool registry 112, a course registry 113, one or more content engines 114, one or more tool engines 115, and one or more course engines 116. Core subsystems 150 further comprise a core engine 151, an access manager 152, a user interface (i.e., UI) manager 153, a user manager 154, a group manager 155, an event manager 156, a log manager 157, and a connection manager 158.

In a presently preferred embodiment, education support system 100 is implemented in a client-server network topology. Users (who may have one or several roles such as a student, instructor, teaching assistant (TA), or administrator) access and interact with education support system 100 via web browser 120. More specifically, a user accesses application subsystems 110 and core subsystems 150 through shell service 131 servlet providing a standard Internet interface including, but not limited to, TCP/IP, HTTP, SMTP, and FTP to the user via web browser 120 running on a standard computing platform such as a personal computer or workstation. Specifically, shell service 131 servlet uses the URL-encoded information contained in HTTP requests received from web browser 120 clients to invoke the corresponding requested application subsystem 110 or core subsystem 150. Shell service 131 servlet also provides user authentication and session management.

Figure 3:
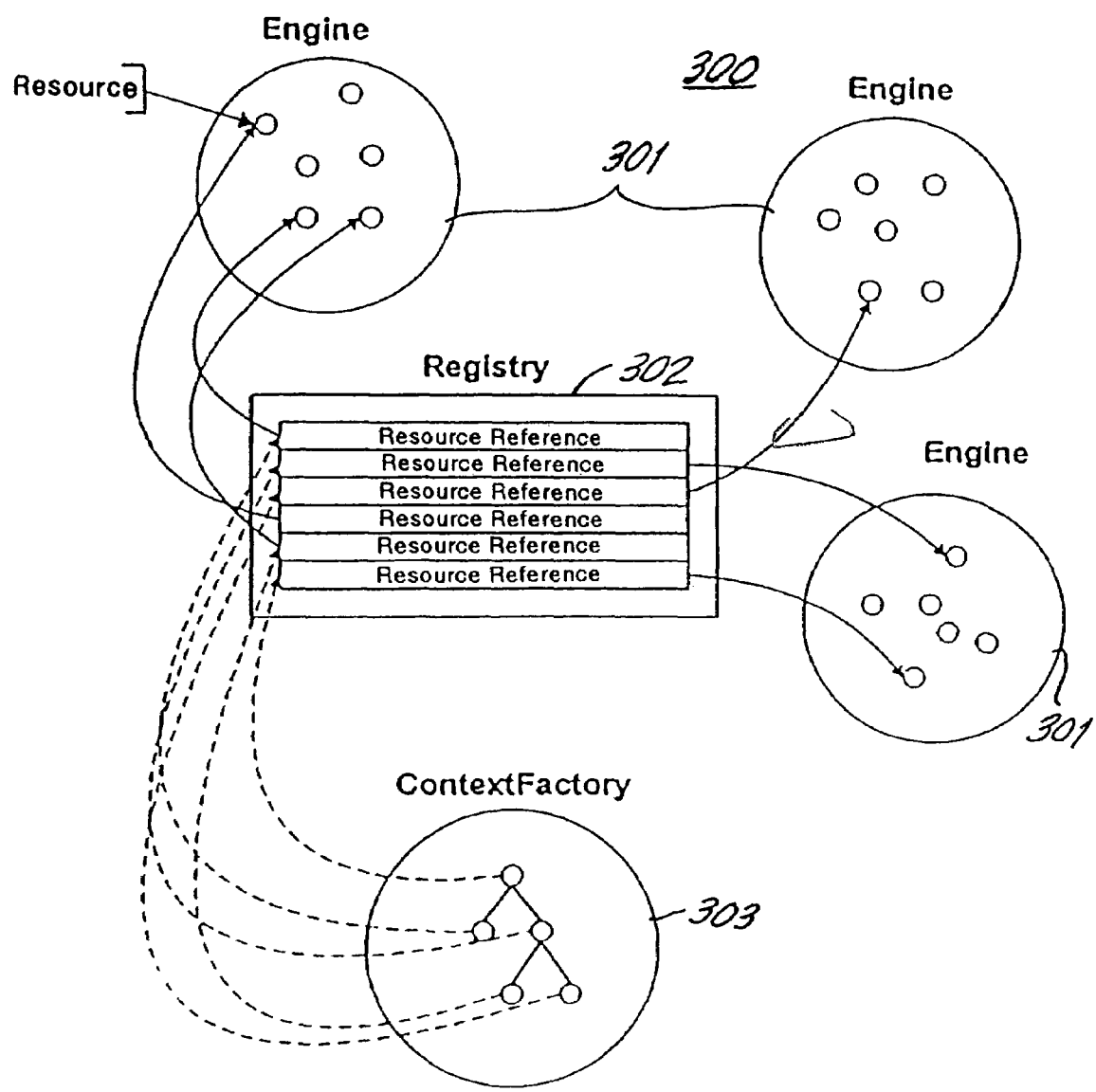
FIG. 3 illustrates the functioning of a preferred embodiment of an engine/registry model according to the present invention.

Application subsystems 110 function in conformance with an engine/registry model 300 as described in FIG. 3. Generally, engine/registry model 300 comprises one or more engines 301, a registry 302, and a context factory 303. Engines 301 include, but are not limited to, content engine(s) 114, tool engine(s) 115, course engine(s) 116, and core engine 151. Registries 302 include, but are not limited to, content registry 111, tool registry 112, and course registry 113. Course engine(s) 116 creates a course by associating together a set of educational materials to which a student user has access, by organizing references to these informational items as contained in content registry 111. Specifically, course engine(s) 116 queries content registry 111 for an index to the content engine 114 associated with a particular resource being requested by a user.

Content engine(s) 111 includes an assessment engine that generates quizzes to assist and instruct users in the use of education support system 100. For example, one such quiz provided by an assessment engine of education support system 100 provides step-by-step instructions to an instructor for building a course. The quiz is then administered online to the instructor to allow him to build a customized course to be provided using education support system 100.

Unlike content engines 111 which represent actual course content, tool engine(s) 115 generally comprise installable programs that provide capabilities available for use with a plurality of courses and not fixedly associated with any particular course or courses.

Instructors have different preferred modes of teaching. Further, the same instructor may emphasize different modes of teaching depending upon the subject being taught. For example, some instructors emphasize individual homework while others prefer a group or collaborative approach. Education support system 100 supports a variety of teaching methods. By invoking a particular set of tool engines 115 during interaction with the assessment engine, an instructor can customize a course offering to conform to her preferred mode of teaching. An example of a tool engine 115 is the chat/whiteboard communication tools (synchronous and/or asynchronous) provided by education support system 100 that allows for student group interaction and collaboration associated with a given course. Other tools include, but are not limited to, announcements for broadcast of group-oriented messaging, a calendar mechanism for storing date-related events and information, a discussion board for posting questions and answers in a threaded discussion format, notes-editing, group pages, and email services. Further capabilities provided by education support system 100 include, but are not limited to, a catalog listing of all courses available, means for student users to enroll in either open enrollment or closed enrollment situations, means for course creation including course templates and course themes, a course/page editor and viewer, a site page editor and viewer, means for making and disseminating announcements, a calendar function, a chat board in the nature of an online discussion, a white board allowing group interaction and display of free-form information using, for example, Microsoft Paint™, means for sending email between instructors and students and groups of students, a list of course members and links to their web pages, a list of groups and links to their web pages, a file sharing area, means for providing assignments to student users, means for conducting a variety of types of student assessments (i.e., testing), means for providing lesson material in sequential format, means for adding and removing users, help documents, maintaining a grade book and progress tracking, links to personal web pages or home pages, and a resource library containing references to all uploaded content. Course templates allow instructors to easily reuse a course structure for subsequent courses. Course themes allow the instructor to affect the look and feel of the course site.

Figure 4:
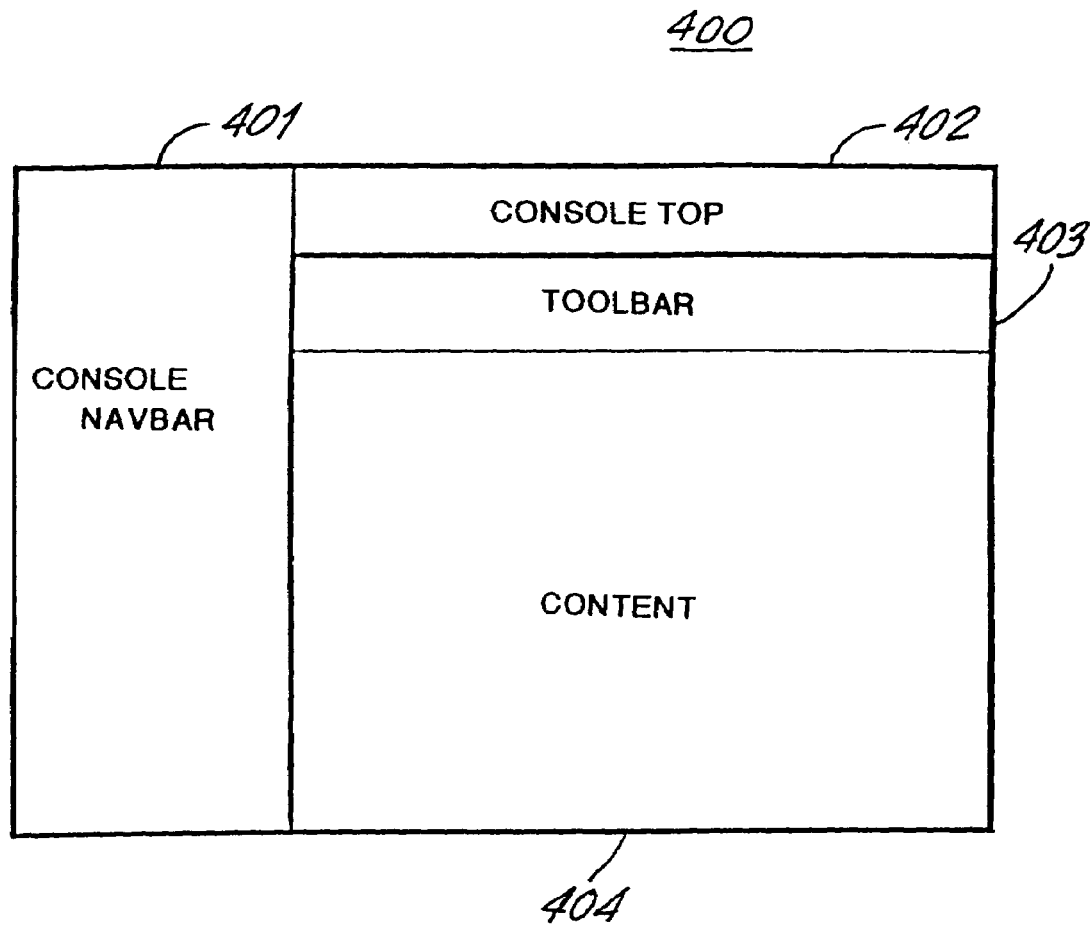
FIG. 4 shows a preferred user interface according to the present invention.

Further, a presently preferred embodiment of education support system 100 supports a plurality of environments 400 in a single application. Examples of different environments 400 supported include the personalized web page of student-centric information accessed by a student user and the administrator's environment used for maintenance of the system. Certain parts of the education support system 100 application are consistent across all supported environments 400, while the appearance to the user may vary for different environments 400. An environment 400 is defined by console frames that surround the application areas. An example of an environment 400 defined by a four-frame page as shown in FIG. 4 comprises a console navbar 401, and console top 402, a toolbar 403, and content 404. Console navbar 401 and console top 402 are controlled by a console frameset, while toolbar 403 and content 404 are controlled by a separate frameset. For example, toolbar 403 "buttons" are always located in the top frame of an application area, regardless of the environment 400. This approach allows users, and especially instructors, the ability to customize their course offerings while conforming to consistent user interface features that allow application areas to be shared across environments 400. Student users and instructors interact with education support system 100 via the same basic environment 400 format.

Context factory 303 contains information mapping a user to one or more courses associated with that user.

Access control manager 151 creates an access control list (ACL) for one or more subsystems in response to a request from a subsystem to have its resources protected through adherence to an ACL. Education support system 100 provides multiple levels of access restrictions to enable different types of users to effectively interact with the system (e.g., access web pages, upload or download files, view grade information) while preserving confidentiality of information.

User manager 154 integrates the student-centric information with existing network-based systems of an associated educational institution. In a presently preferred embodiment, user manager 154 comprises a runtime component and a batch component that periodically access and extract information contained in external institution databases in order to maintain current student-centric information. User manager 154 facilitates integration of education support system 100 with existing or legacy network-based systems, including proprietary institutional electronic networks and systems related to grades, registration, course schedules, financial aid, etc. without requiring modifications to existing systems or security procedures.

In a presently preferred embodiment, application subsystems 110 and core subsystems 150 interface with database subsystem 140 via the Java Database Connectivity (JDBC) standard interface to allow use of any relational database including, but not limited to, SQL and DB2 Universal Database standards.

Figure 2:
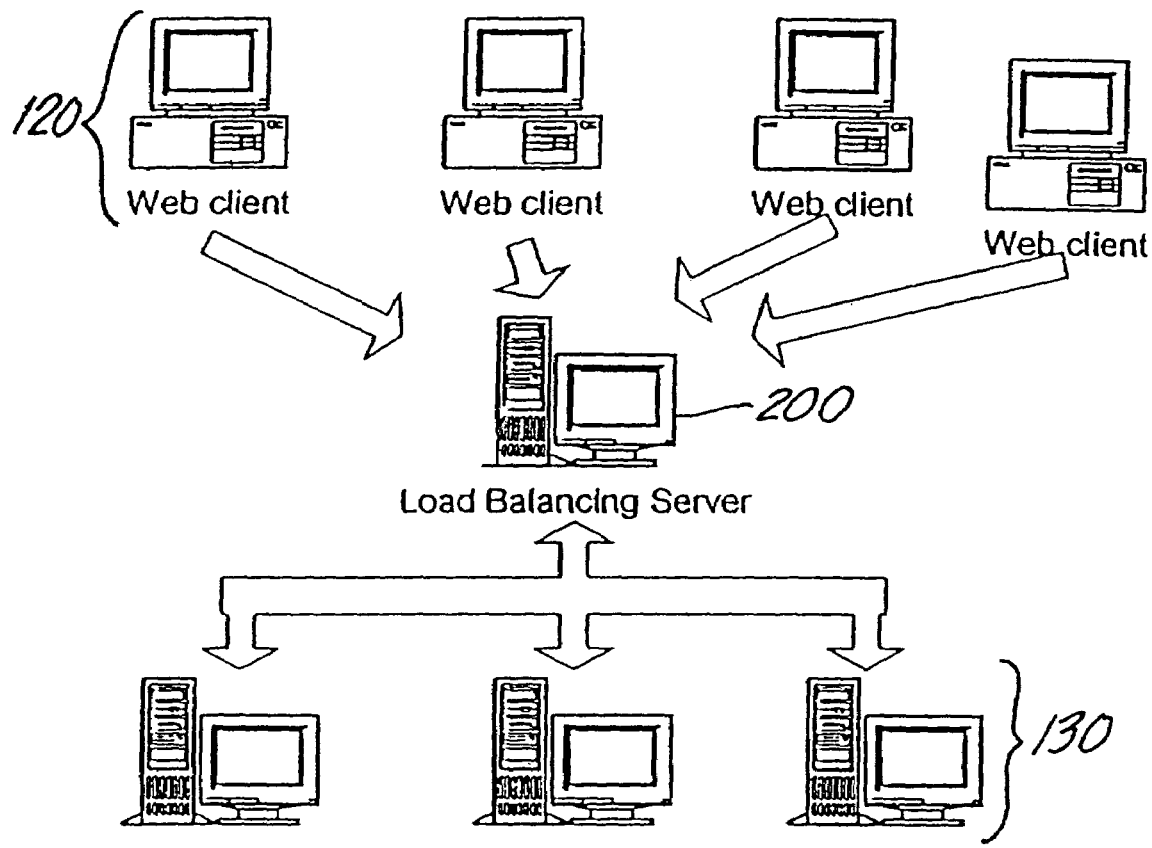
FIG. 2 describes a preferred embodiment implementing load balancing to achieve scalability.

Scalability is provided by the modular system architecture described in FIG. 1, and, in a preferred embodiment, through use of a load balancing server 200 as shown in FIG. 2. As users are added to the system and access the system as web browser 120 clients, additional web server hosts 130 may be added to the overall system to provide a matching increase in system capacity. Load balancing server 200 allocates new web browser clients 120 to the least-busy web server host 130 for servicing. By thus balancing the load across all web server hosts 130, education support system 100 prevents response times from become unacceptably long for any one given user. In a presently preferred embodiment, load balancing server 200 maintains one or more metrics concerning the percent utilization for each web server host 130 and selects the least-busy web server host 130 based upon application of a load balancing algorithm to these utilization metrics.

In a presently preferred embodiment, upon logging onto education support system 100, shell service 131 servlet renders and presents to the user (via a web browser 120) a personalized web page comprising a student-centric aggregation of data that may include, without limitation, personal class schedules, grades, a rolled-up or consolidated calendar, links to related tools, student group events for groups of which a particular student is a member, and class announcements.

Education support system 100 executes on a variety of computing platforms including, but not limited to, UNIX™ servers, NT™ servers, Solaris™, HP™, and Linux™. Education support system 100 supports popular web browsers including, but not limited to, Netscape Navigator™ and Microsoft Internet Explorer™, and, in a preferred embodiment, does not require plug-ins at the web browser client.

In a presently preferred embodiment, an automated upload or import capability is provided in which a user may upload a file to the system and system presents or displays the information contained in the uploaded file in a manner that preserves the grouping of the information, including fields and other categorization, based on the file type. Education support system 100 provides a standard import file format to accomplish this preservation of native grouping of information. In a presently most preferred embodiment, the automated upload capability imports an uploaded file in both native and HTML formats, maintaining the file formats associated with the native format for the native formatted file and converting the native format into HTML formats for the HTML formatted file.

Education support system 100 supports a variety of business models. For example, an institution may charge each student for courses taken via education support system 100; or, an instructor may use education support system 100 to process individual student tuition payments by providing links to e-commerce facilities.

Thus, a system and methods have been shown that that allow users to interact with a computer network-based education support system through means of a simplified, easy-to-use user interface, and that can be easily integrated with existing computer network and backend systems with minimal disruption to existing operations and systems. The disclosed system and methods is scalable in order to accommodate increasing numbers of users, and can accommodate a variety of diverse teaching modes.

Three Tier Functionality

The present invention will now be described in further detail. The invention is embodied in four embodiments that represent three levels of functionality of the system that can be provided to and by an institution, and one embodiment that can be offered to anyone on the Internet. One embodiment embodies a "first tier" functionality and incorporates the basic system, referred to as the Course Manager. The Course Manager provides course management system tools that enable instructors to provide their students with course materials, discussion boards, virtual chat, online assessments, and a dedicated academic resource center on the Web. As explained further below, the Course Manager includes personal information management tools, course content management tools, course communication and collaboration tools, assessment tools, academic Web resources, course management tools, and system management tools.

A "second tier" embodiment incorporates all of the functionality of the basic embodiment in an epicentric or portal model, also known as the Course & Portal Manager. This embodiment expands beyond the first tier Course Manager, and provides customized institution-wide portals for faculty, students, staff, and alumni with access to numerous personalized news and information services from across the Web. The platform can be customized with institutional branding and a tailored look and feel. It enables institutions to develop online communities, Web-based email, calendar, announcements and tasks. It also allows for a central access point to all of the institution's online services. In addition to the features of the Course Manager, the Course & Portal Manager includes enterprise database support, customizable portal modules and information services, web-based e-mail system, community management, institutional services management, extended customization for institutional branding, institution-wide content sharing and management, and course e-commerce management.

The third embodiment is a third tier system, known as the Advanced Course & Portal Manager. This embodiment incorporates the complete end-to-end "e-Learning" solution. In addition to the Course and Portal Manager, this third tier provides advanced Java-based API's for unifying diverse online campus systems into one integrated platform allowing for user-driven single log-in service delivery, as well as capabilities that allow each school, department or campus within the institution to maintain its own customized environment. Thus, this is the fully functional embodiment that includes all the features and functionality of the first and second tiers and adds certain integration technologies that allow integration of the invention with existing enterprise systems, such as for downloading student databases, etc. as defined further below. This includes a snapshot user management API, an event-driven (real-time) user management API, an end user authentication (security) API, and a network protocol for passing user authentication data.

It is contemplated that each tier would be offered to institutions in a licensing program that would best suit the needs and budget of the institution.

A fourth embodiment of the invention is operated as a publicly available web site on the Internet, that may be accessed by anyone, whether they are affiliated with an institution or not. In this embodiment, anyone on the web can create a course, enroll in a public course, etc. as explained further below. This provides for widespread dissemination of tools and utilities that enable anyone to generate his own course that can be taken by virtually any student.

As further explained herein, the course management tools featured in the present invention allow instructors to monitor, control and customize their course web sites from a web browser interface. The Course Control Panel provides a robust and easy-to-use interface for such course management. The system allows instructors to customize the names of course web site navigation buttons to suit their needs and requirements. The system also allows the instructor to add or drop individuals or groups of students from a course as required. The system features extended student enrollment option, such as a limited-time self-enrollment (e.g. certain dates only for the self-enroll feature), password-protected enrollment, and defined course duration (e.g. for self-paced study). Courses may be recycled between academic terms by automatically resetting discussion boards, assessment, and other content areas. In addition, the instructor can track student progress, grades and content usage through the system.

As further explained herein, the content management tools featured in the present invention allow instructors to post course documents, staff information, assignments, etc. Text may be typed directly into a form, or existing files may be accessed and uploaded automatically. Documents such as word processing files, spreadsheets, slide presentations, graphics, audio and video clips, etc. may be uploaded in this manner. Streaming multimedia may provided interactivity between the student and the course. Pop-up maps provide easy course site navigation, thus enriching the teaching and learning environments.

The communication and collaboration tools enhance the interaction between the students and instructors with asynchronous discussion boards as well as synchronous chat tools. Online discussions may be managed wherein messages are sortable by date, author, title, etc., and may be archived and printed. A digital dropbox is a file sharing utility that allows sharing of documents between users. Virtual office hours may be held, and even field trips conducted online with these tools.

The assessment tools in the present invention increase student preparedness, measure student progress, and customize lessons by creating and administering quizzes and surveys. Provided is an easy to use, step by step process to create the quizzes and surveys, wherein the instructor may mix and match multiple question types such as multiple choice, multiple correct, true/false, matching, ordering, fill in the blank, and essays. Multimedia or other attachments may easily be included with the assessment questions. Questions may be randomized and re-used from assessment pools. Tests provided to students may be password protected and timed, and may provide instant feedback to students. Advantageously, statistical reports may be created from the assessments and student answers.

The personal information management tools in the present invention allow students, instructors, administrators and all other users to access basic course, personal, and institutional data through a user-centric "My Institution" screen. The user may view announcements from multiple courses in one central location, and maintain personal calendar, address book, user directory and to-do lists.

The present invention also provides for access to a plethora of academic resources that supplement the student's online education experience. The user may browse discipline-specific information, resources and communities linked to each course website. These academic resources may be customized and personalized to fit the users' needs.

The system management tools available with the present invention allow system administrators to monitor, control and customize an institution's online teaching and learning environment from the web browser. The system administrator may control security permissions and enable/disable features for numerous user roles. Batch user enrollment (and unenrollment) may be performed system wide. Preferences and options may be managed on multiple courses, all from within a central system administrator panel. The system administrator may also track and report faculty, student and course statistics, may plan and manage system hardware requirements by assigning instructors with pre-assigned disk quotas for content storage, and may employ system-wide announcements to broadcast messages to users about system maintenance or institutional announcements.

In the Course & Portal Manager embodiment, the enterprise database support provides support for tens of thousands of users across an entire institution or system of institutions. User and course data may be managed efficiently and effectively. Moreover, large volumes of transactions may be managed efficiently and effectively. The "My Institution" interface includes portal and community functionality along with quick access to web email, course and institutional announcements, and links to other campus departments. Administrators may enable or disable portal modules and establish required and optional modules from the portal options menu bar. Administrators may also assign different portal default settings to different user roles (e.g. students get different portals than instructors).

Course e-commerce management functionality allows institutions to set prices and charge fees for course enrollment directly through the "e-Learning" platform.

In the Advanced Course & Portal Manager embodiment, the snapshot user management tool allows scheduling of one-time or periodic (i.e. hourly, daily, weekly) data integration from existing student information systems, automating course population and keeping the "e-Learning" environment synchronized with administrative and student data. Moreover, the end-user authentication enables a single login environment for the institution portal for all students, instructors, administrators and staff, which streamlines all campus services into a single web portal environment.

Figure 5:
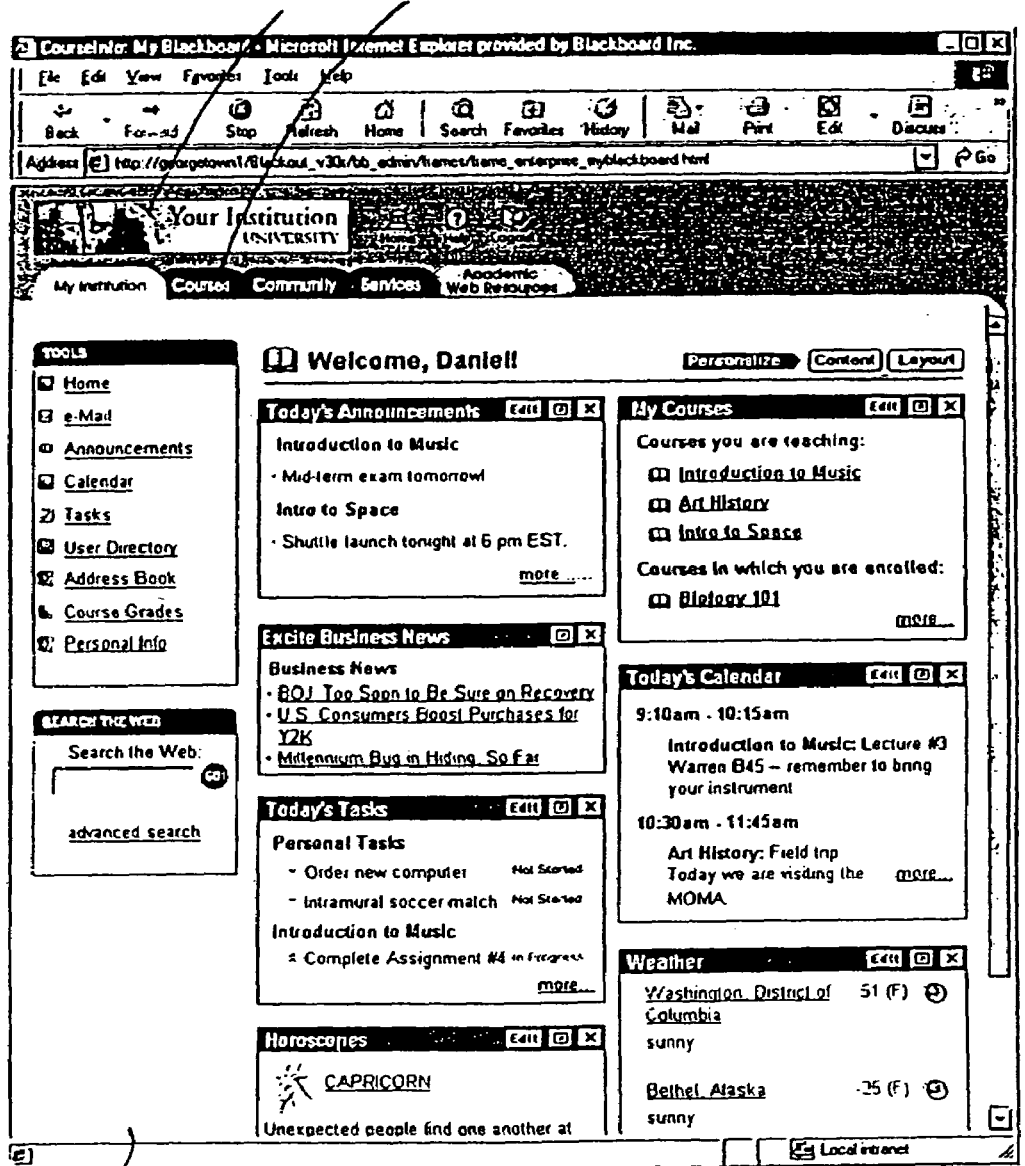
FIG. 5 shows a screen shot of the home page that a user will view.

The present invention will now be described in further detail and embodiments. FIG. 5 shows a screen shot of the home page 500 that a user will view, which is customizable in accordance with the requirements and desires of any user. The home page may also be institutionally branded, so that the "Your Institution" logo 504 shown in FIG. 5 would display the name of the institution that has licensed the product (i.e. "New York University"). The home page also provides the user with direct access to personal, course, and institutional tools. As an added feature, the system enables each user to select from a large number of news and information services, so that everyone who uses the system will have access to the most recent and relevant information for them. All of this functionality is provided in one place—the home page—so that the institution can provide a sense of community on campus, with courses, and with a view to the external information sources.

Figure 6:
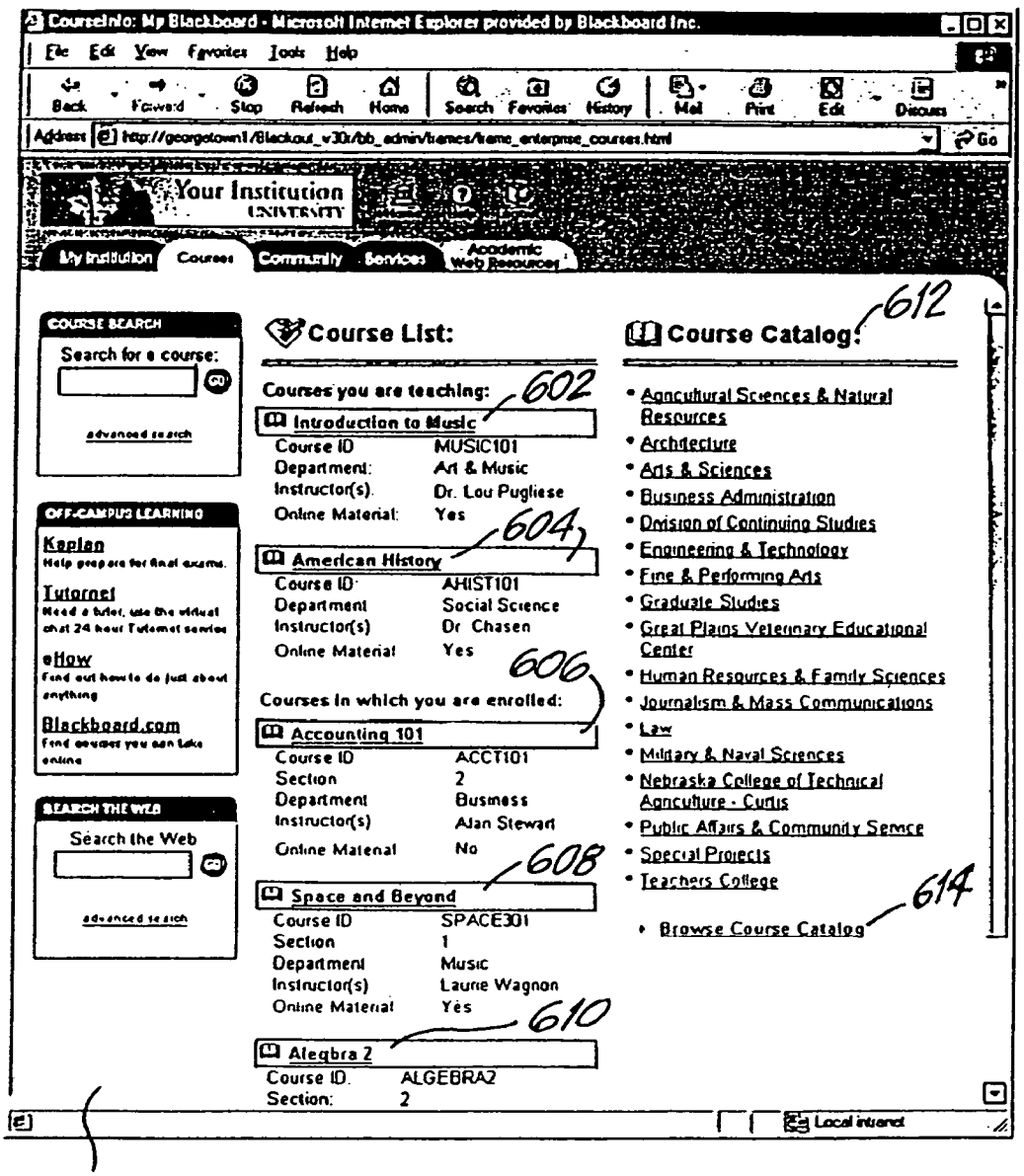
FIG. 6 is a screen shot of a web page showing the course list and course catalog available to student users.

By selecting the "Courses" tab 502 shown in FIG. 5, the user will be linked to a Course page 600 as shown in FIG. 6, which provides direct links to the courses that they teach (602, 604) and/or are enrolled in (606, 608, 610). To access the course website, the user will click on the course title (and 602, 604, 606, 608 or 610), he is automatically linked to a web page associated with that course. The user also has the opportunity to browse the course catalog 612 by selecting the links on the right side of the page 600, where courses are listed according to category. The user may also search through the course search engine by selecting the Browse Course Catalog Link 614.

Figure 7:
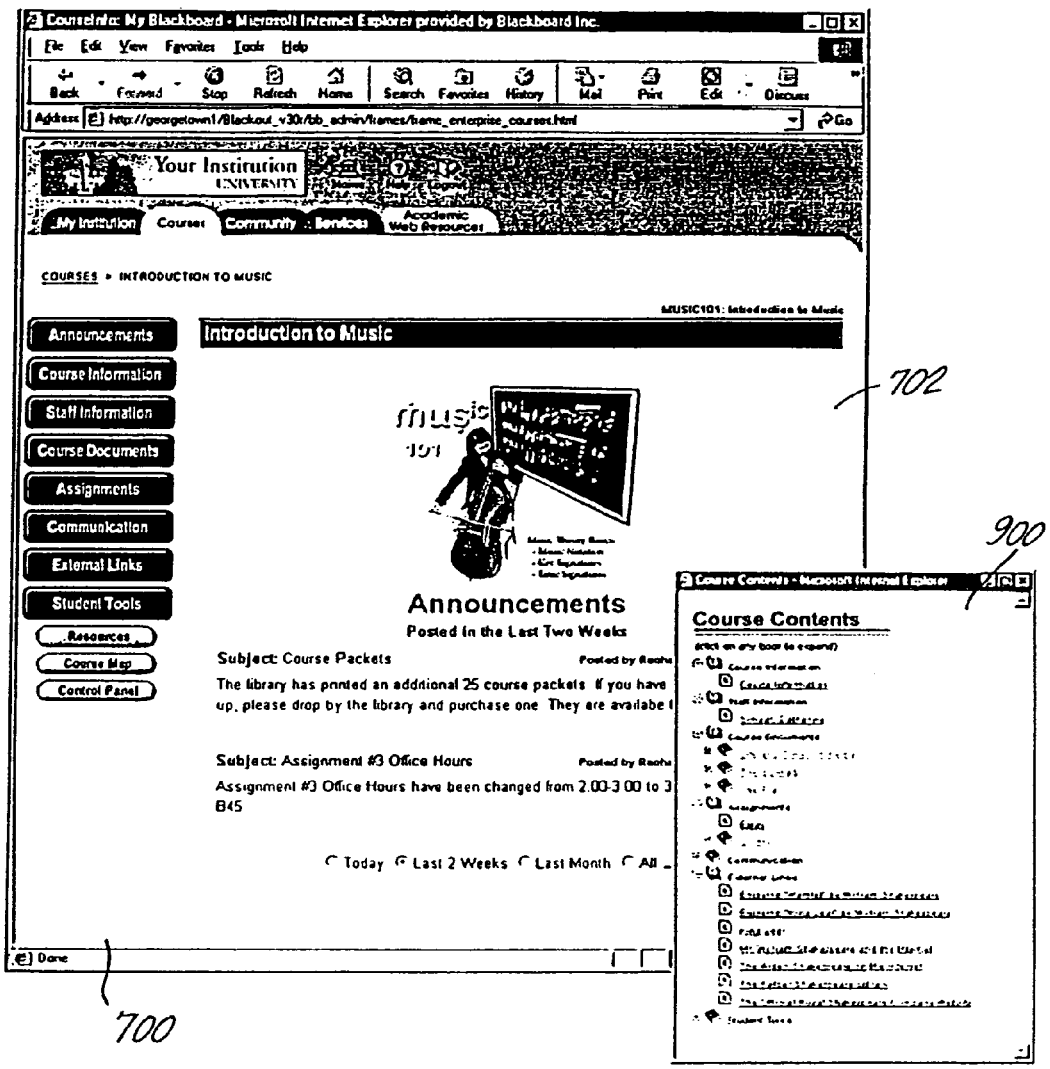
FIG. 7 is a screen shot of the default view for a course web site.

For example, by selecting the link 602 for the Introduction to Music course, which the user in this example is teaching, the user is shown the web page 700 illustrated in FIG. 7. The default view for the course web site 700 in this embodiment is the Announcements page 702, as shown in FIGS. 7 and 8. As seen at the lower part of the screen in FIG. 8, the user has the option of selecting various types of views by filtering out certain time-based announcements (i.e. today, last 2 weeks, last month, or all) by selecting button 802. The Announcements section can also be linked to after the user has left that page (i.e. is viewing another part of the course web site) by simply clicking the Announcements button 804 on the navigation toolbar 806 on the left of the web page.

Figure 9:
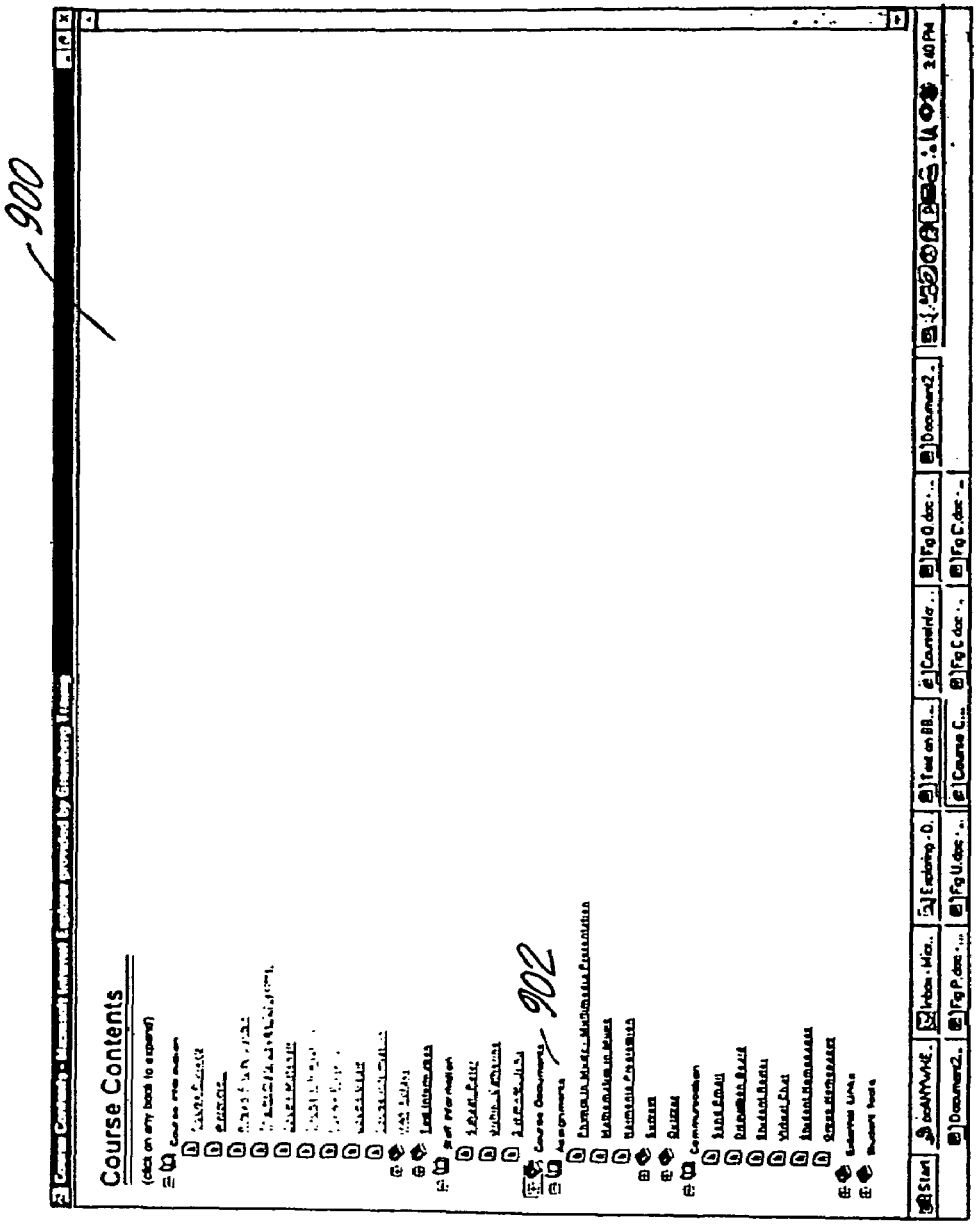
FIG. 9 is a screen shot of the course contents window.

Within the course website environment, the user is able to access all of the relevant course material and communication features as shown herein. The entire course outline may be displayed in a separate browser window 900, wherein the course contents are available for perusal and hyperlinking as desired. FIG. 8 shows the entire web page for Introduction to Music in two parts (an upper part and a lower part, which of course is scrollable as desired). As can be seen, one of the function buttons provided is labeled "Course Map" 808, which upon being clicked will popup the Course Contents window 900 shown in FIG. 9 (in an expanded browser window). As can be seen, the user will be able to expand or collapse the various headings provided in order to drill into the entire course contents as currently configured. So, for example, the user can expand the Assignments section 902 and get a linkable list of all the assignments that have been created for the course to date. Any of the assignments may then be clicked for easy access thereto. This separate window 900 is especially advantageous since it allows users to browse the entire course, regardless of their current location in the web site.

Figure 10:
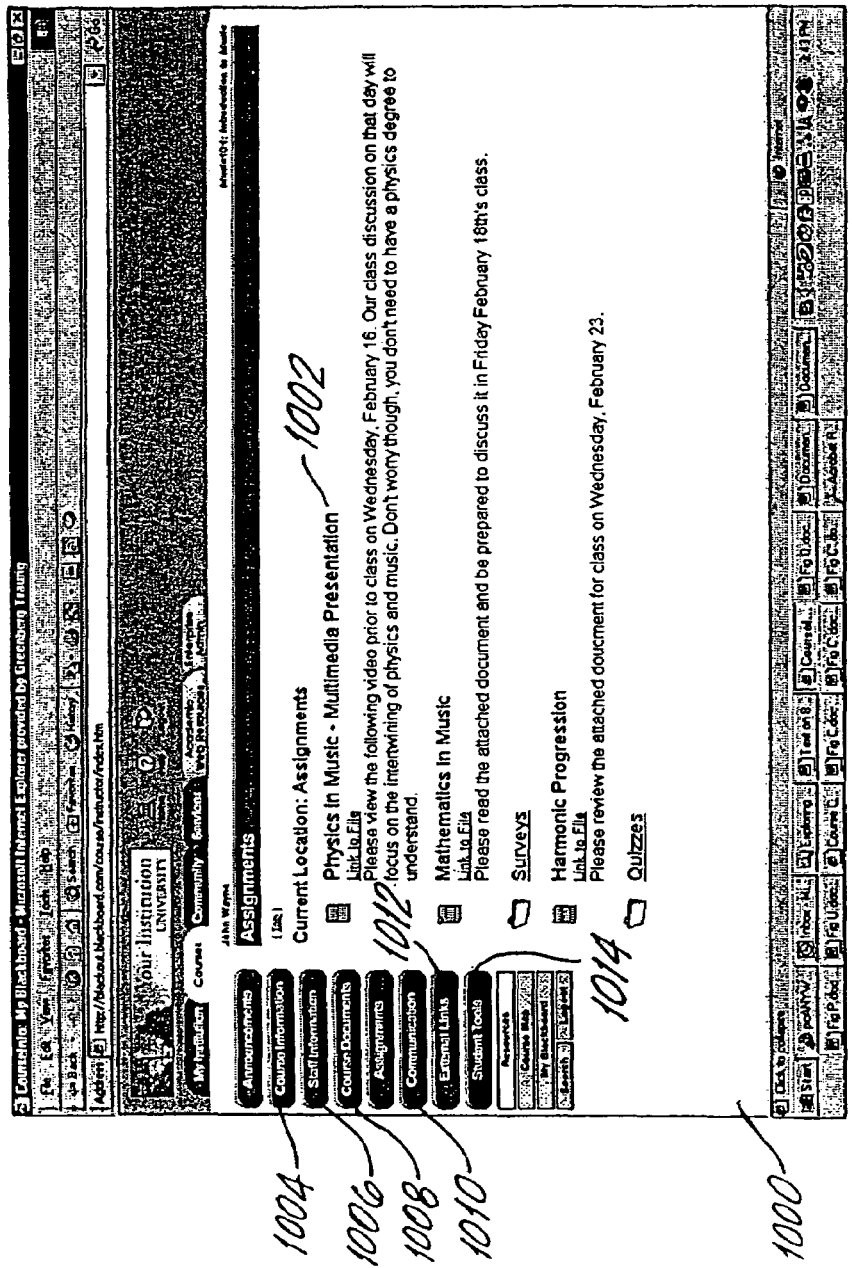
FIG. 10 is a screen shot of the assignments web page.

Thus, by selecting any of the Assignments links 902, the user would be linked to the web page 1000 set forth in FIG. 10. This web page lists each assignment that has been compiled for the course, each of which can be linked to web pages that contain the full details of the particular assignment. The assignment page 1000 shown in FIG. 10 may of course also be viewed by clicking the "Assignments" button 804 on the toolbar at the left of the course home page shown in FIG. 8. In general, any of the functions that are provided by toolbar buttons on the navigation bar at the left of the course home page will be available in any page accessed for that site, so that easy navigation may be had and the user may jump around and visit any desired portion of the course web site no matter where the user is currently located. Likewise, the Course Contents window provides similar functionality as described above.

As shown in FIG. 10, folders that have quizzes and surveys may be linked to by viewing the assignments web page. Clicking on these folders will present the student and/or instructor with a quiz that may be taken online, wherein the answers may be graded automatically, in real-time, as soon as the student has finished the quiz. This assessment functionality will be explained in greater detail below.

In general, assignments may be provided in virtually any type of media that he instructor has at his disposal. For example, shown in FIG. 10 is a link 1002 to a multimedia presentation for "Physics in Music", which will give the student a content-enriched lesson that will be useful, prior to the next lesson. Assignments may also be as simple as a text based file that the student would read in preparation for the required class session.

In addition to selecting the Assignments page 1000 or the Announcements page 700, the user may select the Course Information button 1004 on the toolbar. This will link the user to a web page that will list information provided by the instructor that is useful to the student, such as an introductory welcome message, links to helpful resources, etc. Resources otherwise found on other parts of the course web site may also be shown here if desired by the course web site developer. Links may be in the form of URLs to other web pages or resources, or to folders that include groups of logically related resources.

Selection of the Staff Information navigation button 1006 will provide the user with a web page that will list each instructor, TA, professor, etc., along with an abstract listing office hours, address, telephone number, etc. on each, as well as a link that be clicked to send an email. This gives the student with quick, easy access to any instructor as may be desired throughout the course. Images and other types of multimedia files may also be made available at this page for enhanced content viewing.

Figure 11:
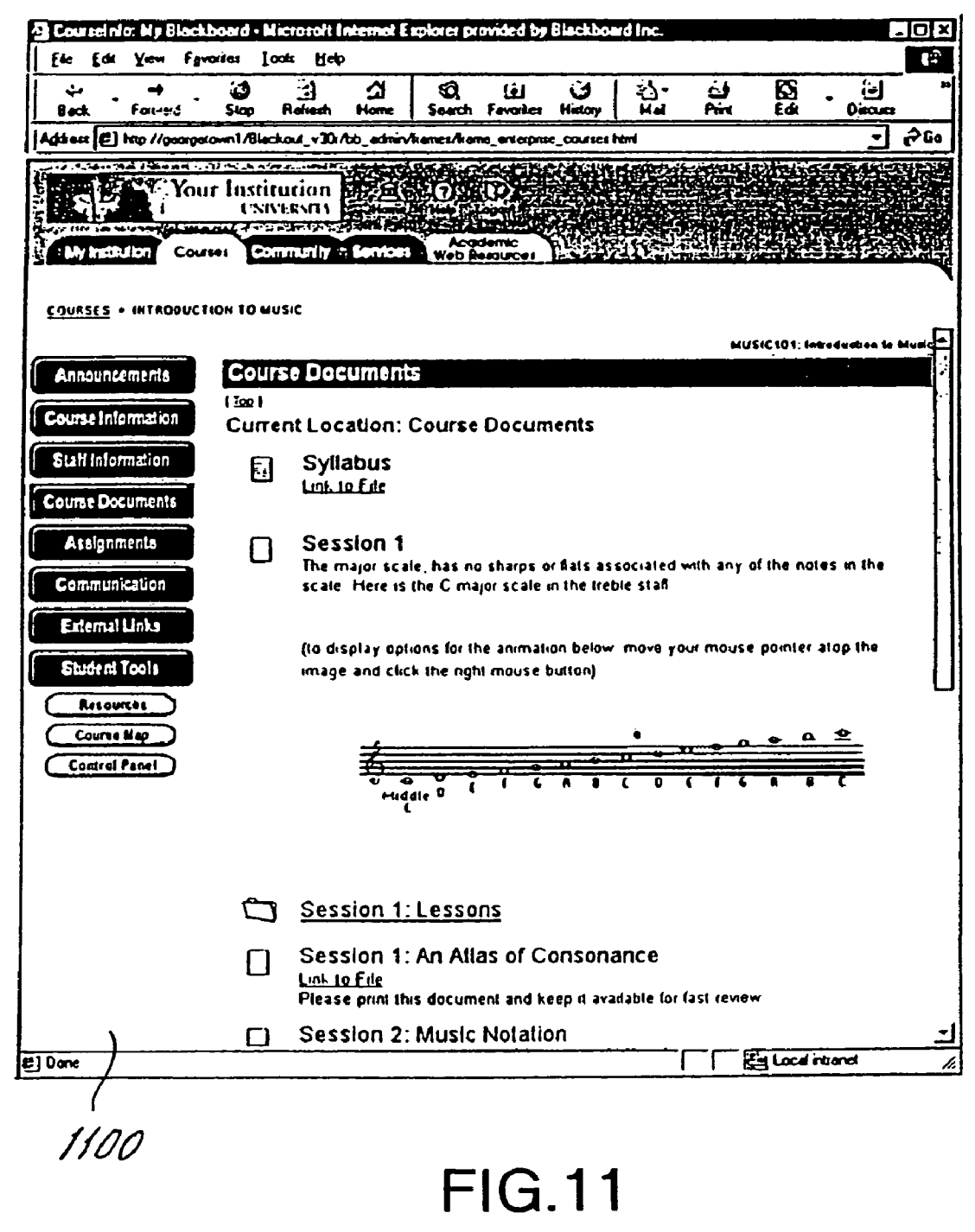

The user may select the "Course Documents" link 1008 shown in the navigational toolbar, after which the web page 1100 on FIG. 11 is provided for that course. This provides the user with immediate access to all documents relevant to the course. As a student, the user has access to all of the course materials, including additional links to information on the web that will enhance the instructional experience. As an instructor, the user has the ability to post documents of numerous file formats and from disparate locations.

Figure 12:
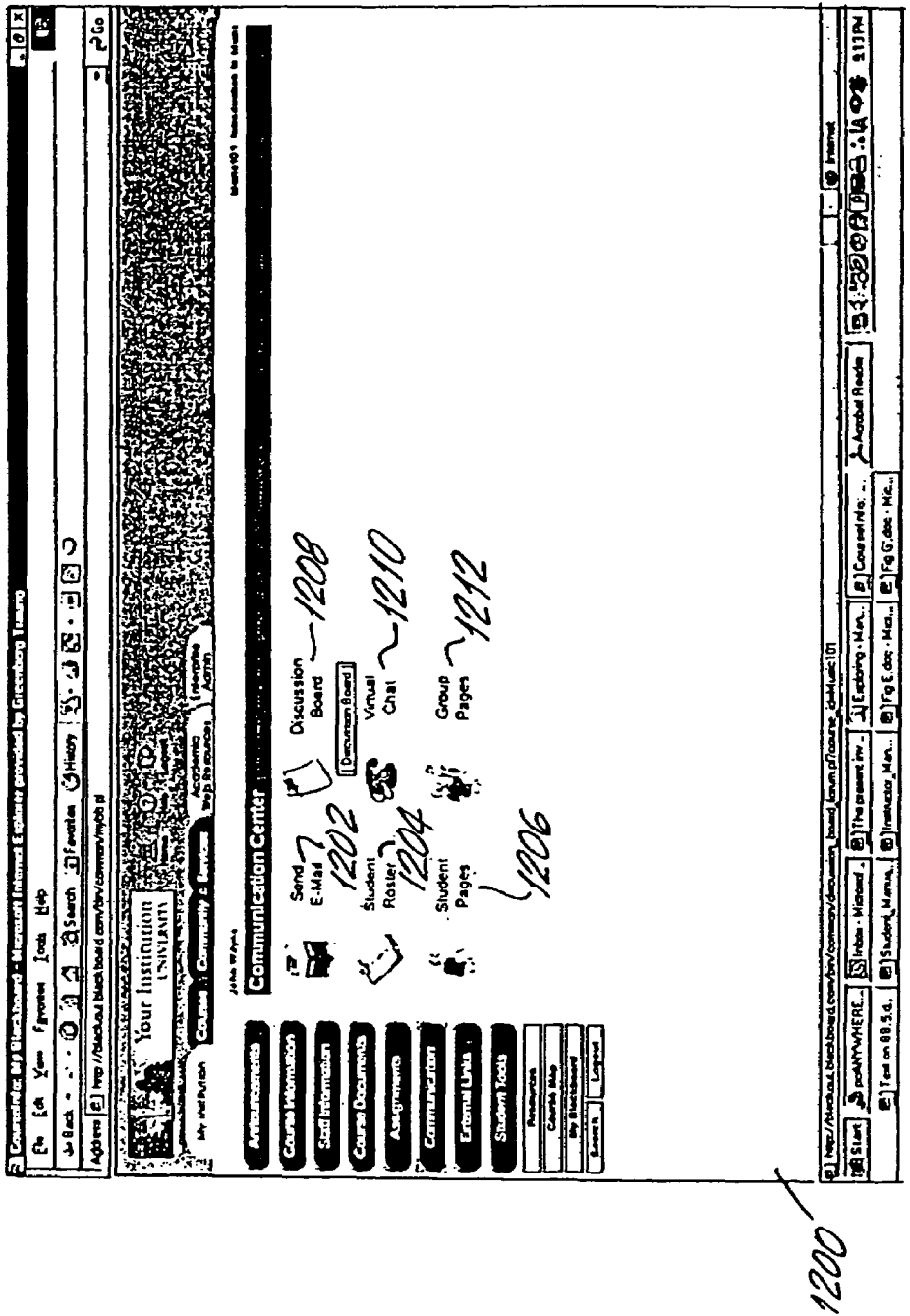
FIG. 12 is a screen shot of the communication center web page.

By selecting the "Communication" tab 1010 shown in FIG. 10, the student is provided with the Communication Center web page 1200 as shown in FIG. 12. In this area, the user has at his disposal many different ways of establishing communications with other users of the system as well as accessing other areas of the system for various types of information. Thus, the user has access to an email utility 1202, a student roster list 1204, a list of student homepages 1206, a discussion board 1208, a virtual classroom chat 1210, and a group pages link 1212.

Selection of the Send E-Mail link 1202 loads a web page with various links that allow the user to send email to individuals registered for the course, to students only, to instructors only, etc. The email function is accomplished via web-based email and allows for users to send attachments, etc. as in many existing email packages available today. Selection of the Student Roster link 1204 displays a web page that lists all of the students registered for the course, along with contact information if allowed by the student (such as phone number, address, email address, etc.). Selection of the Student Pages link 1206 provides a web page with links to the homepage for each student in the class.

Figure 13:
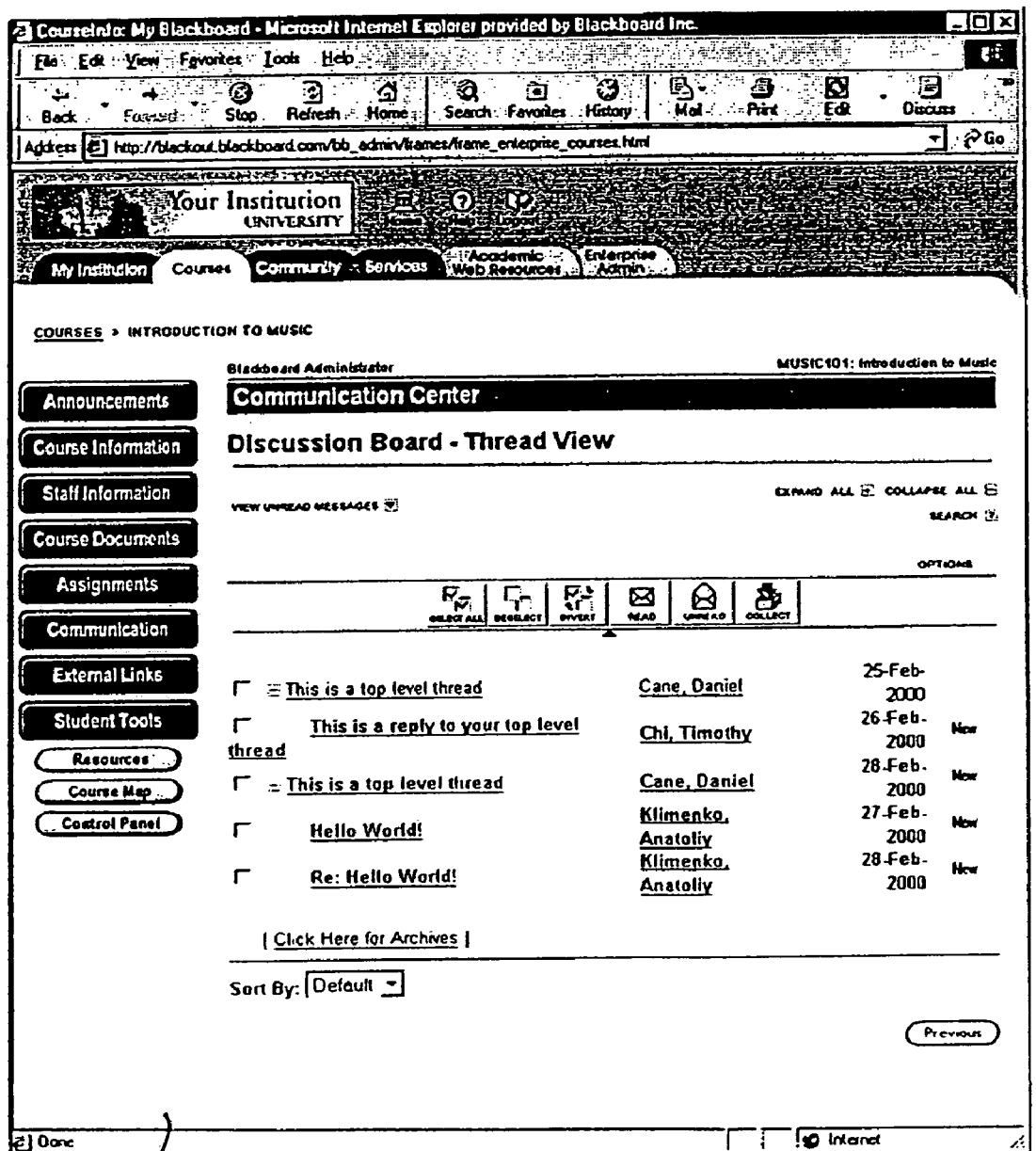
FIG. 13 is a screen shot of the asynchronous discussion board web page.

Another very effective communication tool is the asynchronous Discussion Board 1300, as shown in FIG. 13, which is displayed by the student selecting the Discussion Board link 1208 of FIG. 12. Here, students can access this for threaded discussions that are archived for easy retrieval. By using the discussion board, students can help each other learn even more easily outside of regular class hours. It can also be used as an effective method for instructors and TAs to use as a tutorial tool for out-of-class questions and discussions that need to be saved for the purpose of sharing with the rest of that class. This utility operates in accordance with techniques well known in the art.

Figure 33:
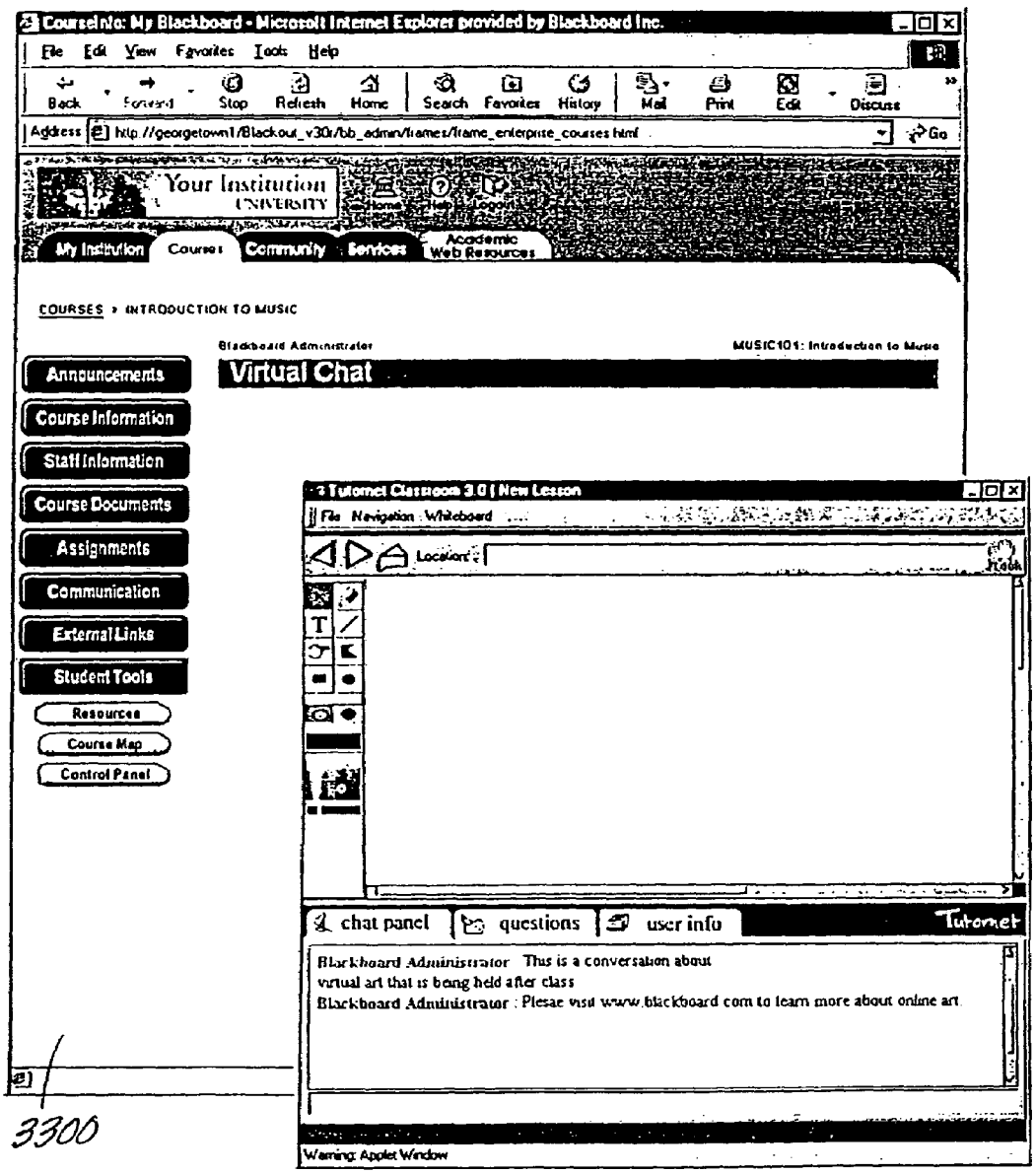
FIG. 33 is a screen shot of the virtual chat web page.

By clicking on the Virtual Chat link 1210, the student is provided with a web page 3300 as shown in FIG. 33, labeled "virtual chat". That is, each course has its unique chat area built into the course site. Students can engage in chats about the course, collaborate on assignments, and share information beyond the boundaries of the classroom or posted materials. The instructor can monitor the chats or actively engage in discussions. This real-time virtual chat feature can also accommodate a whiteboard mode.

Selection of the Group Pages link 1212 displays a web page that lists various groups of users that are grouped by special interests (such as music lovers, bookworms, sports fans, etc.). Access to these groups is a definable parameter that is set by the system administrator.

Selection of the External Links button 1012 will display a web page that is provided with URLs for relevant content that the instructor deems may be useful to the student community. For example, in a law course, links may be provided to various legal research web sites, a Congressional web page, etc.

Figure 14:
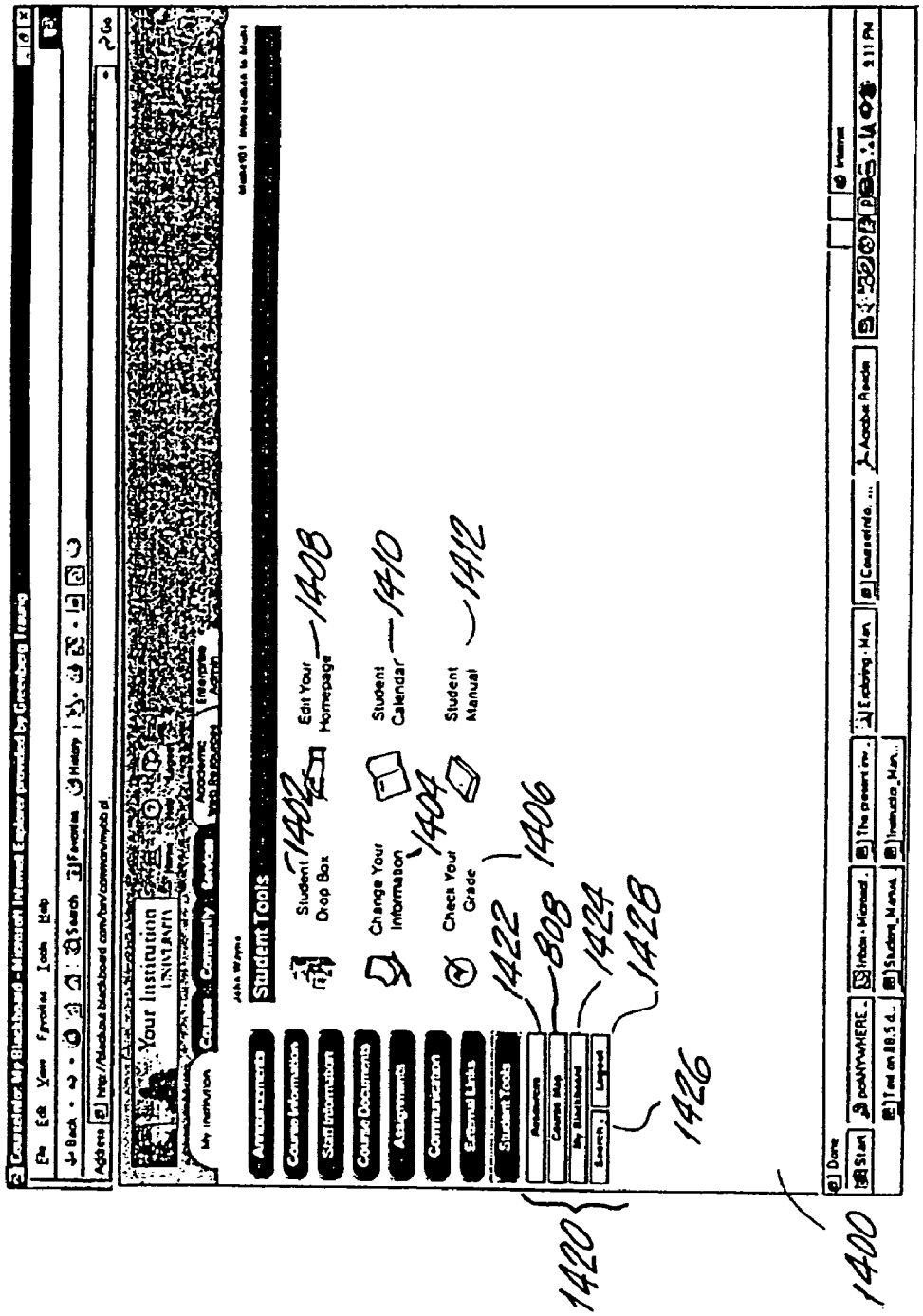
FIG. 14 is a screen shot of the student tools web page.

Selection of the Student Tools button 1014 will display a web page 1400 of associated links as shown in FIG. 14. These links include various tools needed by the student, such as the Student Drop Box 1402, Change your Information 1404, Check Your Grade 1406, Edit Your Homepage 1408, Student Calendar 1410, and the Student Manual 1412.

By clicking the Student Drop Box link 1402, the student is provided with a web page that will allow control and access to the student's digital dropbox, which is a folder of files that the student can exchange with the course instructor. As shown in FIG. 15, the dropbox web page 1500 allows the student to type in box 1502 the resource location of a file that he wishes to provide to the instructor, or to browse his computer's hard drive with button 1504, network drive, etc. in accordance with well known techniques to locate the file and insert the appropriate pointer. Clicking the Send File button 1506 will finish the task of uploading the file. A list 1508 of uploaded files that exist in the student's dropbox is also set forth in this page, along with a control link 1510 that enables the removal of a file. By using this utility, the student can submit documents such as term papers to the instructor, who can then read and post comments to the file for return to the student and review.

Selection of the Change Your Information link 1404 provides the student with a web page that sets forth his personal data, such as name, address, email, phone number, password, etc. In addition, certain system preferences may be set at this location. Similar to this link is the Edit Your Homepage link 1408, which will allow the student to access his homepage and make modifications as he desires (e.g. change a JPEG picture on the page, change hotlink list, etc.)

Selection of the Check Your Grades link 1406 will deliver a web page that shows the grades that the student has been assessed in the course, such as for exams, quizzes, term papers, projects, assignments, etc. The student may be able to link to the specific exam or paper through this utility in order to review the exam again, which may be useful for example in preparing for a final exam. The instructor may also provide to the student a statistical review of the entire class so that the student has a better feel for the grade he may receive (for example, the class median, mean, curve data, etc.).

The Student Calendar button 1410 will provide well known PIM (personal information management) functionality to the student. The Calendar web page can display calendar events in a graphical display for that course, all the student's courses, all institution events, as well as personal calendar events programmed by the user. Thus, different entities can program calendar events, which can be selectively displayed by the student by selection of display functions on the page. For example, the instructor can program the calendar events for the course, and an administrator can program calendar events for the entire campus, and these will be displayed on the student's calendar since he is registered for the course. This provides the student with a greater ability to manage his calendar than has been available in the past.

The final button on the Student Tools web page is the Student Manual link 1412, which when selected provides the student with access to an online manual that may be used for a "help" reference in navigating the web site.

Located below the navigation button toolbar is a group of control buttons 1420. The Resources button 1422 links directly to a web page of related online resources to assist with course-related issues, as described further below. The Course Map button 808 gives a separate browser window with direct access to the course contents, as explained above. The My Blackboard button 1424 gives access to "My Blackboard" functionality as explained below. The Search button 1426 enables the user to search all course materials by criteria and keyword(s). The Logout button 1428 logs the user out of the current course. There may also be an Enroll in this Course button to allow students to register themselves in courses (this button is only visible when the student accesses as a guest a course in which he is not enrolled).

Instructor Functionality

The instructor is provided with essentially the same functionality and control as is the student user, with additional functions defined herein. That is, the instructor is provided with a complete set of navigational buttons for accessing announcements, course information, staff information, course documents, assignments, communication tools, external links, and student tools for a given course that he is teaching. The control panel is also given to the instructor to enable display of a set of links to course management and development tools that are available to an instructor.

Figure 16:
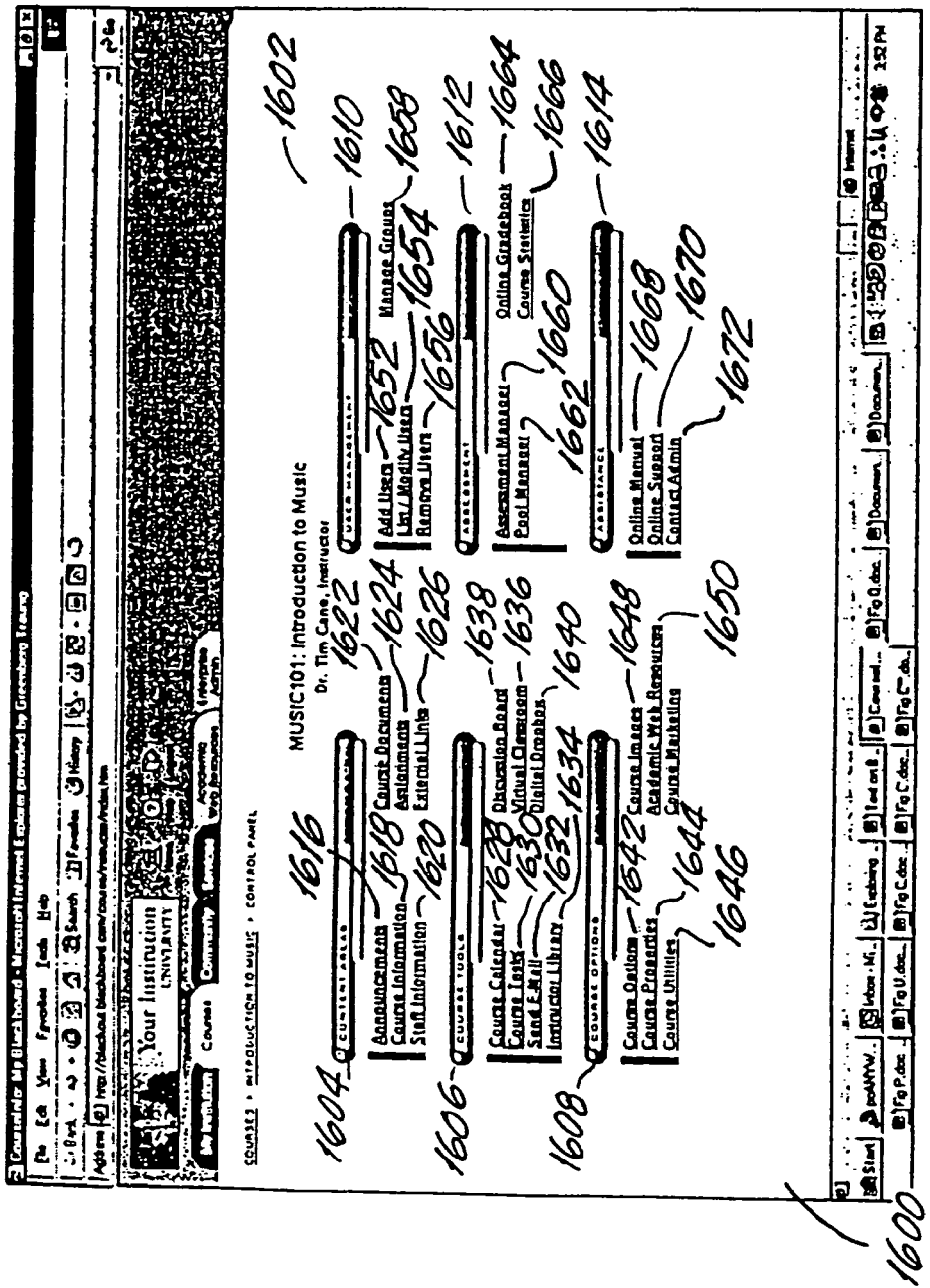
FIG. 16 is a screen shot of the instructor's control panel web page.

The instructor's control panel web page 1600 is shown in FIG. 16. This control panel 1602 provides the instructor with many features that are useful in managing the course he instructs. The control panel is divided into Content Areas 1604, Course Tools 1606, Course Options 1608, User Management 1610, Assessment 1612, and Assistance 1614, as set forth below.

Content Areas

Figure 17:
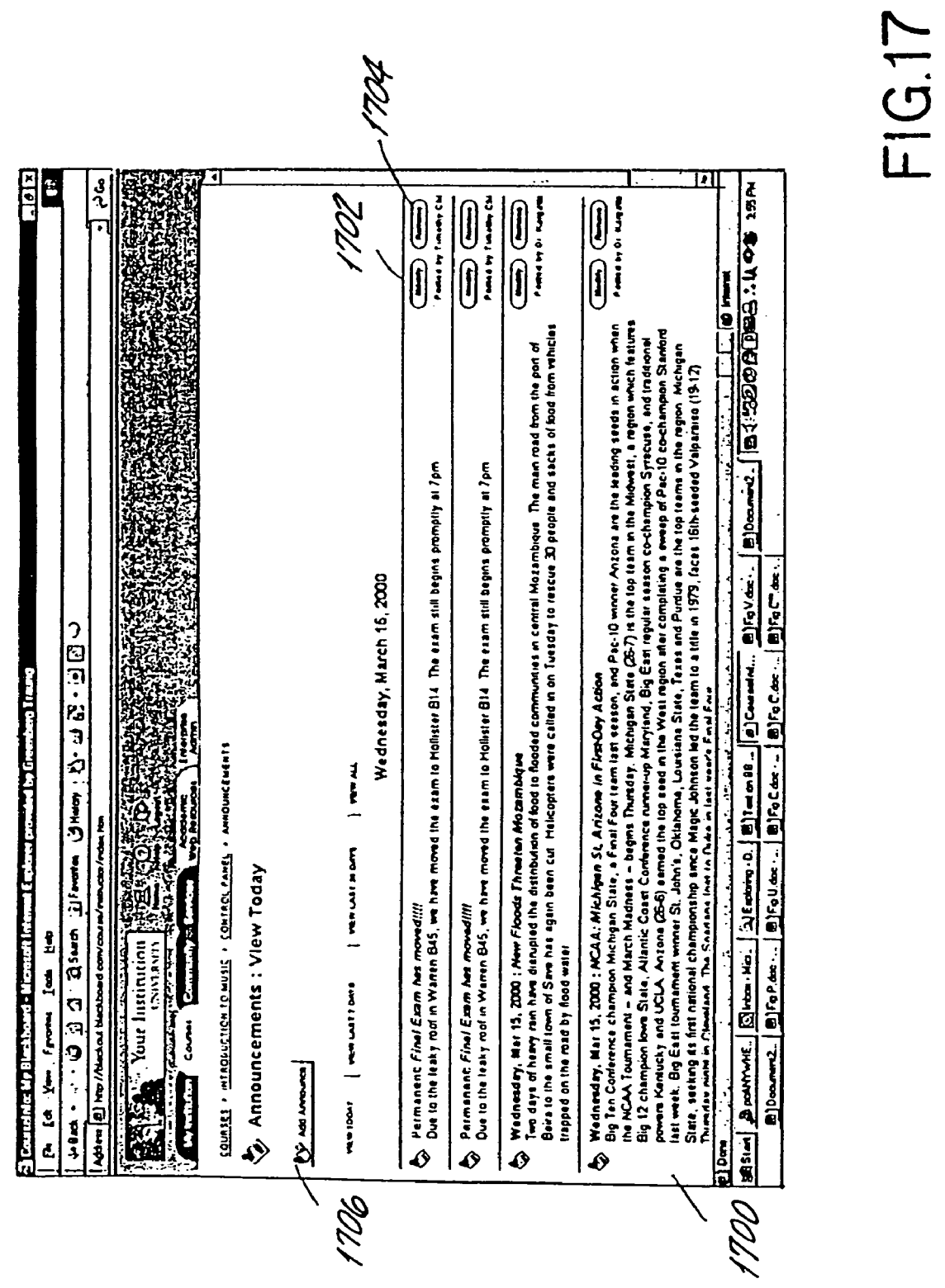

The Announcement link 1616 displays a web page 1700 as shown in FIG. 17 that will set forth all of the announcements that have been posted for the course, the author (i.e. which instructor, if there are more than one authorized to access this area) of the announcement, and a modify button 1702 and a remove button 1704. An add announcement button 1706 is also provided, which displays a web page with a blank message field that he instructor fills in and submits to the server. The newly added announcement will then be posted to all students registered in the class.

Figure 18:
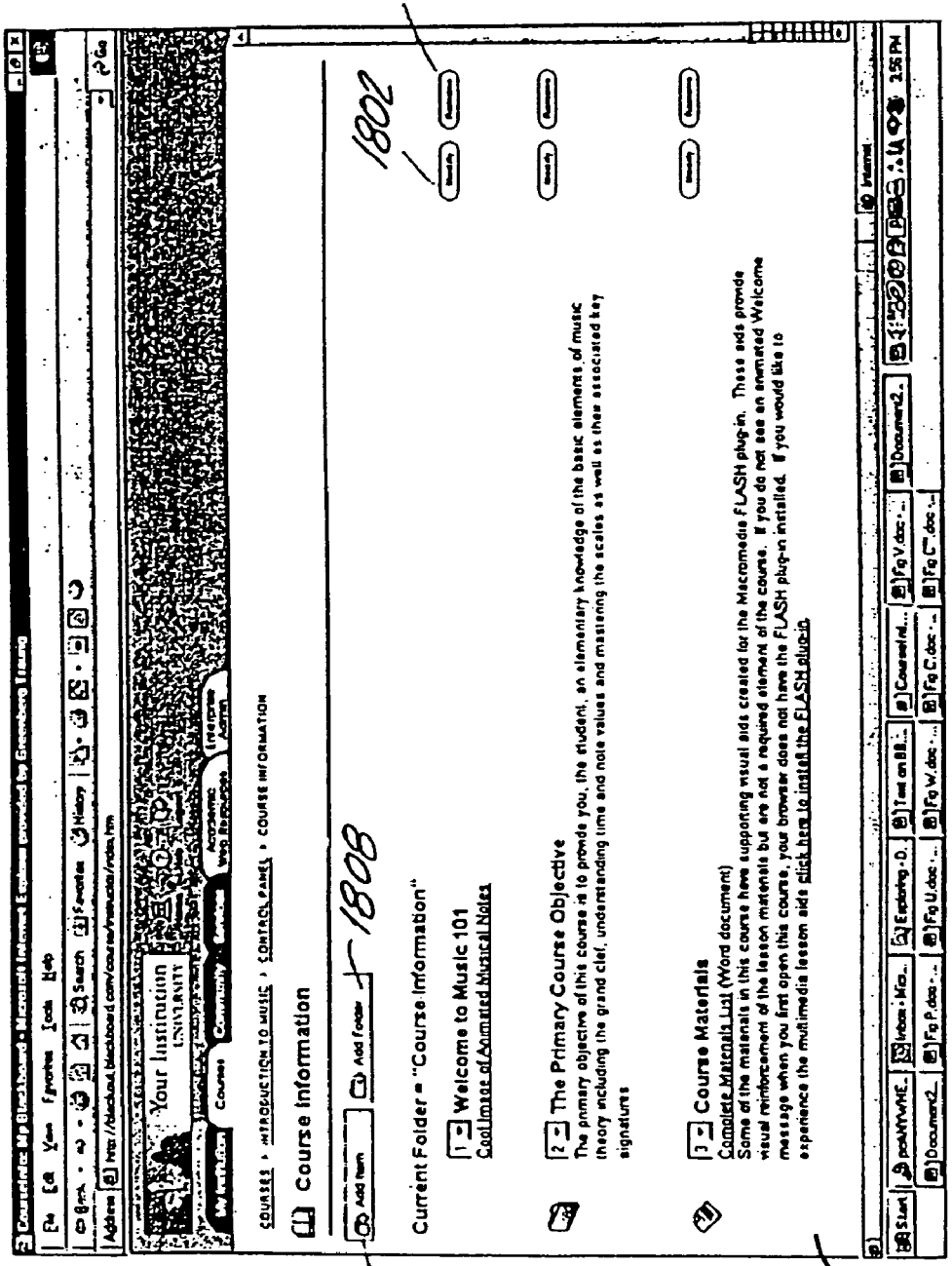
FIG. 18 is a screen shot of the course information web page.

The Course Information link 1618 displays a web page 1800 as shown in FIG. 18 that will set forth all of the course information documents or folders that have been posted for the course, and a modify button 1802 and a remove button 1804. An add item 1806 or add folder button 1808 is also provided, which displays a web page with various fields that the instructor will fill in to define the course information entry. After submitting the new entry to the server, the new course information is posted to all students registered in the class.

The Staff Information link 1620 displays a web page that will set forth all of the staff entries (i.e. instructors, Tasks, etc.) that are involved with the course, and a modify button and a remove button for each entry similar to those shown in FIG. 18. An add item or add folder button is also provided, which displays a web page with various fields that the instructor will fill in to define the new staff item entry. Fields are also provided for links to each staff member's email address, web page, etc. Images of the staff member may also be inserted in the entry. After submitting the new entry to the server, the new staff information is posted to all students registered in the class as explained above.

Similarly, the Course Documents link 1622 displays a web page that will set forth all of the course documents or folders that have been posted for the course, and a modify button and a remove button as discussed above. An add item or add folder button is also provided, which displays a web page with various fields that the instructor will fill in to define the course documents entry. The document may be uploaded directly to the server for later access by the student, or a link to an external referenced resource may be provided (i.e. a URL). After submitting the new entry to the server, the new course information is posted to all students registered in the class as explained above.

Likewise, the Assignments link 1624 displays a web page that will set forth all of the course assignments or folders that have been posted for the course, and a modify button and a remove button. An add item or add folder button is also provided, which displays a web page with various fields that the instructor will fill in to define the course assignment entry. The assignment entry may be uploaded directly to the server for later access by the student. After submitting the new entry to the server, the new course assignment is posted to all students registered in the class as explained above.

Also, the External Links link 1626 displays a web page that will set forth all of the external links or folders that have been posted for the course, and a modify button and a remove button. An add item or add folder button is also provided, which displays a web page with various fields that the instructor will fill in to define the external links entry. The external links entry may be uploaded directly to the server for later access by the student. After submitting the new entry to the server, the new external link page is posted to all students registered in the class as explained above.

Course Tools

Under the Course Tools section 1606, the Course Calendar link 1628 displays a web page that will set forth all of the calendar events that have been posted for the course, and a modify button and a remove button. An add item button is also provided, which displays a web page with various fields that the instructor will fill in to define the new calendar item entry (i.e. description, date, time, etc.). The calendar entry may be uploaded directly to the server for later access by the student. After submitting the new entry to the server, the new calendar page is posted to all students registered in the class as explained above.

Figure 19:
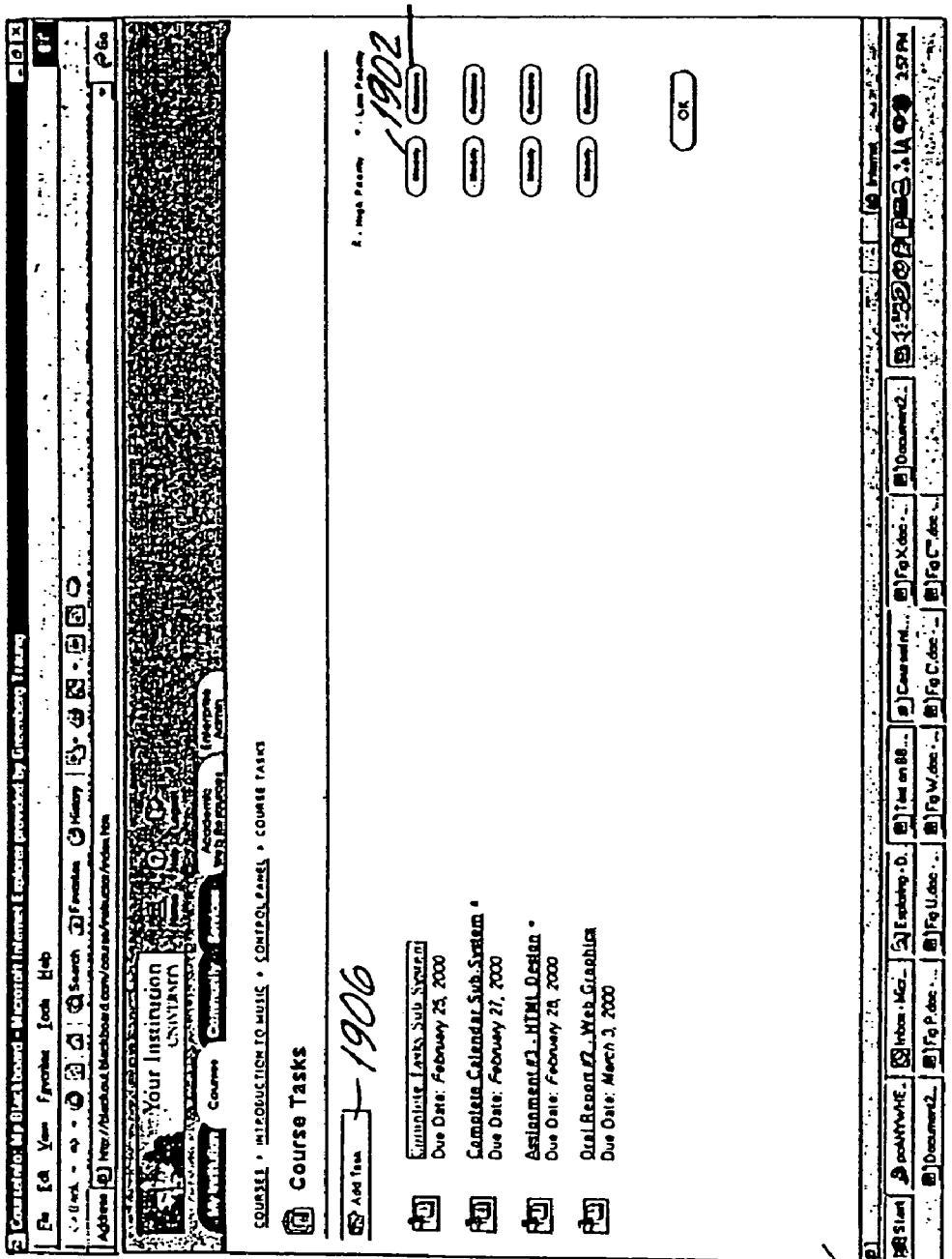
FIG. 19 is a screen shot of the course tasks web page.

The Course Tasks link 1630 displays a web page 1900 as shown in FIG. 19 that will set forth all of the tasks that have been posted for the course, and a modify button 1902 and a remove button 1904. An Add Task button 1906 is also provided, which displays a web page with various fields that the instructor will fill in to define the new task entry (i.e. description, date, time, etc.). The task entry may be uploaded directly to the server for later access by the student. After submitting the new entry to the server, the new tasks page is posted to all students registered in the class as explained above.

The Send Email link 1632 displays a web page that is similar to the one the user will be provided with in his email function (i.e. allows selection of individual users associated with the course, certain predefined groups of users such as all students, etc.)

Figure 20:
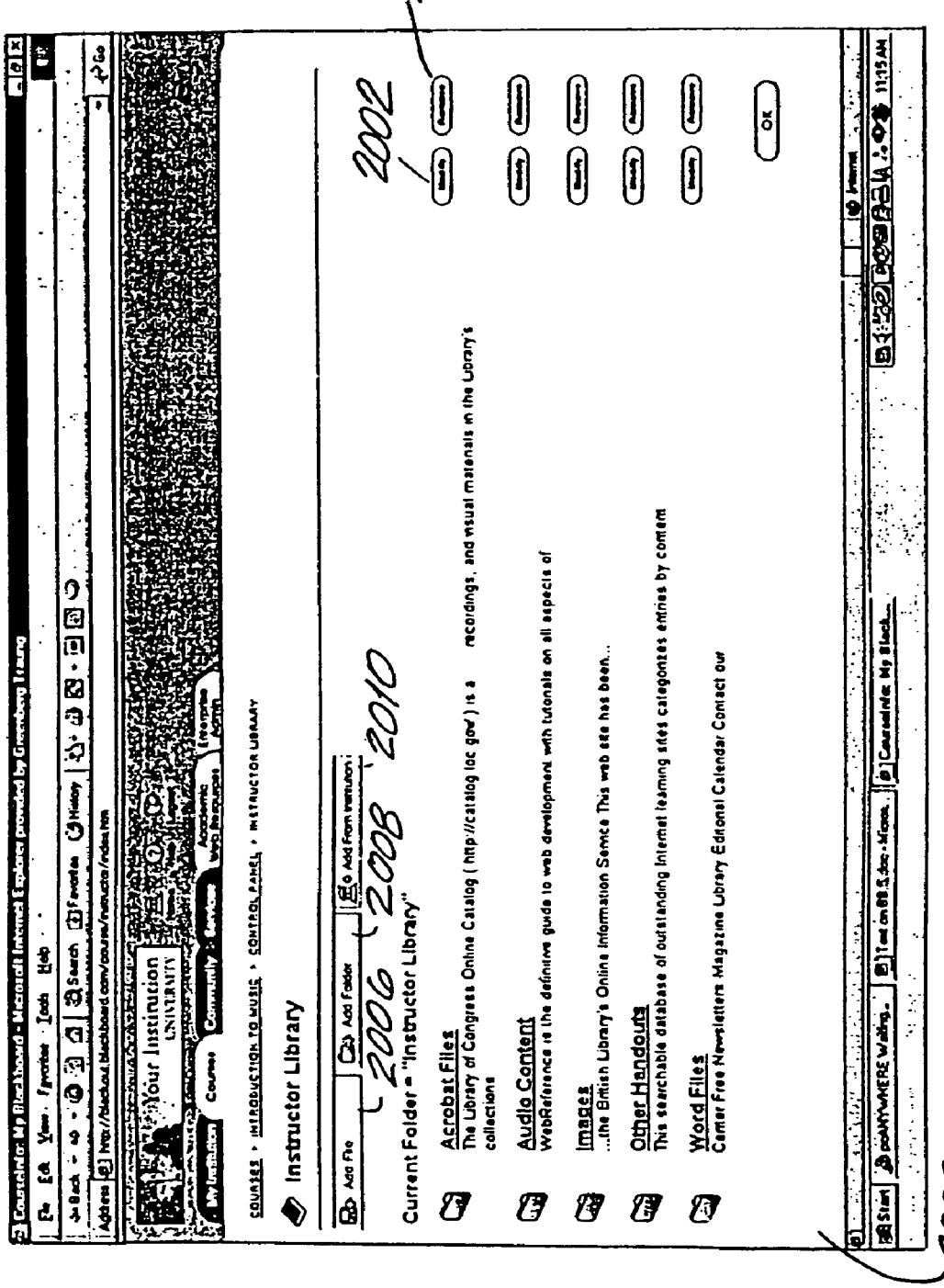
FIG. 20 is a screen shot of the instructor library web page.

The Instructor Library link 1634 displays a web page 2000 as shown in FIG. 20 that will set forth all of the folders and files that have been posted by the instructor for the course, and a modify button 2002 and a remove button 2004. These materials are accessible to instructors only (professors, TAs, etc.), and not to students directly. An Add File button 2006 and an Add Folder 2008 button is also provided, which displays a web page with various fields that the instructor will fill in to define the new entry. In addition, the instructor is able to select the Add From Institution button 2010 to select a new reference that is available from a pool of references made available to all instructors from the institution. The new entry may be uploaded directly to the server for later access by the instructors associated with the course. After submitting the new entry to the server, the new Instructor Library page is posted to all instructors associated with the course.

The Virtual Classroom link 1636 displays a web page that provides a link to either launch a virtual classroom (and thus participate in real-time, synchronous classroom sessions), or to view the classroom archives (view previous classroom sessions and/or download these sessions to the instructor's computer). Each course includes a Virtual Classroom, which is a synchronous chat room for student and group communications. The Virtual Classroom can be used to hold "live" classroom discussions, TA sessions, and office hour type question/answer forums. One can even have guest speakers and subject matter experts talk with the class in the Virtual Classroom.

A Virtual Classroom contains several distinct areas. The Whiteboard Space is where web pages are displayed, which is the large center area. One can also write or draw on this space using the drawing toolbar. The Menu Bar is used to change the information that appears on the whiteboard space, such as selecting a font to use on the whiteboard space and moving an object on the whiteboard space behind another object. One can also prepare lessons, navigate slides displayed on the whiteboard space, and clear the Group Discussion tab and Questions and Answers tab (refer to the Tab Panel description for further information on these tabs). The Application Tool Bar contains tools for navigating web pages. The Location Field is used to enter the URL of a web page the user would like to use during the Virtual Classroom session. The web page is then displayed on the whiteboard space. Users can also write or draw on the web page with the drawing toolbar. The Drawing Toolbar is used to write and draw on the whiteboard space. The Status Region is where status messages are displayed at the bottom of the Virtual Classroom window. The Tab Panel is used to chat with students, respond to students' questions, control classroom behavior, and view information about the students in the Virtual Classroom.

Figure 21:
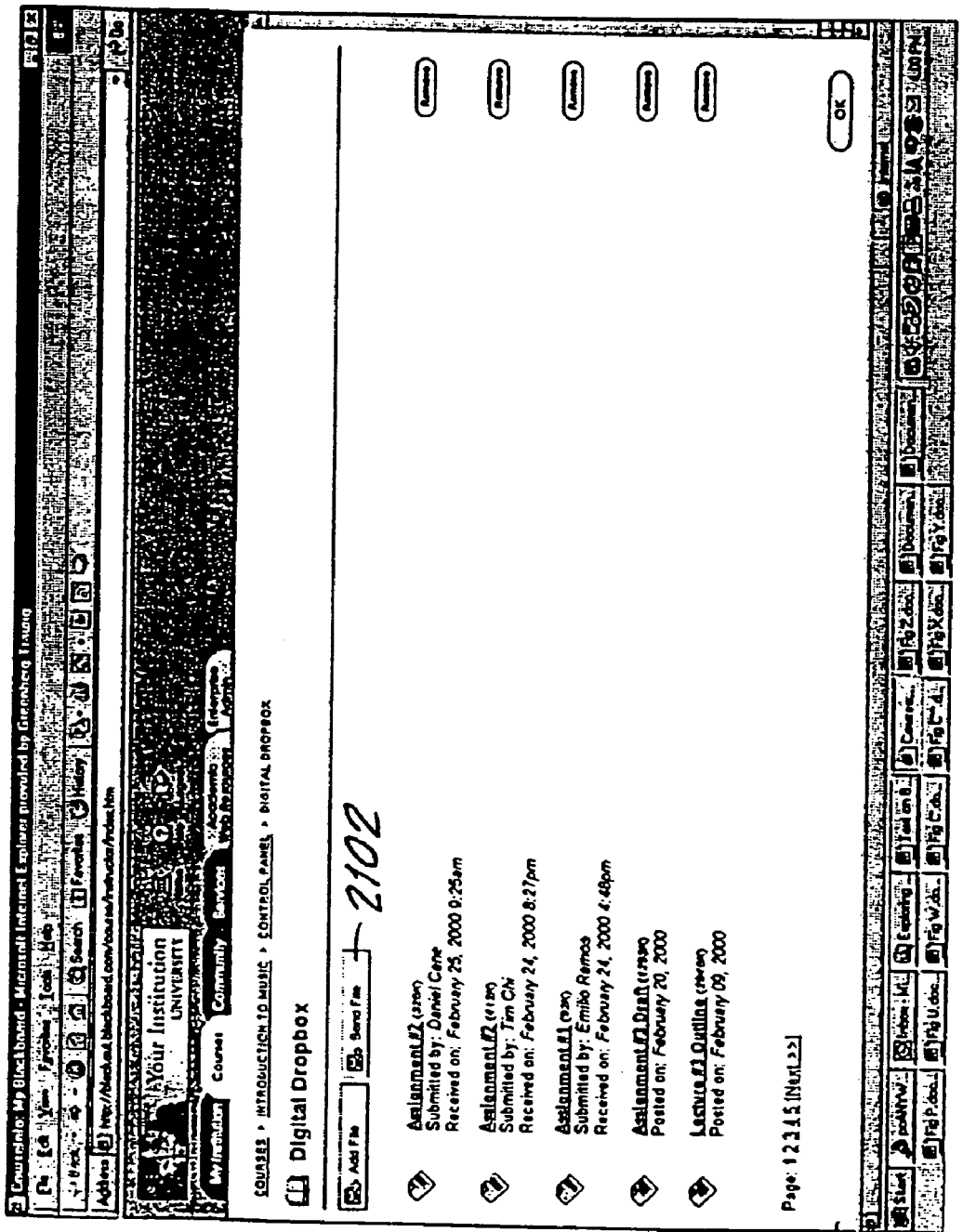
FIG. 21 is a screen shot of the digital dropbox web page.

The following panels are available:

Selection of the Digital Dropbox link 1640 displays a web page 2100 as shown in FIG. 21 that lists the files that exist in the digital dropbox. The Digital Dropbox is a tool that the instructor and students can use to exchange files. The Dropbox works by "uploading" a file from a disk or a computer to a central location. A participant can then come and "download" it to work locally. The Digital Dropbox is used to exchange materials between a single student and the instructor. Information that needs to be posted for all students should be placed in the Course Documents area using the Page Editors.

Individual student access to the Dropbox is available from the File Transfer Area located in Student Tools area on the Course. Students also have group access to a private dropbox from a group homepage.

The web page 2100 displayed lists the current files in the dropbox, which are the files that participants have sent to the user. Files posted here can be accessed and saved. The Send File 2102 to the Student area is where files are uploaded and sent to specific students. The user can also delete files that are no longer needed.

Course Options

The Course Options area 1608 includes a Course Options link 1642 that will display a web page to the instructor that has the links for Button Availability, Tool Availability, Course Availability, Course Duration, Enrollment Options, Enrollment Fees, and Guest Access. Selection of the Button Availability link will display a web page that will allow the user to set and configure the buttons that are used by students in that course, including enabling or disabling them, or making them secure (i.e. only accessible by enrolled students). Selection of

| Name of Tab | Purpose |
| --- | --- |
| Group Discussion | Use this tab to talk with the students in the Virtual Classroom. |
| Questions and Answers | If a student uses his/her Questions tab to submit a question to the instructor, the instructor can then answer the question using the Incoming Questions tab. Thereafter, the instructor can view a log of their dialogue regarding the question on the Questions and Answers tab. |
| Participant Information | Use this tab to learn about the students in the Virtual Classroom, such as their names. |
| Slides | Use this tab to prepare and present a series of slides. (See Options in Preparing Lessons). The tab is only available to the Instructor. |
| Incoming Questions | If a student uses his/her Questions tab to submit a question to the instructor, the instructor can then answer the question using the Incoming Questions tab. Thereafter, the instructor can view a log of their dialogue regarding the question on the Questions and Answers tab. The Incoming Questions tab is only available to the instructor. |
| Access Control | Use this tab to control students' ability to conduct the four Virtual Classroom activities: Question, Chat, Drawing, and Navigating. The tab is only available to the instructor. |

Selection of the Discussion Board link 1638 displays a web page that provides links to the available discussion boards that are associated with the course. A discussion board is another communication tool to use in a classroom setting. This feature is similar to Virtual Chat, but is designed for asynchronous use, so users do not have to be available at the same time to have a conversation. An additional advantage of the discussion board is that user conversations are logged and organized. Conversations are grouped into forums that contain threads and all related replies.

the Tool Availability link will display a web page that will allow the instructor to enable or disable the student tools and communication functions for that course (i.e. email, discussion board, virtual chat, student roster, group pages, student dropbox, edit homepage, personal information, calendar, grades, tasks, electric blackboard, student manual, and course search). Selection of the Course Availability link will display a web page that will allow the instructor to enable or disable the availability of the course to students (i.e. it can be kept unavailable until the course site is finished). Selection of the Course Duration link will display a web page that will allow the instructor to select the duration of the course (continuous, start and end dates, or number of days from the date of enrollment). Selection of the Enrollment Options link will display a web page that will allow the instructor to select the enrollment options as either "instructor led", which allows students to email enrollment requests to the instructor, or "self-enrollment", which will specify the start and end dates and optionally require entry by the student of an access code to enroll. Selection of the Enrollment Fees link will display a web page that will allow the instructor to specify if fees should be charged for enrollment in the course, and what the fees should be. Selection of the Guest Access link will display a web page that will allow the instructor to specify if guests may access the course.

Selection of the Course Properties link 1644 in the Course Options area 1608 displays a web page that enables the instructor to add and/or edit course properties, including the course name, a description of the course, and a subject area for categorization purposes.

Selection of the Course Utilities link 1646 in the course options area 1608 displays a web page that enables the instructor to select a Course Recycler link, an Export Course Link, or an Import Course Cartridge link. The Course Recycler link enables the instructor to recycle the course by selectively removing areas of the course, which are displayed as check boxes next to various content categories (course documents, course information, textbooks, assignments, etc.), various staff areas (staff information, faculty), and external web links. The instructor can also choose to recycle other areas such as discussion boards, gradebook, assessments, etc. The Export Course link enables the instructor to export all, or specific sections, of the course (i.e. content, users, assessments, and/or discussion boards). The Import Course Cartridge link enables the instructor to download and install a course cartridge (if they have an access key).

Selection of the Course Images link 1648 in the course options area displays a web page that enables the instructor to select a Button Style link (to set the button styles for the course) and to select a Course Banner link (to add or remove a course banner on the first page of the course).

Selection of the Academic Web Resource link 1650 in the course options area displays a web page that enables the instructor to select an Enable/Disable Academic Web Button link (to enable or disable the resources button the course homepage) or a Customize Academic Web Button link (to designate the Academic Resources for the course, wherein the instructor can customize the number of links and the content that is available for the students).

User Management

Selection of the Add Users link 1652 in the user management area 1610 displays a web page that enables the instructor to select a Create User link, an Enroll Existing User link, or a Batch Add User link. The Create User link displays a web page that will enable the instructor to create a new user account and enroll him in the course, by inputting name, address, etc. of the user, designating the user's role (student, instructor, TA, grader, etc.) and providing a password if desired. The Enroll Existing User link displays a web page that enables the instructor to enroll a user in the course. The Batch Add Users link displays a web page that enables the instructor to create all of the user accounts by uploading a text file containing the user data.

Selection of the List/Modify Users link 1654 in the user management area 1610 displays a web page that enables the instructor to list and/or modify the users of the course, while selection of the Remove Users link 1656 displays a web page that enables the instructor to remove a user if desired from the course. Selection of the Manage Groups link 1658 enables the instructor to create and edit certain user groups (e.g. gifted students, remedial students, etc.).

Assessment

Within the course, instructors are able to bring quizzes, tests, and surveys online. Included may be essay, true/false, multiple choice, fill-in-the-blank, or matching questions. The questions can include text, graphics or multimedia. For the student, instant feedback is provided through automatic grading functionality. For the instructor, there is the ability to randomize the tests, time them, and create statistical reports of outcomes. Assessments within this system are an optimal way to increase student preparedness for class and to track and compare student progress over time. The Assessment area 1612 of the control panel 1602 allows the instructor to select an Assessment Manager link 1660, a Pool Manager link 1662, an Online Gradebook link 1664, or a Course Statistics link 1666.

Selection of the Assessment Manager link 1660 in the assessment area 1612 displays a web page that enables the instructor to create, edit and otherwise manage the assessment content areas. For example, the instructor may create an assessment by entering an assessment name, a description, and setting certain parameters including Show Detailed Results (shows the students the results for each question instead of simply their final grade), Reveal Correct Answer (shows the students the correct answer for each question), Feedback Enabled (allows students to view the feedback that the instructor has entered for each question), Allow Multiple Attempts (allows students to take the assessment more than once), Set Time for Quiz (sets a timer that is shown to the student during the exam), and Password Protect (allows only those students with the entered password to take the test). By clicking the Modify option, a web page is displayed that enables the instructor to modify the assessment by adding items. An item is added by selecting the type of question (multiple choice, true/false, fill in the blank, etc.), typing in the question text and possible answers (i.e. if it is multiple choice) with an indication of the correct one, specify the order of answers, etc. The order of the questions can be changed in this web page as well.

Selection of the Pool Manager link 1662 in the assessment area 1612 displays a web page that enables the instructor to Add Pool, Import Pool, Search Pool, or Export Pool. Pools are predefined groups of questions and answer sets that are logically linked, usually by subject matter, so that an instructor may draw from a pool to obtain existing questions and answers sets from other courses, instructors, semesters, etc. and not have to "recreate the wheel" every time they generate or modify a test. Thus, by clicking the Add Pool button, the instructor can add a new pool to the list of pools displayed on the Pool Manager web page. He will have to type in the name of the new pool and a description of it on this form. By clicking the Import Pool button, the instructor will enter the name of an existing pool to import, or alternatively browse a disk drive to find the pool to import. By clicking the Search Pool button, the instructor is presented with a web page that will enumerate various available pools that can be searched for questions of interest for importing. The entire pool can be previewed by selecting a preview mode, and all of the available questions in that pool may be viewed. By clicking the Export Pool button, a pool may be selected for exporting purposes. For the list of available pools set forth on the Pool manager page, the instructor may modify the pool, in which case a web page is displayed that lists all of the questions (and associated answer sets) that are in the pool. Each question in the pool may be modified in the same manner as explained above with respect to the assessment manager. Likewise, questions may be deleted entirely from a pool, and new questions may be added to the pool as described above with respect to the assessment manager.

Selection of the Online Gradebook link 1664 in the assessment area displays a web page that enables the instructor to perform various functions with respect to the online course gradebook. FIG. 22 illustrates a web page 2200 entitled "Course Gradebook", which provides a variety of information including consolidated grades, individual assignment/test scores, direct access to specific assignments or tests by student, or a look at a specific test with aggregated results. This allows the instructor to organize the grade information so that it is meaningful. It provides insight into the effectiveness of certain assignments and provides a bridge for allowing instructor-assessment of assignment and class content. The functions provided on the Online Gradebook web page in the assessment area of the control panel include Report By User (used to find a specific user and view statistics, assessment results, and modification of any scores for a user), Report By Item (used to view information about a specific gradebook item), Spreadsheet View (standard gradebook view as shown in FIG. 22, the instructor can modify, add or remove gradebook entries as well as view assessment results), and Export Gradebook (exported as a comma-delimited file).

Selection of the Course Statistics link 1666 in the assessment area displays a web page that enables the instructor to set parameters and view certain statistics for their course. Most instructors want to analyze their class by how much their online materials are being accessed, but very few have the opportunity to take the time or the effort to determine these numbers. By using the course statistics web page 2300 shown in FIGS. 23A and 23B, the system provides a rich tool set for instructors to evaluate the relative statistics of their courses. These statistics may be valuable for evaluating online versus non-online courses to determine the relative efficacy of online materials and how they are enhancing the course. Thus, the Course Statistics web page has input fields for selecting a report filter, which will yield a report with Overall Summary of Course Usage, Main Content Areas report, Communication Areas Report, Group Areas Report, or Student Areas Report. The time period must be specified, which may be all dates or between a beginning date and an end date. The users must be selected, which will be either all users or a selected subset thereof. Other options include Total Number of Access per Area 2302, Number of Accesses over Time 2304, User Accesses per Hour of Day 2306 (or Day of Week 2308), and Total Accesses by User 2310. The data, charts and graphs as shown in FIGS. 23A and 23B will then be displayed to the instructor.

Assistance

Finally, there is an Assistance area 1614 defined in the Control Panel, which sets forth links that will provide the instructor with various types of help. Selecting the Online Manual link 1668 will bring up an HTML based Instructor Manual in a separate browser window. The Online Support link 1670 will bring up a web page with contact info for sending an email to a support person, and the Contact Admin link 1672 will bring up a web page with contact info for sending an email to an administrative contact.

Administrator Functionality

Figure 24:
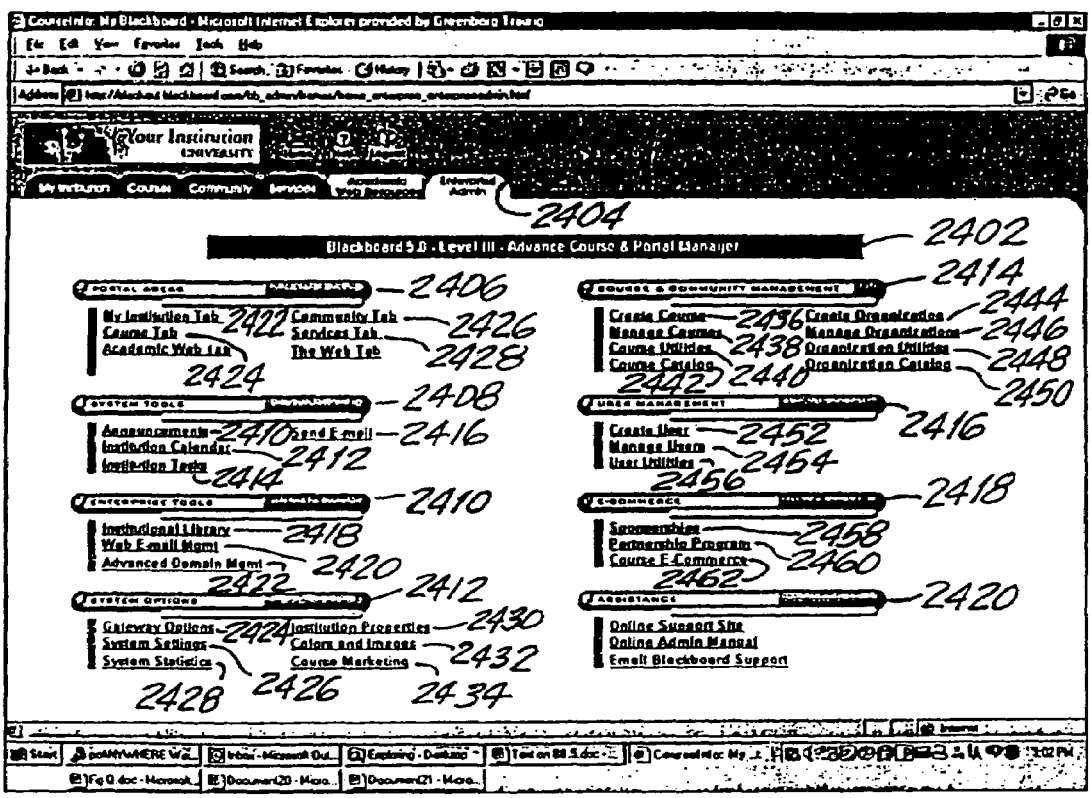
FIG. 24 is a screen shot of the advanced course and portal manager web page.

The Administrator Panel 2402, shown in FIG. 24, gives the system administrator complete access to all of the features of the system including portal features, course and club creation and management, institution and system tools, e-commerce features, user management, and other various institutional options. This is accessed by selecting the Enterprise Administration tab 2404 shown on the homepage.

The Administrator panel 2402 includes a Portal Areas group 2406 of functions, a System Tools area 2408, an Enterprise Tools Area 2410, a System Options Area 2412, a Course and Community Management area 2414, a User Management Area 2416, an E-Commerce Area 2418, and an Assistance area 2420, as explained further below.

Portal Areas

Selection of the My Institution tab 2422 in the Portal Area 2406 provides a web page that lists four hyperlink selectable options: Customize Institution Tab, Institutional Module Options, All Module Options, and Off-Campus Institution Partnerships. The Customize Institution Tab link will provide a web page that allows the user (the enterprise administrator, in this case) to enable/disable the appearance of the "My Institution" tab for all users, as well as enable/disable a Welcome Message that may be displayed at logon. The user may also select an image for the tab, as well as the name, and provide a predefined URL that will be associated with the tab when selected by the end user.

The Institutional Module Options refers to the default layout is the set of modules that new users sees the first time they log in to the portal. This allows the enterprise administrator to enable/disable and/or set as required the following modules: My Courses, My Organizations, Today's Announcements, Today's Tasks, Today's Calendar, School Services, Student Module, Faculty Module, Staff Module, Alumni Module, Perspective Student Module, Guest Module, Other Module, Institution Newspaper Module, and Blank Module (a blank module that can be customized).

The All Module Options link allows the user to enable/disable and/or set as required the following modules: Bookmark, Calculator, Channels, Clip, Comment Clip, Custom Search, Directory, Discussion Boards, various co-branded portal links (such as EXCITE news, entertainment features, stock prices, sports updates, maps, etc.), shopping site links, yellow pages links, etc.

The Off-Campus Institution Partnerships link allows the user to add, modify, and edit hyperlinks to web sites with which the institution has formed various partner or other types of arrangements; for example, a partnership with an off-campus bookstore may be provided as a means for supplementing the on campus bookstore.

Selection of the Course tab 2424 in the Portal Area provides a web page that lists four hyperlink selectable options: Customize Courses Tab, Enable/Disable Course Creation, Course Catalog Options, and Off-Campus Learning Partnerships. The Customize Courses Tab link will provide a web page that allows the user (the enterprise administrator, in this case) to enable/disable the appearance of the "Courses" tab for all users. The user may also select an image for the tab, as well as the name, and provide a predefined URL that will be associated with the tab when selected by the end user.

Selection of the Enable/Disable Creation Option link provides a web page that allows the enterprise administrator to select an option to not allow users to create courses, to allow users to create courses, or to allow the user to send an email request for course creation. Selection of the Course Catalog Options link provides a web page that allows the enterprise administrator to select the use of a default course catalog or to specify the use of an internal course catalog and the URL of its location. The Off-Campus Learning Partnerships link allows the user to add, modify, and edit hyperlinks to web sites with which the institution has formed various learning partner arrangements; for example, a link to the KAPLAN or TUTORNET web sites.

Selection of the Community tab 2426 in the Portal Area provides a web page that lists five hyperlink selectable options: Customize Community Tab, Enable/Disable User Creation of Organizations and Discussion Boards, Organization Catalog Options, Manage Discussion Boards, and Off-Campus Community Partnerships. The Customize Community Tab link will provide a web page that allows the enterprise administrator to enable/disable the appearance of the "Community" tab for all users. The user may also select an image for the tab, as well as the name, and provide a predefined URL that will be associated with the tab when selected by the end user.

Selection of the Enable/Disable User Creation of Organizations and Discussion Boards link provides a web page that allows the enterprise administrator to select options to allow or disallow instructors and students to generate general organizations and discussion boards from the Community Tab or limit organization/discussion board creation to the system administrator.

Selection of the Organization Catalog Options link provides a web page that allows the enterprise administrator to select the use of a default club catalog or to specify the use of an internal club catalog and the URL of its location. The Manage Discussion Board link provides a web page that allows the user to set various parameters and otherwise add and manage various discussion boards on the system. The Off-Campus Community Partnerships link allows the user to add, modify, and edit hyperlinks to web sites with which the institution has formed various arrangements.

Selection of the Services tab 2428 in the Portal Area provides a web page that lists three hyperlink selectable options: Customize Services Tab, Institution Services, and Off-Campus Service Partnerships. The Customize Services Tab link will provide a web page that allows the enterprise administrator to enable/disable the appearance of the "Services" tab for all users. The user may also select an image for the tab, as well as the name, and provide a predefined URL that will be associated with the tab when selected by the end user.

Selection of the Institution Services tab allows the user to create and manage links to other relevant parts of the campus intranet. The Off-Campus Service Partnerships link allows the user to add, modify, and edit hyperlinks to web sites with which the institution has formed various service arrangements.

Under the System Tools area 2408 of the Portal Manager web page, various links are provided to web pages that allow the enterprise administrator to manage Announcements 2410, the Institution Calendar 2412, the Institution Tasks 2414, and Send E-Mail 2416 in a manner similar to what was described with respect to similar tabs in the previously described sections above.

Under the Enterprise Tools area 2410 of the Portal Manager, links are provided to web pages that allow the enterprise manager to Manage Institution Library 2418, and View Published Requests. The Manage Institution Library web page allows the user to add new items from local disk or his inbox into the institution library, edit items, remove items, etc. The View Published Requests web page allows users to view, approve and reject instructor published files for the Institution Library.

Under the System Option area 2412 of the Portal Manager, the user is provided with links to Gateway Options 2424, System Settings 2426, System Statistics 2428, Institution Properties 2430, Colors and Images 2432, and Course Marketing 2434. The Gateway Options link 2424 provides a web page that will determine whether the login button, course catalog, and new user account button appears on the gateway page. The System Settings link 2426 provides a web page with links to Button Overrides (sets which button areas can be used throughout the system), Tool Overrides (sets which tools can be used throughout the system), System Settings/Overrides (set overrides for course and club tools and properties across the entire system), and Course Disk Quotas (sets file system disk quotas for courses).

The System Statistics link 2428 provides a web page with links to a System Reports web page (which allows the enterprise administrator to view reports covering the system and its usage), an Auto-Reporting Options web page (which sets various options for automatically reporting statistics to a service provider), and a Send System Statistics web page (which will send the statistics to the service provider on demand).

The Institution Properties tab 2430 provides a web page that allows the enterprise administrator to view system information such the current version of the software, the registration page, and email contacts. The Colors and Images link 2432 allows access to a web page that allows the administrator to modify the aesthetic properties of the web site.

The Course and Community Management area 2414 of the Portal Manager provides hyperlinks for Create Course 2436, Manage Courses 2438, Course Utilities 2440, Course Catalog 2442, Create Organization 2444, Manage Organization 2446, Organization Utilities 2448, and Organization Catalog 2450.

Figure 29:
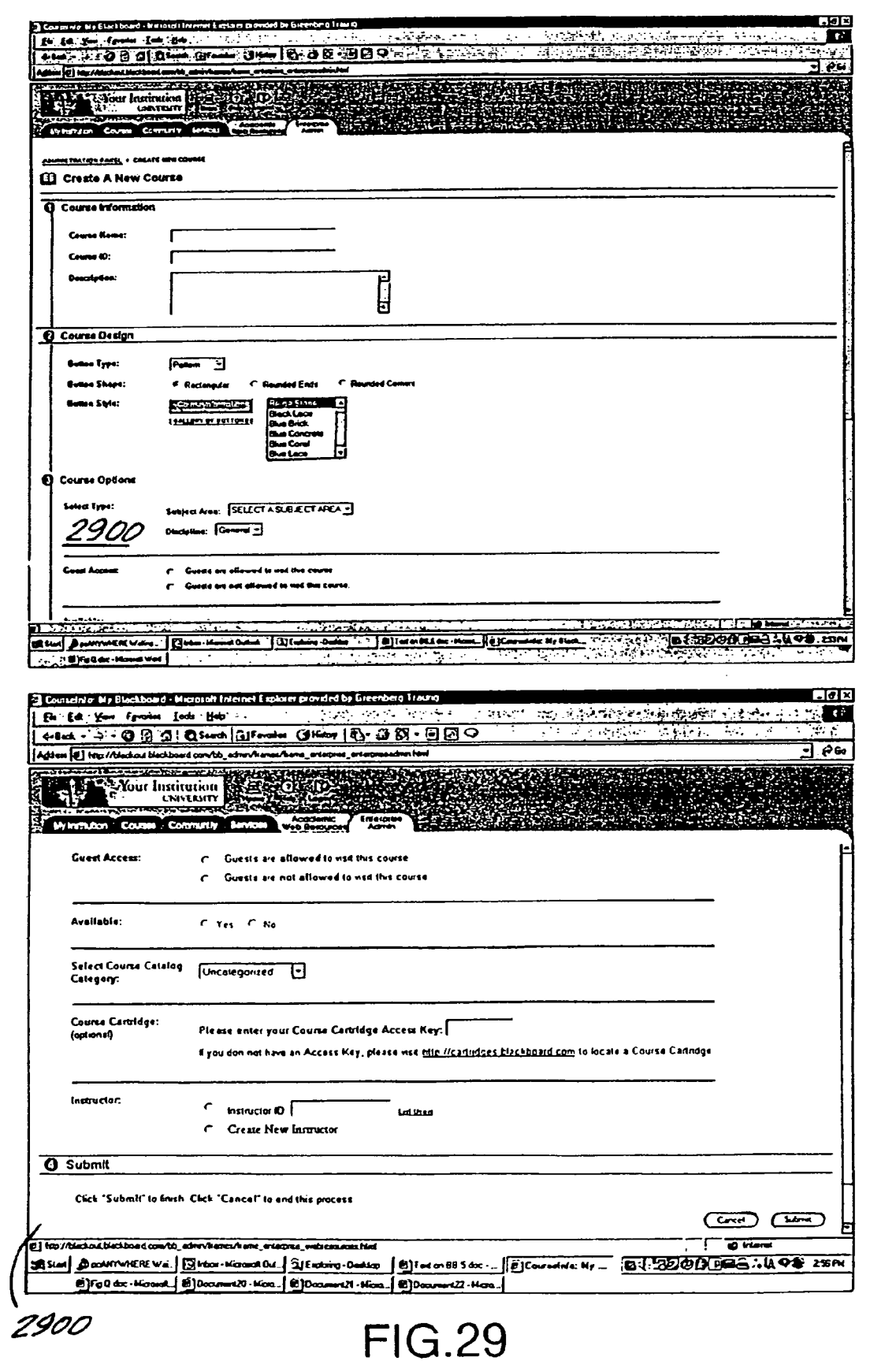

The Create Course web page 2900 is shown in FIG. 29. There, the administrator will enter the requested information about the desired course; i.e. the course name, and ID, and a textual description. The administrator can then specify properties of the buttons that will be used along with the course to match his aesthetic concerns. The administrator can then specify various options, such as the subject area of the course, whether guests may access the course, if the course is currently available, if a course cartridge may be obtained and its URL and access key, and the instructor ID for the course.

The Manage Courses web page allows the administrator to list and/or modify courses, remove them from the system, and set certain default tools (email, Discussion Board, Virtual Chat, Roster, etc.) and buttons (Announcements, Course Information, Staff Information, Virtual Classroom, etc.) to be used with each course in the system. The Course Utilities web page allows the administrator to select a Copy Course link (to make a copy of a course with a new course ID), an Import Course link, an Export Course link, and a Batch Create Courses link. The Course Catalog link allows the user to categorize course and otherwise manage the course catalog.

The Create Organization, Manage Organization, Organization Utilities, and Organization Catalog links allow the user to obtain similar control and functionality with organizations as with courses as described above.

Figure 30A:
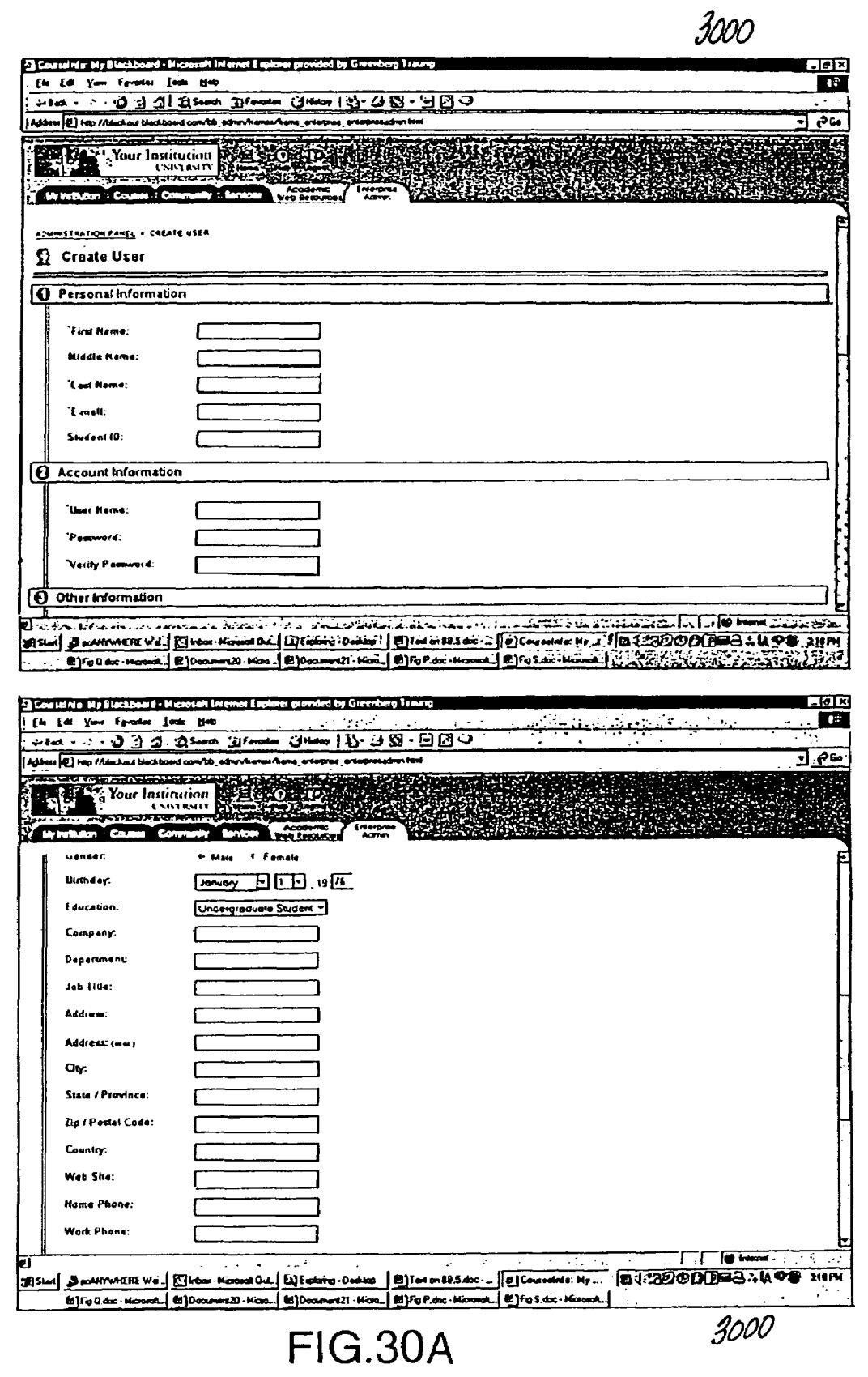
Figure 30B:
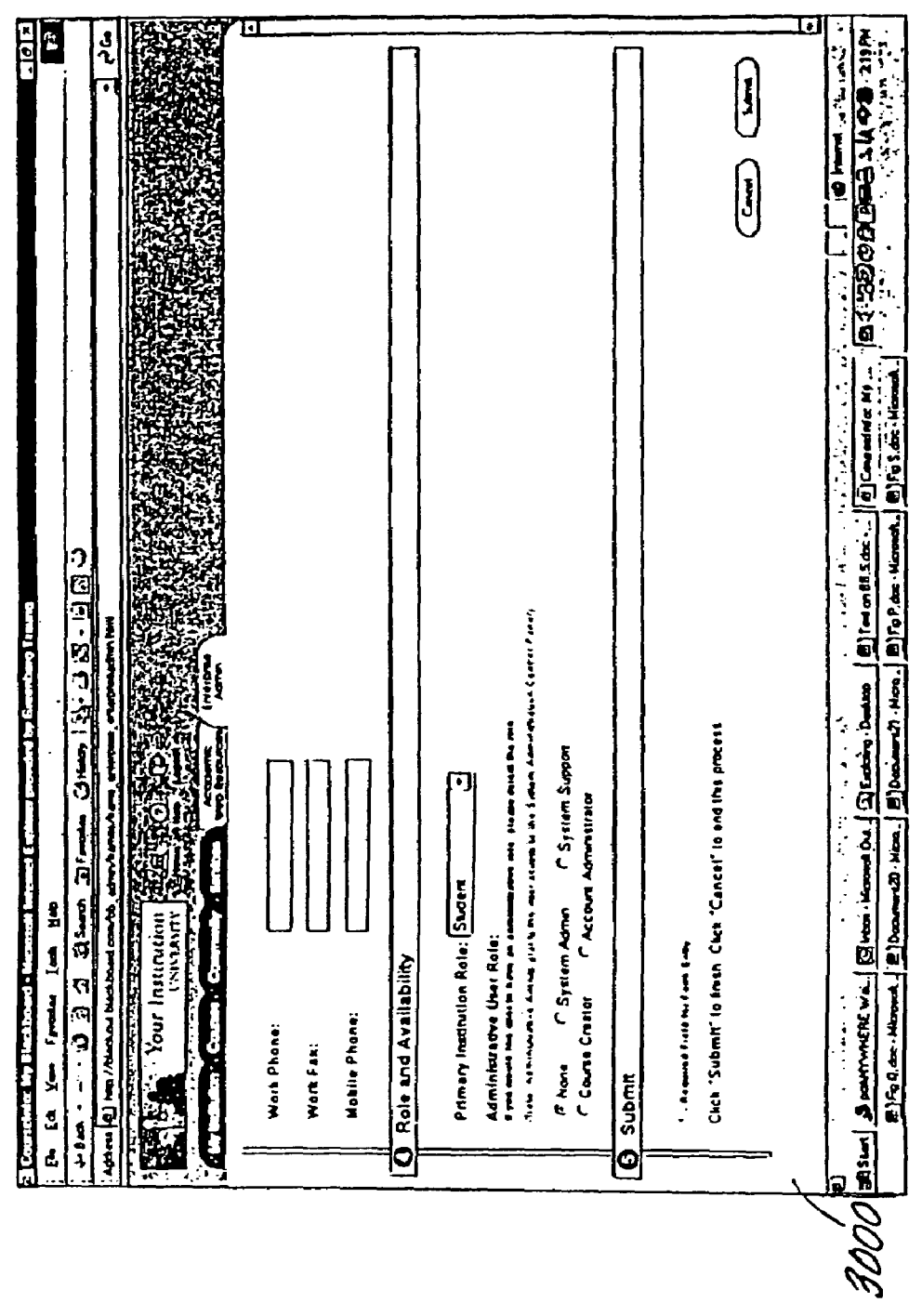

The User Management area 2416 of the Portal Manager provides hyperlinks for Create User 2452, Manage Users 2454, and User Utilities 2456. The Create User web page 3000 (FIGS. 30A and 30B) allows creation of a user entry by entering personal information such as name, address, etc., and a user name and password. The role of the user is set at this time, which may be a Student, Faculty, Staff, Alumni, Guest, etc. Also, the user may be given an administrative role at this point by selecting the appropriate option that is available (None, System Admin, System Support, Course Creator, Account Admin). The role of the user will determine the access and control of the system that the user will have as explained throughout this document. Once a user is created, the Manage User web page allows listing, modification, and/ or removal of users. The User Utilities link 2456 allows the system administrator to Batch Create Users (upload a file of user data in predefined formats compatible with the system), Batch Enroll Users (import a file to enroll users in courses and clubs that exist in the system), and Batch Remove Users (import a file to remove users from the system).

The E-Commerce area 2418 of the Portal Manager provides links to web pages for Sponsorships 2458, Partnership Program 2460, and Course E-Commerce 2462. The Sponsorship web page has links to Primary Site Sponsor web page a "My Institution" Area Sponsor, a Course Area Sponsor, a Community Area Sponsor, and a Services Area Sponsor. These links allow the user to designate if a sponsor is used in each of these capacities, an image of the sponsor link, etc.). The Partnership program page allows the administrator to enroll the institution in the service provider partnership program, which can bring additional e-commerce opportunities to the portal environment. The Course E-Commerce page provides links to Enable/Disable Course and Club E-Commerce (to select e-commerce options for charging fees for the courses or clubs, allow administrators to set prices, allow club leaders or instructors to set prices, etc.), and a Price Course link to manage or set the cost of enrolling in courses or organizations.

Other Utilities and Functions

Figure 25:
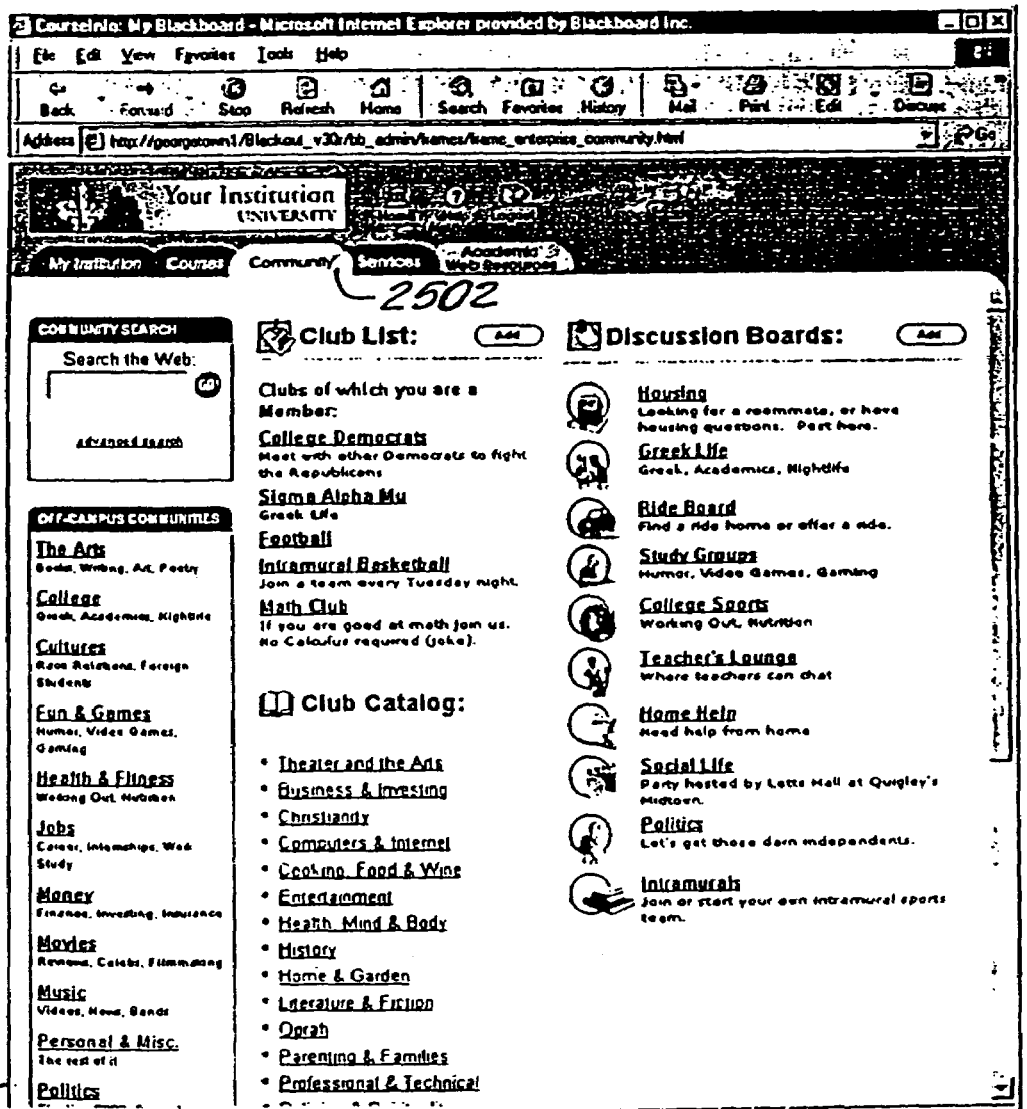
FIG. 25 is a screen shot of the community web page.

One of the key elements to college and university life is the ability to socialize and take advantage of the human element on campus. The system's "Community" tab 2502 provides the web page 2500 shown in FIG. 25, which allows students to interact and be involved in all aspects of campus life from fraternities and sororities to off-campus communities that enhance the learning experience. Many campuses also provide rich services such as job availability through the community function. The Community center is the web equivalent of the student union building.

Figure 26:
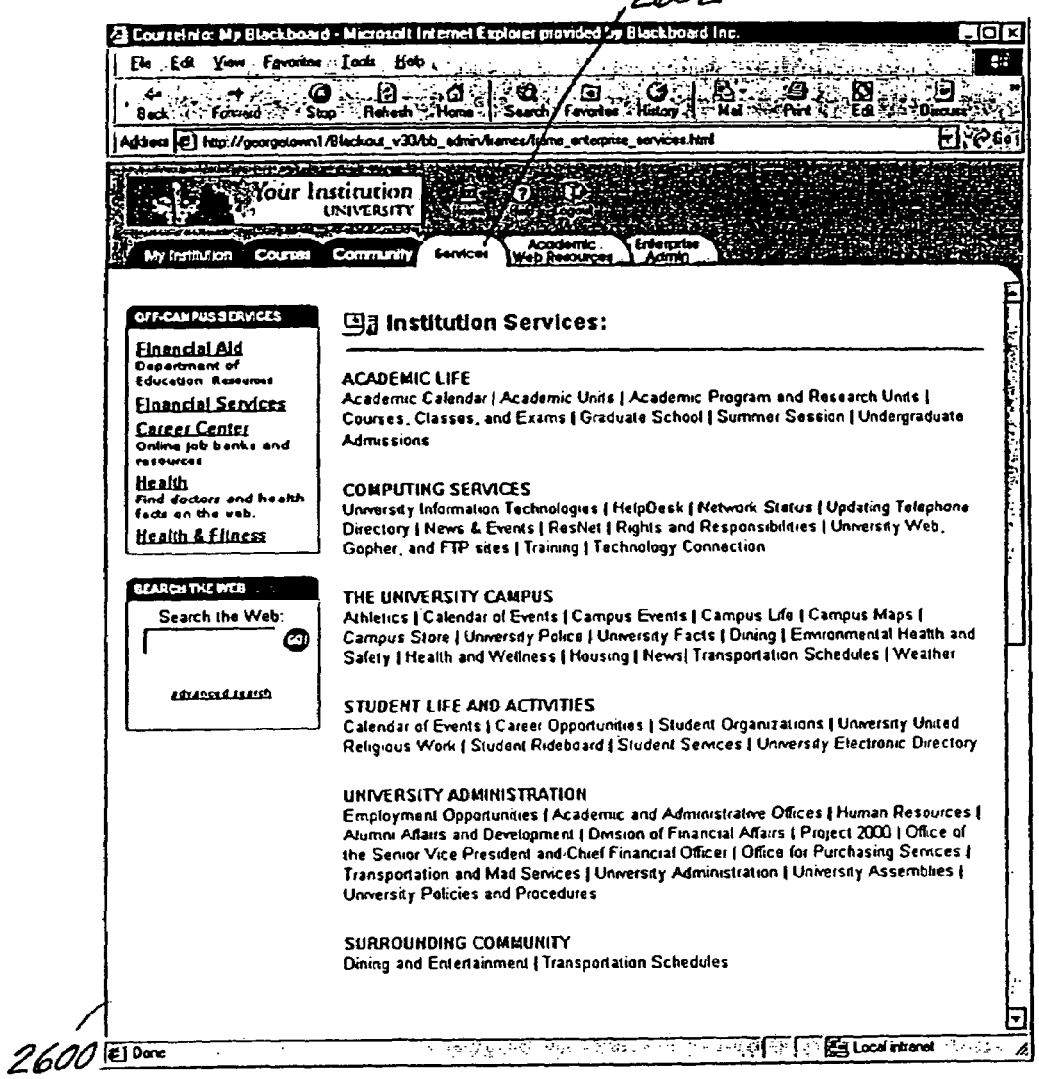
FIG. 26 is a screen shot of the services web page.

Most students are so conversant in online services that they prefer to have campus administrative services available all the time on the web. The system provides an enterprise level teaching and learning system that allows tight integration into student information systems and other campus systems to provide anytime, anywhere administrative services. The Services web page 2600 shown in FIG. 26 (selected by tab 2602) enables users to register, add, drop, check records, or even pay parking tickets while online at anytime.

Figure 27:
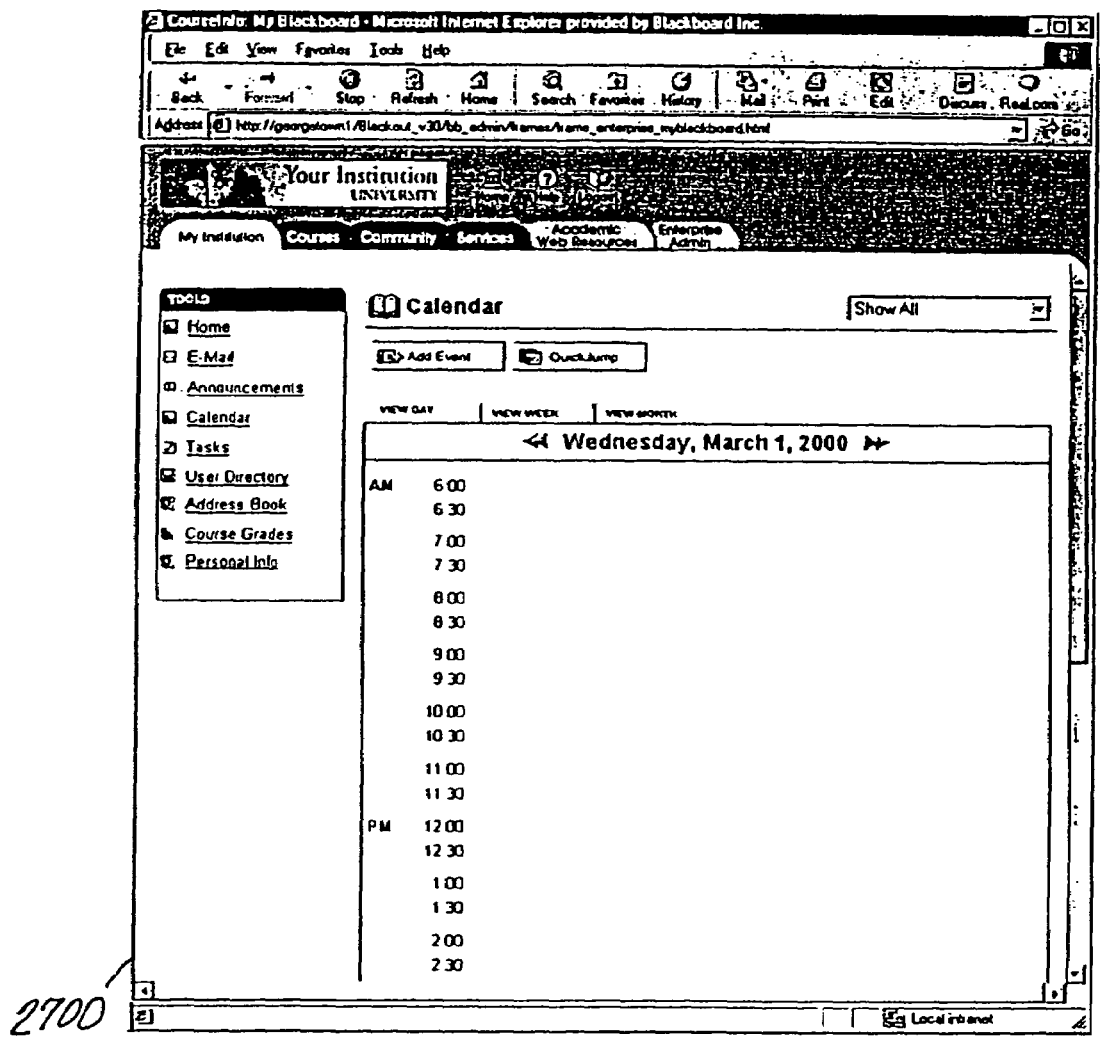
FIG. 27 is a screen shot of the calendar web page.

The system also provides a calendar 2700 that incorporates personal as well as institutional information in a single view, as shown in FIG. 27. The calendar utility gives students and teachers access to all calendar events for each of the courses they are enrolled in, as well as institutional calendar events.

Figure 28:
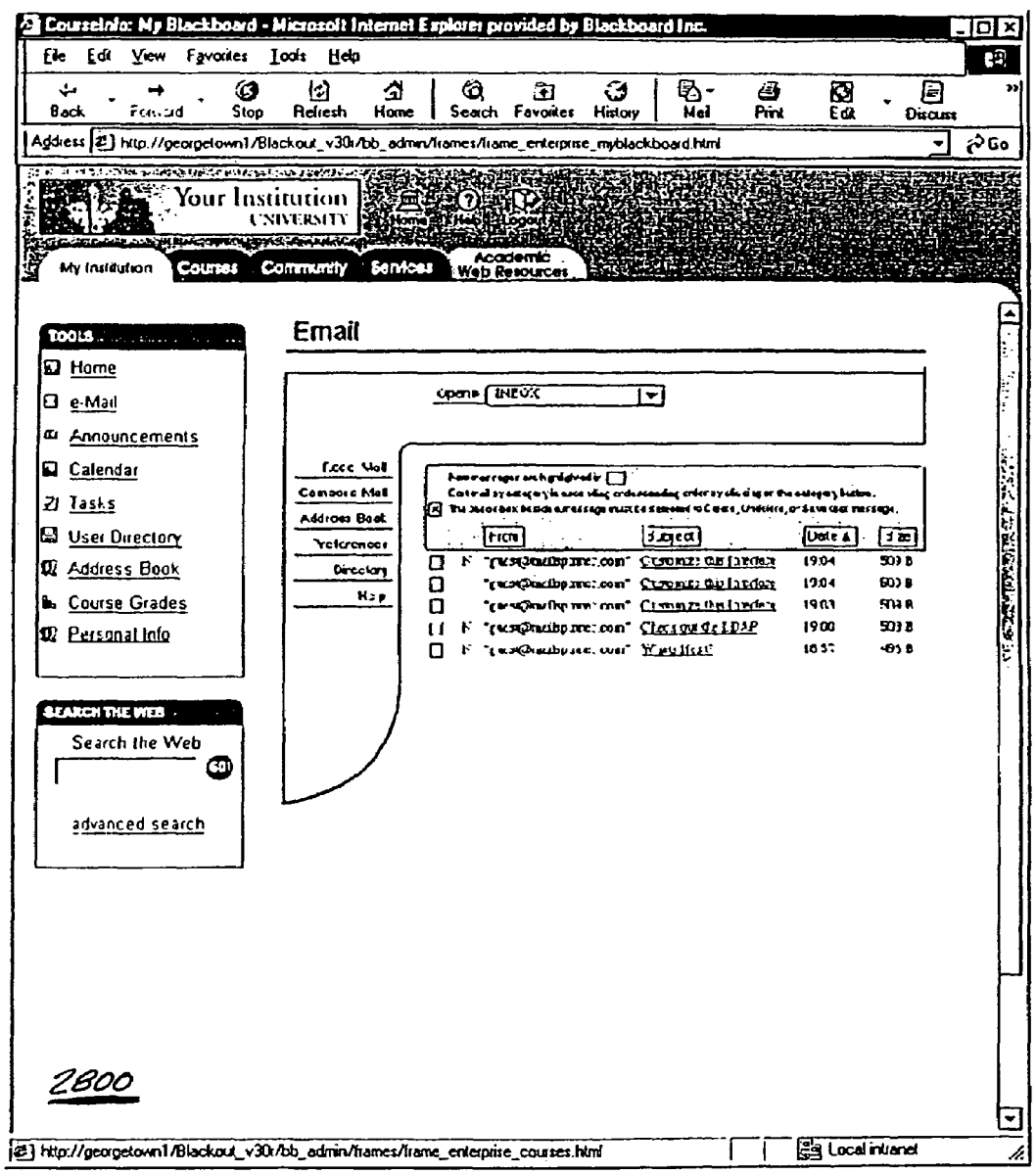
FIG. 28 is a screen shot of the email web page.

Since email is the single most popular application on the Internet today, and the leading reason that most people purchase personal computers, email has been integrated with the system, as shown by the web page 2800 in FIG. 28. Within a personalized home page, the user will be able to access complete email capabilities. The email system sits on top of the existing POP or IMAP server and offers a web-based front end so that the user may access messages from any machine at any time.

Figure 31:
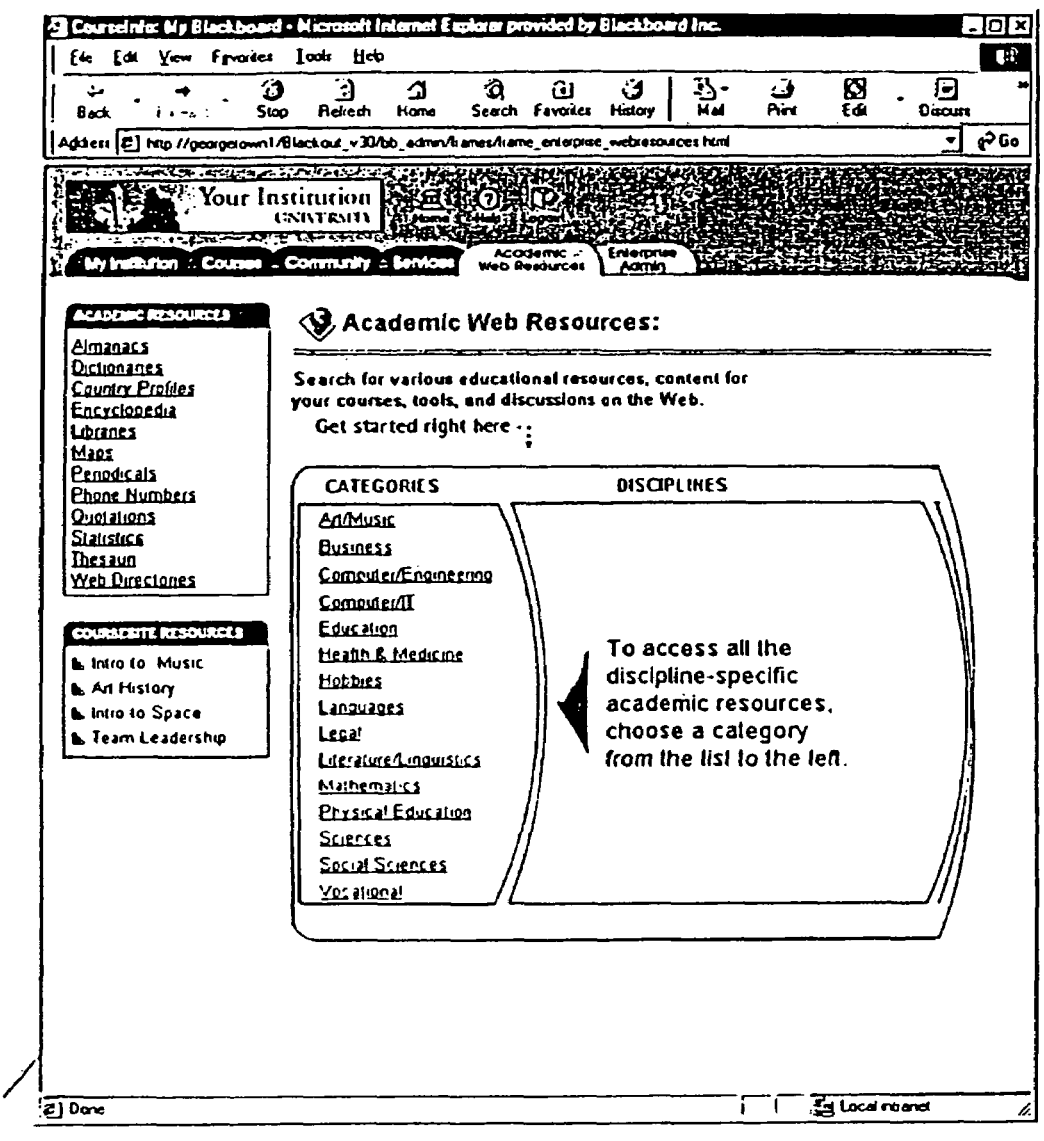
FIG. 31 is a screen shot of the web resource web page.
Figure 32:
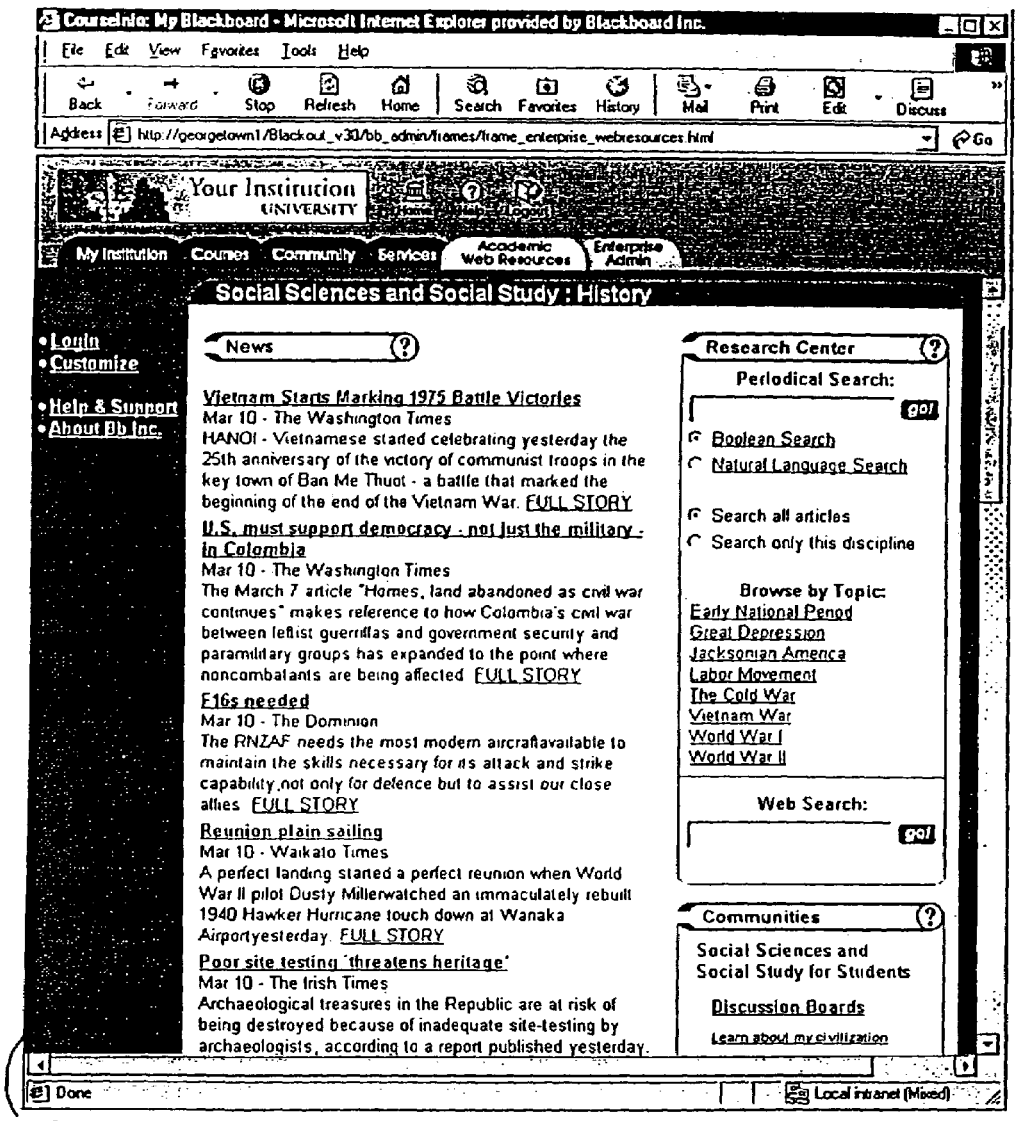
FIG. 32 is a further screen shot of a web resource web page.

FIGS. 31 and 32 show web pages 3100 and 3200 that can be accessed by tab 3102 to provide links that allow students and teachers to find and access academic resources and content. These resources are also context-sensitive to the course discipline. For example, if one accesses the academic web resources from an accounting course, he is automatically directed to news and information sources that are relevant to accounting. The user has access to news, web links, reference works, and search engines that enhance the ability to locate relevant information quickly.

In another aspect of the invention, provided is a system and method for applying E-commerce to education. Specifically, this aspect of the invention allows users visiting a web site to register and pay for courses provided by a college, university, or other institution.

FIG. 34 is a block diagram illustrating information passed from a course registration server to a payment server. As a current or prospective student reviews courses offered by a college, university, or other institution, a student may add courses of interest to a list, or "shopping cart".

When a student has selected courses for which they would like to register, a student may proceed from a registration or review area (Block 100) to a "checkout" area (Block 110), as illustrated in FIG. 34. When a student proceeds to a checkout, information, such as, but not limited to, name, address, cost of courses, order identifier, order description, and a page to which a user is to be returned when an order is complete, is passed on. Information passed from a registration or review area may be used to generate a payment form.

FIG. 35 is a sample of a payment form. A payment form may consist of an introductory paragraph 210, a purchase summary 220, a payment information area 230, and the like. An introductory paragraph 210 may be used to instruct a student in requirements at each stage of the payment process. A purchase summary 220 may include services and products selected, per-unit prices, quantities requested, inventory numbers for each product or service selected, an invoice or purchase number, a total price, and other, similar information.

A payment information area 230 can be used to collect payment information from a student. A student may be required to enter some information manually, such as, but not limited to, credit card type, credit card number, credit card expiration date, name on credit card, credit card billing address, check number, checking account number, bank routing number, debit card number, and personal identification number ("PIN code").

If a student has previously used the present invention, some information may be automatically entered based on previously submitted forms. Information transferred from a registration server may also be used to fill in some form fields. When a student has reviewed entered information, a form may be submitted for processing by activating a button or other interface element.

FIG. 36 is a block diagram illustrating interaction between a payment server and a payment validation server. After a student has entered necessary information into a payment form and submitted the form (Block 300), some information, such as, but not limited to, amount of purchase, credit card number, name on credit card, check number, bank routing number, or billing address, may be transmitted to a payment validation server (Block 310). A payment validation server may be maintained as part of the present invention, or payment validation servers may be maintained by one or more third parties, such as, but not limited to, CyberCash, Inc.

A payment validation server processes transmitted information, contacts a bank or other institution issuing the credit card or other payment form, and verifies that a payment of the amount requested is authorized. If payment of the requested amount is authorized, authorization information, including, but not limited to, a confirmation number, may be transmitted to a payment server. If payment of the specified amount is not authorized, other information, such as a declination code, may be transmitted to a payment server. If payment is not authorized, a payment error message similar to Block 320 may be displayed. FIG. 37 is a sample of a payment information page. A student may print or otherwise record information displayed on a payment information page for his or her records. A payment information page can include a thank you, confirmation, or other message (Block 410). A payment information page may also include information such as, but not limited to, confirmation or declination information; goods, services, and classes purchased; and total price charged (Block 420). In addition, a payment information page may include a button or other interface element which a user can activate to continue processing. The exact behavior of this interface element may be determined by the referring system through the URL or other data element which is illustrated in FIG. 34.

FIG. 38 is a block diagram illustrating post-order processing. As previously stated, a payment information page may also contain a button or other interface element which, when activated, causes a web page to be displayed or performs other processing steps. Activating the button or interface element may also cause some authorization/declination information to be transferred to a college, university, or other institution's accounting department for processing (Block 530).

Open Web Environment

The present invention may be used as an open platform environment, where anyone with access to the Internet may register as an instructor to create, administer, and make available a course to anyone else with Internet access. Thus, by entering a publicly available website such as www.blackboard.com, a user may register as an instructor and be provided with an instructor control panel for creating course as described herein. To create the course, the user will define course parameters such as a description, enrollment options, announcements, assessments, course materials, etc., and provide them in the various web pages as described above. The user can then let others know about the availability of the course online, and a potential student may access the publicly available web site to enroll in the course. In this manner, anyone can create a virtual classroom without the need to be affiliated with an institution, and disseminate knowledge through the course as previously unavailable.

While the preferred embodiment and various alternative embodiments of the invention have been disclosed and described in detail herein, it may be apparent to those skilled in the art that various changes in form and detail may be made therein without departing from the spirit and scope thereof. In addition, titles and descriptions included in the Figures are included to disclose the best mode contemplated by the inventor at the time of filing, and should not be construed as limiting the invention.

The invention claimed is:

1. A method for providing access to courses having course files in an on-line course-based instruction system, comprising the steps of:

storing a plurality of roles, with different roles providing a user with associated respective levels of access to courses in the system;

for each course for which the user is to have a level of access, associating the user with one of the plurality of roles, with concurrent different roles for different courses in the system being able to be associated with the user;

in response to a single login by the user at a computer, providing access to the user at the computer to at least two courses for which the user is to have a level of access in accordance with the respective roles associated with the user for the two courses; and providing a web page from a server to the user in response to the single login by the user at the computer, the web page comprising a plurality of course hyperliniks, at least two of the course hyperlinks being respectively associated with different respective courses, the plurality of course hyperliniks on the web page comprising at least two of the courses with which the user has an associated level of access, and further in response to the single login, presenting the user with a list of courses to which the user has a level of access.

2. The method of claim 1, wherein the concurrent different roles are associated with the user on a course-by-course basis.

3. The method of claim 1, wherein the user has a same role associated with all courses for which the user has a level of access.

4. The method of claim 1, wherein for a particular course among the courses in the system, a subset of users associated with that course are associated with roles as a batch.

5. The method of claim 1, wherein the plurality of roles include student, administrator, and instructor.

6. The method of claim 5, wherein the user is associated with a student role in one of the courses in the system and an instructor role in another of the courses in the system.

7. The method of claim 6, wherein a first access level to the one course differs from a second access level to the another course.

8. The method of claim 5, wherein the student role provides a level of access to a respective course that permits viewing of associated course files.

9. The method of claim 5, wherein the instructor role provides a level of access to a respective course that permits editing of associated course files.

10. The method of claim 5, wherein editing includes deletion.

11. The method of claim 5, wherein editing includes creation.

12. The method of claim 1, wherein the different respective levels of access relate to at least one of viewing, editing, deleting, and creating respective course files associated with the courses in the system.

13. The method of claim 1, wherein the list is a portion of the web page.

14. The method of claim 13, wherein the list includes an indication of the role of the user in each respective course of the list.

15. The method of claim 1, wherein the list includes a respective hyperlink for each course for which the user is to have a level of access.

16. The method of claim 15, wherein each of the respective hyperliniks points to an associated course web page.

17. The method of claim 1, wherein the list includes a set of respective hyperlinks for each course to which the user has a level of access and further wherein at least one of the set of respective hyperlinks varies according to the level of access, each set of respective hyperlinks including one or more hyperlinks.

18. A computer-readable medium bearing instructions for providing access to courses having course files in an on-line course-based instruction system, the instructions being executable to cause one or more processors to perform the steps of:

storing a plurality of roles, with different roles providing a user with associated respective levels of access to courses in the system;

for each course for which the user is to have a level of access, associating the user with one of the plurality of roles, with concurrent different roles for different courses in the system being able to be associated with the user;

in response to a single login by the user, providing access to the user to at least two courses for which the user is to have a level of access, in accordance with the respective roles associated with the user for the at least two courses; and providing a web page to the user in response to the single login by the user, the web page comprising a plurality of course hyperliniks, at least two of the course hyperlinks being respectively associated with different courses, the plurality of course hyperliniks on the web page comprising at least two of the courses with which the user has an associated level of access, and further in response to the single login, presenting the user with a list of courses for which the user is to have a level of access.

19. The computer-readable medium of claim 18, wherein the concurrent different roles are associated with the user on a course-by-course basis.

20. The computer-readable medium of claim 18, wherein the plurality of roles include student, administrator, and instructor.

21. The computer-readable medium of claim 20, wherein the user is associated with a student role in one of the courses in the system and an instructor role in another of the courses in the system.

22. The computer-readable medium of claim 21, wherein a first access level to the one course differs from a second access level to the another course.

23. The computer-readable medium of claim 18, wherein the different respective levels of access relate to at least one of viewing, editing, deleting, and creating the respective course files associated with the some of the courses in the system.

24. The computer-readable medium of claim 18, wherein the list includes an indication of the role of the user in each respective course of the list.

25. The computer-readable medium of claim 24, wherein the list includes a respective hyperlink for each course for which the user has a level of access.

26. The computer-readable medium of claim 25, wherein each of the respective hyperliniks points to an associated course web page.

27. A system providing access to a plurality of courses having course files, comprising:

a server computer in communication with a user over a network, the server computer comprising:

a memory store configured to store respective course files associated with each of the plurality of courses; and an access controller configured to allow the user a level of access to the respective course files for each of the plurality of courses in which the user is to be associated with a respective role from among a plurality of roles in response to a single login by the user;

wherein for at least each of a subset of the plurality of the courses the user is associated with one of the plurality of roles, with concurrent different roles for different courses in the system being able to be associated with the user with different roles providing the user with associated levels of access; and wherein the server computer is configured to provide a web page to the user in response to the single login by the user, the web page comprising a plurality of course hyperlinks, at least two of the course hyperlinks being respectively associated with different courses of the subset of courses, the plurality of course hyperlinks on the web page comprising at least two of the courses with which the user has an associated level of access; and further comprising a login manager configured to present the user with a list of the subset of courses on the web page in response to the single login.

28. The system of claim 27, wherein the respective roles are associated with the user on a course-by-course basis.

29. The system of claim 27, wherein the multiple roles include student, administrator, and instructor.

30. The system of claim 29, wherein the user is associated with a student role in one of the courses in the subset and an instructor role in another of the courses of the subset.

31. The system of claim 30, wherein a first level of access to the respective course files for the one course is different than a second level of access to the respective course files of the another course.

32. The system of claim 31, wherein the student role provides a level of access that allows viewing respective content.

33. The system of claim 32, wherein the instructor role provides a level of access that allows editing respective content.

34. The system of claim 27, wherein the list includes an indication of the associated respective role of the user in each respective course of the list.

35. The system of claim 34, wherein the list includes at least a respective one of the course hyperlinks for each of the subset of courses.

36. The system of claim 35, wherein the list includes a set of respective course hyperliniks for each of the subset of courses and further wherein at least one of the sets of respective course hyperlinks varies according to the associated respective role.

37. The system of claim 36, wherein each of the respective course hyperliniks points to an associated course web page.

* * * * *